US009979603B2

(12) United States Patent
Tung et al.

(10) Patent No.: US 9,979,603 B2
(45) Date of Patent: May 22, 2018

(54) SYSTEM ARCHITECTURE FOR CLOUD-PLATFORM INFRASTRUCTURE LAYOUTS

(71) Applicant: Accenture Global Services Limited, Dublin (IE)

(72) Inventors: Teresa Sheausan Tung, San Jose, CA (US); Karthik Gomadam, San Jose, CA (US); Qing Xie, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 244 days.

(21) Appl. No.: 14/817,582

(22) Filed: Aug. 4, 2015

(65) Prior Publication Data

US 2016/0072899 A1 Mar. 10, 2016

Related U.S. Application Data

(60) Provisional application No. 62/046,150, filed on Sep. 4, 2014.

(51) Int. Cl.
*G06F 15/173* (2006.01)
*H04L 12/24* (2006.01)
(Continued)

(52) U.S. Cl.
CPC ............ *H04L 41/12* (2013.01); *H04L 41/145* (2013.01); *H04L 41/22* (2013.01);
(Continued)

(58) Field of Classification Search
None
See application file for complete search history.

(56) References Cited

U.S. PATENT DOCUMENTS 6,526,335 B1 * 2/2003 Treyz .................... G01C 21/26
307/10.1
7,725,482 B2 5/2010 Smith et al.
(Continued)

FOREIGN PATENT DOCUMENTS

EP 2224301 A1 9/2010
EP 2500787 A1 9/2012

OTHER PUBLICATIONS

European Search Report, App. No. EP 3086189A3, dated Nov. 16, 2016, pp. 1-3, European Patent Office.
(Continued)

*Primary Examiner* — Mohamed Ibrahim
(74) *Attorney, Agent, or Firm* — Brinks Gilson & Lione

(57) ABSTRACT

A system maintains, generates, and manages infrastructure layouts. The infrastructure layouts interconnect infrastructure components and capture relational aspects between the components within the interconnections. The infrastructure layouts map northbound services, which are service outputs, to southbound services, which are service capabilities, for fulfillment. The system may traverse a mapping from a northbound service to a fulfilling southbound service to generate a workflow to support deployment of the northbound service. In various implementations, the system may compare a path, which maps a northbound service to a southbound service, to a policy model to determine compliance with the policy.

20 Claims, 38 Drawing Sheets

(51) Int. Cl.

*H04L 29/08* (2006.01)
*H04W 4/00* (2018.01)
*H04L 29/06* (2006.01)

(52) U.S. Cl.

CPC .......... *H04L 41/5045* (2013.01); *H04L 67/10* (2013.01); *H04L 67/16* (2013.01); *H04L 67/34* (2013.01); *H04W 4/001* (2013.01); *H04L 63/20* (2013.01)

(56) References Cited

U.S. PATENT DOCUMENTS

| | | | | |
|---|---|---|---|---|
| 7,904,540 | B2 | 3/2011 | Hadad et al. | |
| 7,984,434 | B1 | 7/2011 | Gathoo | |
| 8,434,081 | B2 | 4/2013 | Cervantes et al. | |
| 8,458,690 | B2 | 6/2013 | Zhang et al. | |
| 8,490,078 | B2 | 7/2013 | Dennis et al. | |
| 8,583,781 | B2 | 11/2013 | Raleigh | |
| 8,666,933 | B2 | 3/2014 | Pizzorni et al. | |
| 8,793,363 | B2 | 7/2014 | Sater et al. | |
| 8,959,523 | B2 | 2/2015 | Patil et al. | |
| 8,997,078 | B2 | 3/2015 | Spivak et al. | |
| 9,047,577 | B2 | 6/2015 | Deng et al. | |
| 2005/0225446 | A1* | 10/2005 | Bertness ............ | G08B 21/0261 340/572.1 |
| 2011/0106927 | A1 | 5/2011 | Carter et al. | |
| 2013/0212553 | A1 | 8/2013 | Balasubramanian | |
| 2013/0238774 | A1* | 9/2013 | Davison ................ | H04L 41/145 709/223 |
| 2014/0053145 | A1 | 2/2014 | Steigleder | |
| 2014/0181255 | A1 | 6/2014 | Thomas et al. | |
| 2014/0189124 | A1 | 7/2014 | Banatwala et al. | |
| 2015/0081701 | A1 | 3/2015 | Lerios et al. | |
| 2015/0207724 | A1* | 7/2015 | Choudhury ............. | H04L 45/26 370/255 |
| 2015/0365323 | A1* | 12/2015 | Duminuco ............ | H04L 45/745 370/235 |
| 2015/0381515 | A1* | 12/2015 | Mattson ................ | H04L 41/145 707/609 |

OTHER PUBLICATIONS

EP 2224301A1, English abstract, Accessed Jan. 10, 2017.
Bizer, C., et al., Linked data—the story so far, 2009, pp. 122-147, vol. 5, No. 3, International Journal of Semantic and Web Information Systems, United States of America.
Lambda architecture, http://lambda-architecture.net/, pp. 1-3, accessed Oct. 7, 2015.
Lambda architecture: A state-of-the-art, http://www.datasalt.com/2014/01/lambda-architecture-a-state-of-the-art/, pp. 1-4, accessed Oct. 6, 2015.
Lassila, O., et al., Resource Description Framework (RDF) Model and Syntax Specification, Feb. 22, 1999, pp. 1-45, W3C Consortium, Cambridge, Massachusetts.
Balduini, M., et al., Social listening of City Scale Events using the Streaming Linked Data Framework, Oct. 21-25, 2013, pp. 1-16, The Semantic Web—ISWC 2013, Sydney, Australia.
Prudhommeaux, E., et al., Sparql query language for rdf, 2008, pp. 1-93, W3C Consortium, Cambridge, Massachusetts.
Llaves, A., et al., Towards Efficient Processing of RDF Data Streams, 2003, pp. 45-53, Software Architecture, Springer Publishing Company, New York, New York.
Le-Phuoc, D., et al., A Native and Adaptive Approach for Unified Processing of Linked Streams and Linked Data, 2011, pp. 370-388, The Semantic Web, Springer Publishing Company, New York, New York.
Stonebraker, M., et al., "One Size Fits All": An Idea Whose Time Has Come and Gone, 2005, pp. 2-11, Proceedings of $21^{st}$ International Conference on ICDE, IEEE Computer Society, Piscataway, New Jersey.
Binz, T., et al., Portable Cloud Services Using TOSCA, 2012, pp. 80-85, IEEE Internet Computing, No. 3, IEEE Computer Society, Piscataway, New Jersey.
Martinez-Prieto, M.A., et al., The Solid architecture for real-time management of big semantic data, 2015, pp. 62-79, Elsevier B.V., The Netherlands.
Cuesta, C.E., et al., Towards an Architecture for Managing Big Semantic Data in Real-Time, 2013, pp. 45-53, Springer Publishing Company, New York, NY.
Weng, L., et al., An Approach for Automatic Data Virtualization, 2004, pp. 24-33, Proceedings of $13^{th}$ IEEE International Symposium on High performance Distributed Computing, IEEE Computer Society, Piscataway, New Jersey.
Patni, H., et al., Linked Sensor Data, 2010, pp. 362-370, 2010 International Symposium on Collaborative Technologies and Systems (CTS), IEEE Computer Society, Piscataway, New Jersey.
Caraguay, A., et al., SDN: Evolution and Opportunities in the Development IoT Applications, May 4, 2014, pp. 1-10, vol. 2014, International Journal of Distributed Sensor Networks, Spain.
Finnie, G., White Paper—Policy Control & SDN: A Perfect Match?, Aug. 2013, pp. 1-17, Heavy Reading, New York, New York.
Garcia-Gomez, S., et al., Challenges for the Comprehensive Management of Cloud Services in a PaaS Framework, pp. 201-213, vol. 13, No. 3, Scalable Computing: Practice and Experience, Scientific International Journal for Parallel and Distributed Computing, Romania (2012).
Li, L., et al., PACE: Policy-Aware Application Cloud Embedding; INFOCOM, 2013 Proceedings IEEE, ISSN: 0743-166X, Print ISBN: 978-1-4673-5944-3, Apr. 14-19, 2013, pp. 638-646, IEEE, Piscataway, New Jersey.
Li, L., et al., "Mosaic: Policy Homomorphic Network Extension"; YALEU/DCS/TR-1427, May 13, 2010, pp. 1-14, Yale University Department of Computer Science, New Haven, Connecticut.
Australian Patent Application No. 2015221443, Notice of Acceptance, dated Aug. 30, 2016, pp. 1-3.
Australian Patent Application No. 2015221443, Patent Examination Report No. 1, dated May 25, 2016, pp. 1-7.

* cited by examiner

SYSTEM ARCHITECTURE FOR CLOUD-PLATFORM INFRASTRUCTURE LAYOUTS

PRIORITY CLAIM

This application claims priority to provisional application Ser. No. 62/046,150, filed Sep. 4, 2014, which is entirely incorporated by reference.

TECHNICAL FIELD

This disclosure relates to a complex system architecture and analytics engine for building, maintaining, and analyzing infrastructure layouts. This disclosure also relates to complex system architecture for determination of policies and execution designs based on the infrastructure layouts.

DETAILED DESCRIPTION

Figure 1:
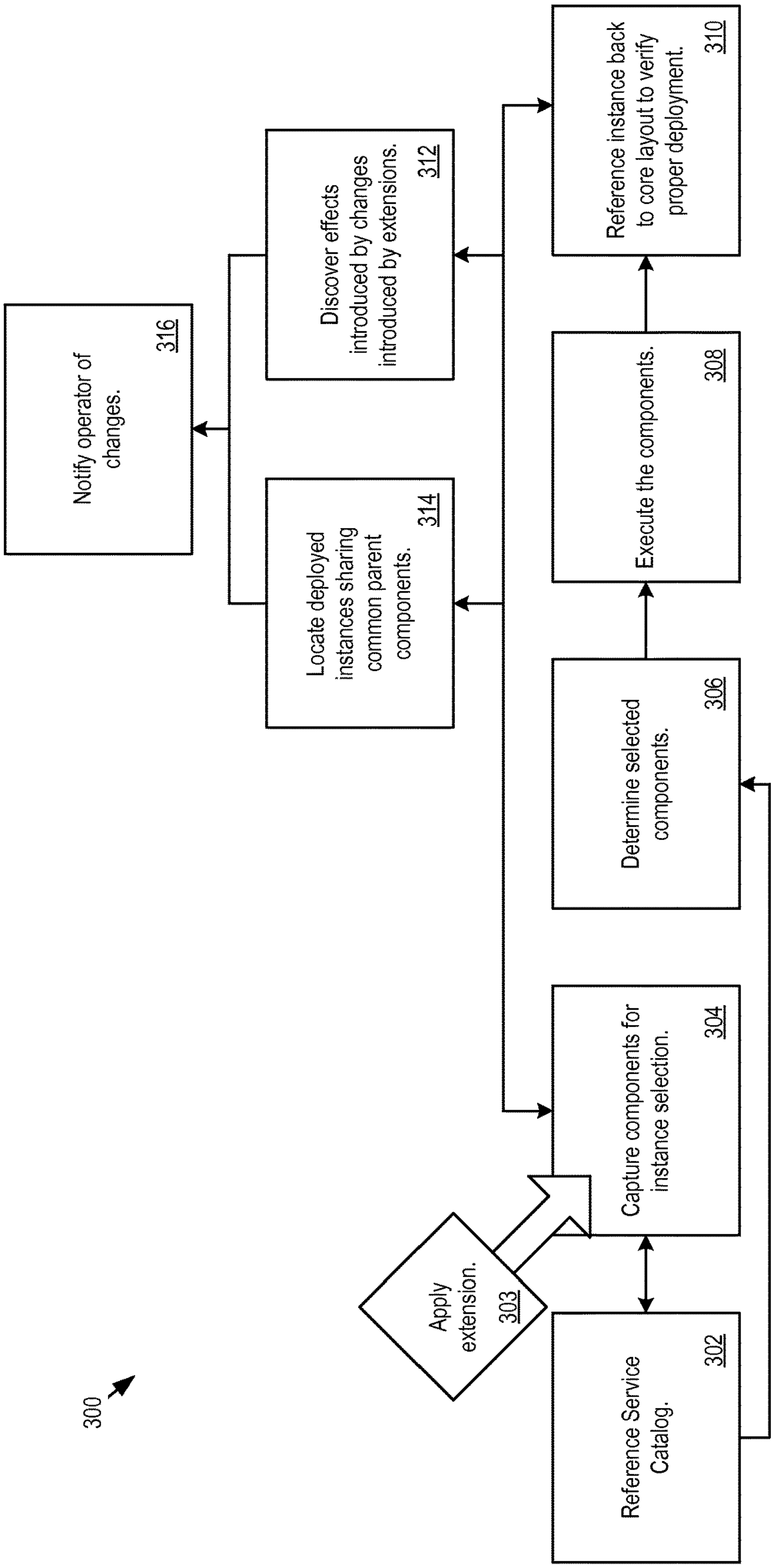
FIG. 1 shows example configuration logic for configuration of services.

Described below is a context-aware architecture that maps northbound services to southbound service fulfillment models. In various implementations, northbound services include customized service offerings to an end user. For example, northbound services may include data connectivity for an automobile, messaging capability on a phone, remote storage for a mobile device, or virtually any end user deliverable service. The context-aware architecture may further be used for workflow generation to support the deployment and orchestration of the northbound services or completion of other tasks. For example, the workflow may include ordered scripts that implement intervening components connecting the northbound service to fulfillment via the southbound service. Additionally or alternatively, the context aware architecture may facilitate policy enforcement. The capture of relational data among the component providing the northbound and southbound services may allow comparison to policy models. For example, when the captured relational data differs from the policy model, the system may generate alerts and/or otherwise handle the policy deviation.

In various implementations, southbound services include service capabilities to support fulfillment of the northbound services. For example, southbound service may include WiFi connectivity, text messaging though a particular service provider, web storage services, and/or other fulfillment services.

In some cases, it may be advantageous to implement a context-aware infrastructure layout architecture to map northbound offered services to southbound service fulfillment models. For example, the context-aware infrastructure layout architecture may be applied in services, such as connectivity for cars and/or homes fulfilled though telecommunications and/or internet service providers (ISPs); cloud brokers serving software as a service (SaaS), platform as a service (PaaS), and/or infrastructure as a service (IaaS) fulfilled through Amazon web services (AWS), Cloud Foundry, Open Stack based data centers, and/or other web service providers; digital media content platforms serving content and/or advertising to digital media customers fulfilled by content providers and social media channels; and/or other northbound offerings mapped to southbound fulfillment models.

In some cases the context-aware infrastructure layout architecture may allow for the customized use of southbound services, and such services may be implemented in a generic or generalized fashion. For example, a northbound service may be mapped to a portion of capabilities provided by one or more southbound services. Thus, the south bound service may not necessarily be customized to the particular northbound service. Rather, fulfillment for the northbound service may arise through a request and execution of one or more capabilities of the southbound services. As the number of northbound use cases grows, the context-aware architecture allows for accelerated configuration and deployment of southbound services and then assists in the management of updates.

In various implementations, a core layout may describe the allowable relationships within scope of the platform. In some cases, the allowable relationships may include mobile managed services (MMS).

Extensions to the core layout may broaden the scope of relationships defined in the core layout through appending new domain layouts and mapping how the new domain layouts interrelate with the core layout and/or previous extensions. Various instances of northbound services being mapped to southbound fulfillment models may be implemented via the core layout and available extensions.

In various implementations, the core layout may act as a central point for connecting northbound and southbound services. The core layout may facilitate determination of how the usage cases described by the northbound services are fulfilled by the southbound services. In some cases a user interface (e.g., in the form of an online website or mobile application) may be used to guide a user through the configuration of an instance of the core layout and/or extensions. The process may generate an instance that maps a northbound service to fulfillment via one or more southbound services.

FIG. 1 shows example configuration logic 300 for configuration of services. The example configuration logic 300 may reference a service catalog to read options for the core layout, extensions, and northbound service definitions (302). The logic may apply an extension to the core layout to support one or more northbound service definitions or customizations of the core service (303). The extended core layout may capture allowable components for instance selection and currently deployed instances (304). The configuration logic 300 may determine the selected components for an instance by referencing the core layout (306). The configuration logic 300 may execute the components for the instance (308). The configuration logic 300 may reference the resultant instance back to the core layout to verify proper deployment of the instance (310).

The configuration logic 300 may implement discovery of effects introduced by the changes to the core layout through the extensions for the developed workflow (312). The configuration logic 300 may traverse the model (e.g., automatically or upon operator request) to find instances that have been deployed under other components that share the same parent (314). The logic 300 may notify the operator of the change (316).

Figure 15:
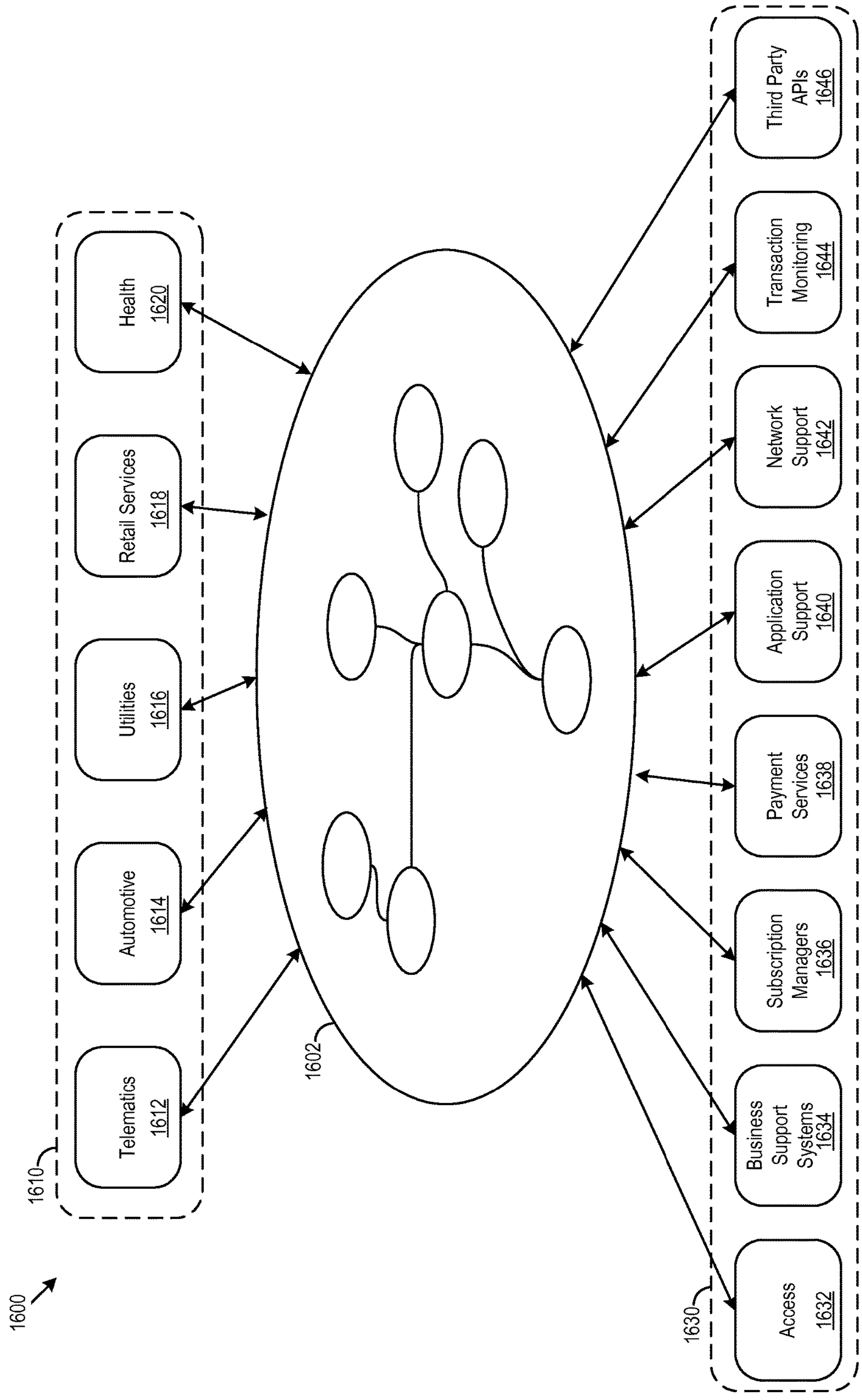
FIG. 15 shows an example service environment.

Turing now to FIG. 15, an example service environment 1600 is shown. In the example service environment 1600, a context aware architecture 1602, e.g. the configuration logic 300 and/or layout logic 700 (below), connects northbound services 1610, such as, telematics 1612, automotive functionality 1614, utility operation 1616, retail services 1618, health services 1620, and/or other northbound services, to southbound services 1630, such as, information access 1632, business support systems (BSS) 1634, subscription managers 1636, payment services 1638, application support 1640, network support 1642, transaction monitoring 1644, third party application programming interfaces (APIs) 1646, and/or other southbound services. In various implementations, northbound services may include digital products provided by a business or service system and southbound services may include the core capabilities provide by and/or provided to the business or service system.

Figure 16:
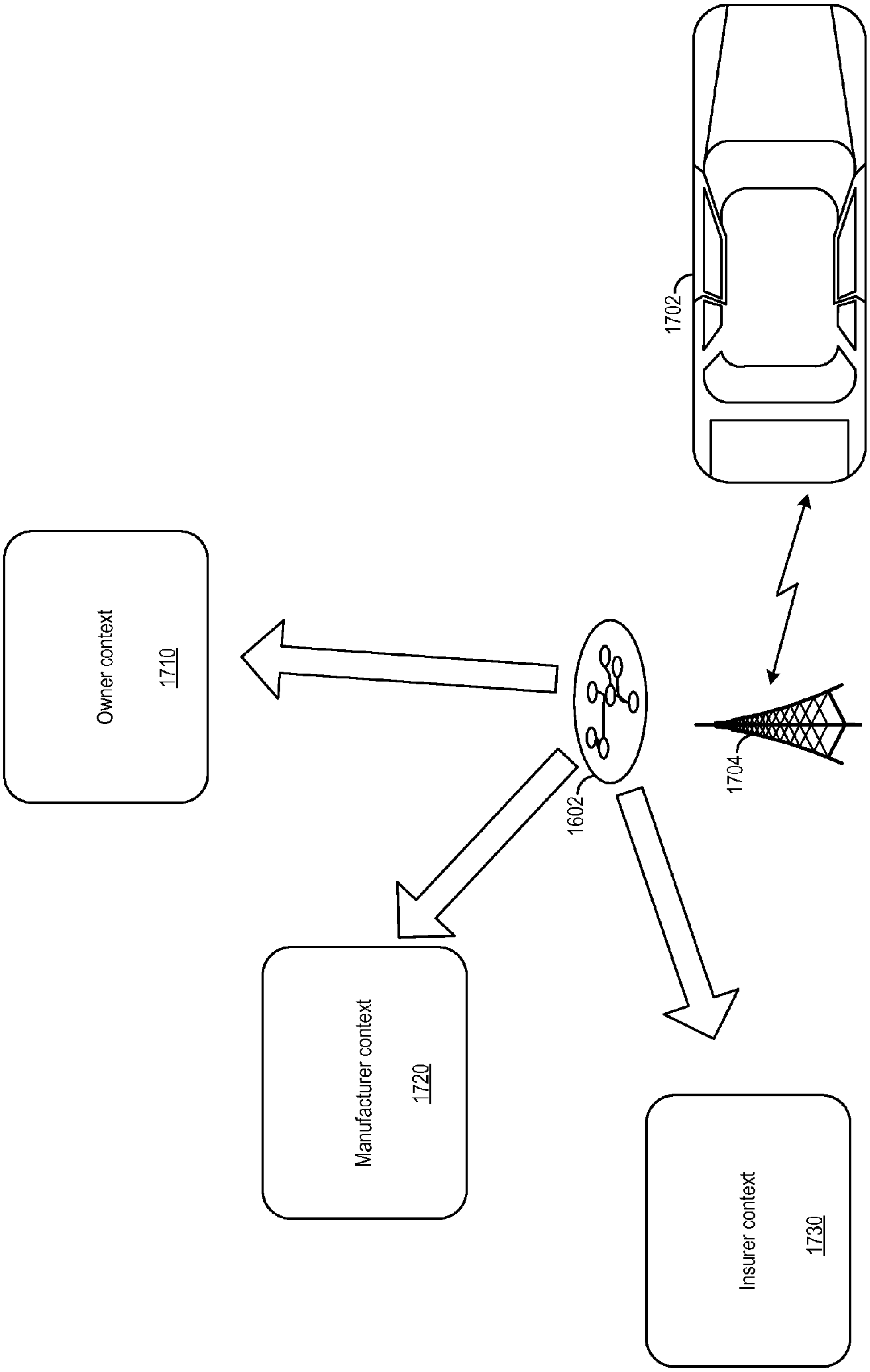
FIG. 16 shows an example service provision scenario.

FIG. 16 shows an example service provision scenario 1700. A "connected car" 1702 northbound service is provided in part by a wireless carrier 1704 southbound service. In the example scenario 1700, data harvested from the connected car may be abstracted by the context aware architecture 1602 for implementation in various contexts. For example, the contexts may include an owner context 1710, a manufacturer context 1720, and an insurance provider context 1730. In the example, the owner context 1710 may provide the owner and/or other operators of the car with data on driving habits and vehicle maintenance. The manufacturer context 1720 may provide the manufacturer with performance data on the car. The insurer context 1730 may provide the insurer safety data correlated with the driver and/or car.

In various implementations for various northbound services, the context-aware layout architecture may obviate some redesigns of data and services to support data and services for different types of interactions. Various northbound services may leverage the same underlying data, but the context for the data may be changed depending on the particular northbound service accessing the data. In the example scenario 1700, the owner, manufacturer, and insurer may use the same data resource, car connectivity, but for different contexts.

Various implementations may employ layout logic 700, discussed below, to map the northbound service offerings through the core platform model to the available southbound fulfillment services. In some cases, the layout logic 700 may output the resulting mappings of how southbound services fulfill offered northbound services in a manifest. For example, a manifest may include a file that lists southbound services and accompanying configurations used to support a particular northbound service.

Figure 7:
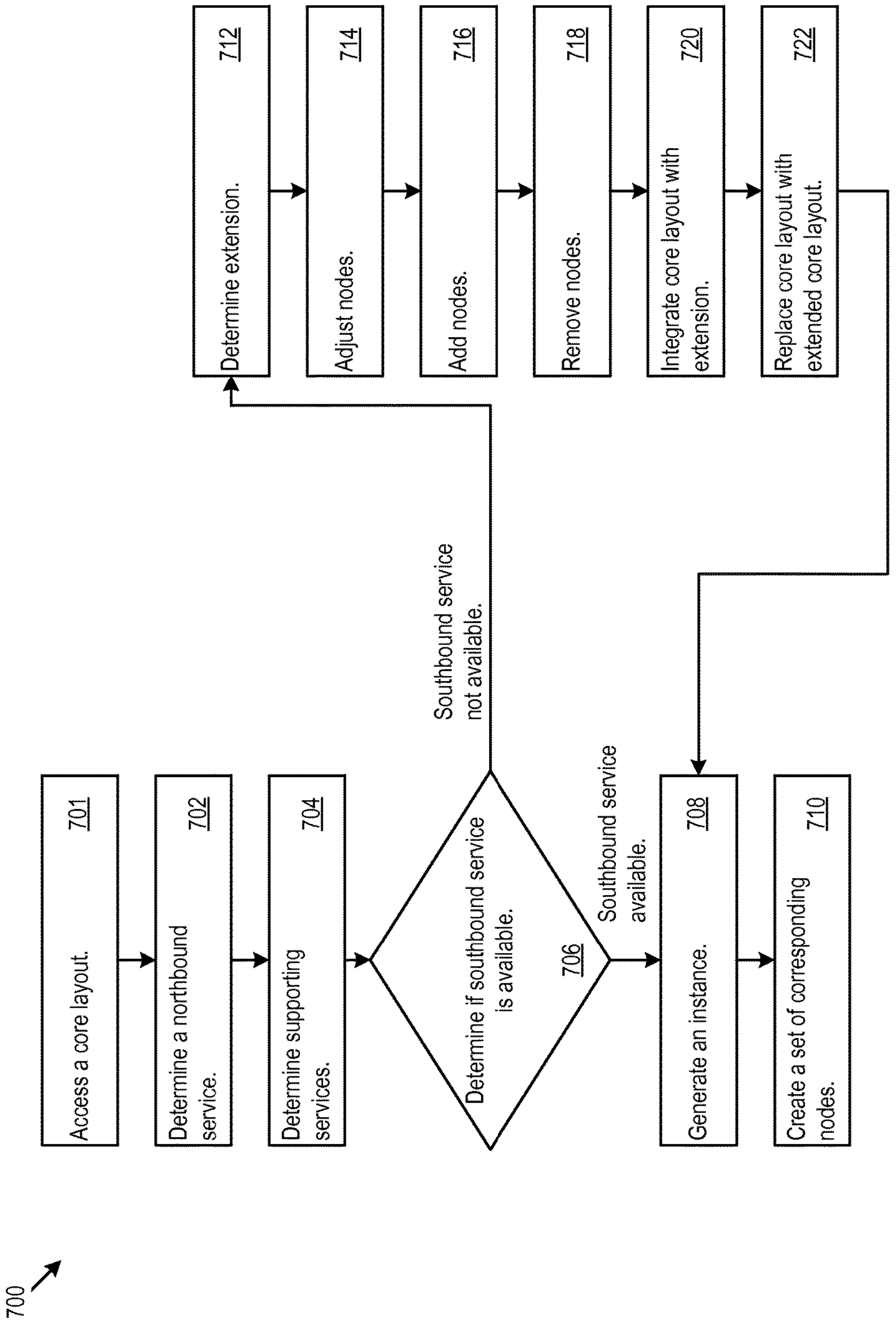
FIG. 7 shows example layout logic for management of infrastructure layouts.

FIG. 7 shows example layout logic 700 for management of infrastructure layouts. In various implementations the layout logic 700 may change, adjust, or integrate layouts. The layout logic 700 may traverse a path from a northbound service to fulfillment via a southbound service, integrate an extension into a core layout, and/or make an adjustment to one or more nodes in a layout.

The layout logic 700 may access a core layout (701). The layout logic 700 may determine a northbound service (702). The layout logic 700 may determine one or more services supporting the northbound service (704). The layout logic 700 may determine whether a southbound service is available for fulfillment of a selected service of the supporting services (706). If a southbound service is available, the layout logic 700 may a path from the selected service to the southbound service to generate an instance (708). Via the traversal, the layout logic 700 may create a set of nodes corresponding to the traversed nodes and edges to generate the instance (710).

If a southbound service is not available, the layout logic 700 may determine whether an extension may provide support for the unavailable southbound service (712). The layout logic 700 may adjust nodes in the core layout to support joining with the extension (714). The layout logic 700 may add nodes to the core layout to support joining with the extension (716). The layout logic 700 may remove nodes in the core layout to support joining with the extension (718). The layout logic 700 may integrate one or more nodes from the extension into the core layout (720). The layout logic 700 may replace the core layout with the joined core layout and extension (722). Once the extension is integrated, the layout logic 700 may proceed to traverse the newly formed path (708).

In some implementations, the core layout, extensions, northbound services, southbound services, and/or other aspects of the layout architecture may be described using a web resource layout platform. For example, a web resource layout platform may include a resource description framework (RDF) and layout logic 700 to capture and manage the fulfillment of the northbound services via the southbound services.

In various implementations, the southbound services may be accessed through one or more application programming interfaces (APIs). In some cases, the APIs may allow for adjustment of parameters for execution of the southbound services. Thus, northbound instances may be implemented via one or more API access based requests to the available southbound services.

In an example scenario, the infrastructure layout architecture may be used to support deployment of devices and services to implement Internet of Things (IoT) based services. For example, the IoT based services may include automobile connectivity, home appliance connectivity, health service connectivity, and/or other Internet integration services.

In some implementations, the core layout may include multiple cascading components. For example, an application platform layout may be cascaded over an infrastructure layout.

In an example cascaded scenario, the layout logic 700 may determine one or more application services and accompanying parameters to fulfill a northbound service. For example, the northbound service may include an organization specific service. Based on an analysis of northbound service for an application platform layout, the southbound fulfillment services may be identified and requested by the layout logic 700. In some cases, the northbound services of an infrastructure platform layout may supply the southbound service fulfillment for the application platform layout.

Layout logic 700 may determine the one or more infrastructure services and accompanying parameters to fulfill the southbound application services from the cascaded application platform layout. The infrastructure layout may include software code repositories, compute commands, scripts, variables, and/or other components that can be used to populate a deployable manifest.

The cascaded approach may be extended beyond two cascaded layouts. For example, another cascaded layout, e.g., describing details of cloud functionality and/or of a sensor platform, can be cascaded below the infrastructure layout. Additionally or alternatively a cascaded layout may be added above the northbound models describing the organization specific service.

In various implementations, the various cascaded layouts may be implemented with their own independent layout logic 700 for organization and execution. However, in some implementations, multiple cascaded layers may be controlled by unified layout logic 700. Additionally or alternatively, distinct, interoperable layout logic 700 instances may be used to control the cascaded layers.

As discussed above, the core layout, northbound services, and southbound services may be represented in a web resource layout. Table 1 shows an example RDF-based layout that captures a triple including a subject, predicate (e.g., relationship), and object. The triple describes how the subject relates to the object. In the example RDF-based layout, the project is a northbound service and the application platform is a southbound service supporting the northbound service.

| Subject | Predicate | Object |
|---|---|---|
| Project | Has Product | Organization Product |
| Application Platform | Supports Product | Application Product |
| Product | Has Capability | Capability |
| Product | Requires Capability | Capability |
| Product | May Have Optional Capability | Capability |
| Product | Has Max Number of Capabilities | M (an integer >0) |
| Product | Has Min Number of Capabilities | N (an integer >0 and <=M) |
| Capability | Is Implemented By | Application Service or Script |

The RDF format differs from relational database tables whose relations are pre-defined at design time and are implicit across the rows and columns of a table. Instead with RDF, relationships are explicitly stored as properties. In a graph based representation, these properties may be associated with the edges that connect vertices in the graph. The explicit storage of these relationships provides the context for interpretation of the parameters for configuration of the service or product. Further, storage of the relationship in addition to the parameter allows for alteration of the relationship without altering the parameter and vice versa. The independent adjustment of these factors allows the layout logic 700 to support extensions or changes to northbound services via adjustment of relationships or parameters rather than using a single degree of freedom.

Figure 2:
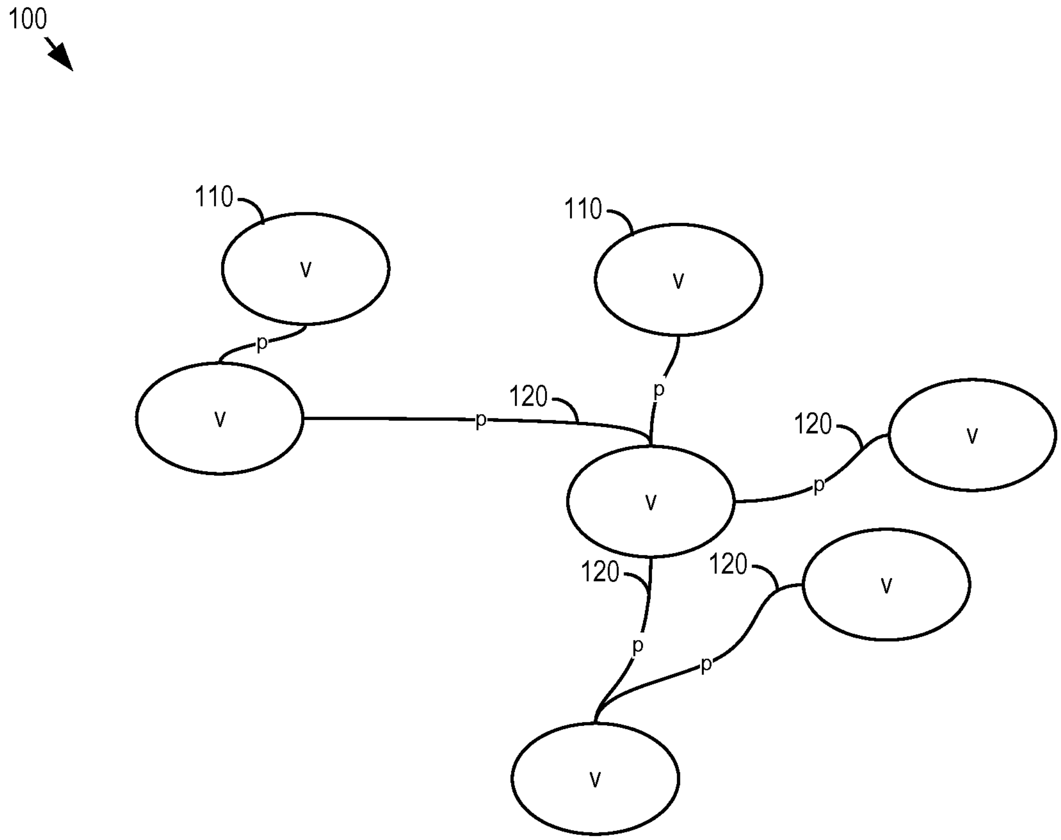
FIG. 2 shows an example layout.

FIG. 2 shows an example layout 100. The example layout 100 includes vertices 110 and edges 120. Edges may also be assigned properties p that describe the predicate relationship. Additionally or alternatively, the layout logic 700 can attach rules to the individual vertices v. The attached rules may govern the allowable edges based on basic operations on the edge properties of the individual vertices v. For example, if a Webapp is deployed on Internet Information Services (IIS), e.g. a web server, a rule may assert that the operating system be a Windows-based operating system. Rules may be modeled in a rule language, and may be evaluated using a rule engine, e.g. the layout logic 700. Examples of rule languages include SPARQL rules, SPIN, RuleML, and Drools. Rules may be used for verification or deployment of configurations. In the example above, if an application uses IIS, but designates Linux as the operating system, the system will identify the deployment configuration as invalid. In the example, when an operator creates a deployment configuration using the layout logic 700, e.g. via a wizard application, Windows may be recommended as the operating system, based on rule evaluation.

The following pseudocode is an example SPARQL protocol and RDF query language (SPARQL) implementation to support verification of the example rule above:

```
ASK WHERE {?WebApp :hosted_on ?WebServer.
           ?WebServer rdf:type :IIS .
           ?WebServer :has_operating_system ?os .
           ?os rdf:type :Windows
}
```

The following pseudocode is example SPARQL rule implementation to support configuration consistent with the example rule above:

```
CONSTRUCT {?WebServer :has_operating_system ?os}
WHERE {?WebApp :hosted_on ?WebServer .
   ?WebServer rdf:type :IIS .
   ?os rdf:type :Windows
}
```

Figure 3:
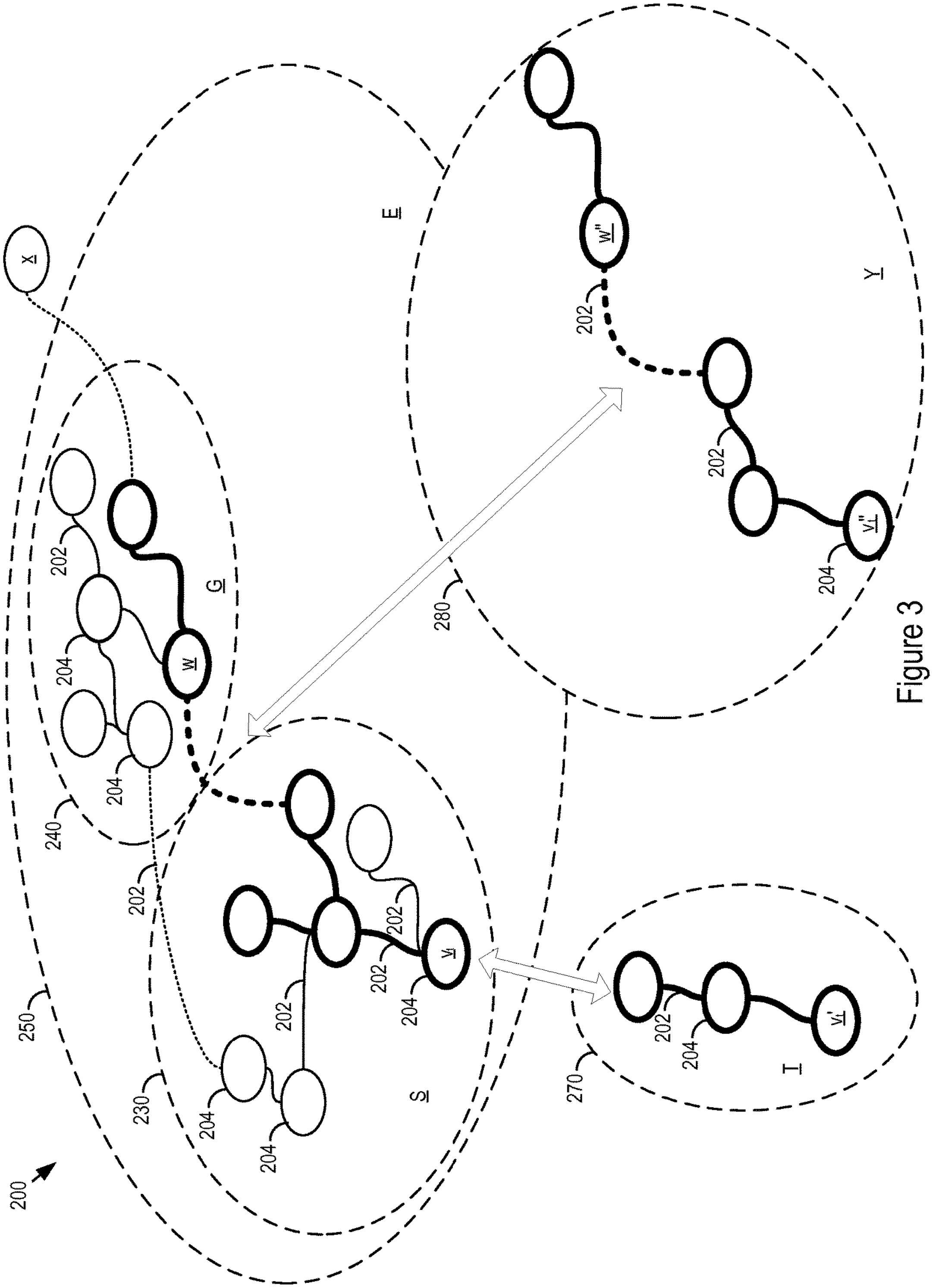
FIG. 3 show an example graph of an extension to a core layout.

FIG. 3 shows an example graph 200 of an extension to a core layout. Portion S 230 may correspond to the unextended core layout and may include edges 202 and nodes 204. The unexpended core layout, portion S 230, may be extended with additional domains by, for instance, mapping an additional domain G 240 to a subset of S 230. The resultant portion E 250 is an extension that includes S 230, G 240, and how the domain G 240 relates to S 230. Thus E 250 is the extended core layout of S 230, which captures the mapping the extension G 240 to S 230.

To on-board a new northbound or southbound service to a core layout (portion S 230), the layout logic 700 may generate a new graph portion T 270 that includes subclasses and types from a sub graph of the core layout S 230.

For node $v_t$ from the portion S, a new node $v_t'$ in T 270 that inherits attributes, properties, and rules associated from $v_t$ in S 230. In some cases, an instance may map to a subset of the core layout when full capability is not used or fulfilled, for example, when a vendor product implements a specific subset of the capabilities of a service provision system.

In some implementations, T 270 may also capture additional attributes, properties, and vertices and edges not included S 230. For example, T 270 may rely on portions of the extended core layout E 250. Additionally or alternatively, T 270 may remove attributes, properties, vertices, and edges in S 230.

The layout logic 700 may check that $v_t'$ adheres to inherited rules. The layout logic 700 may also generate indicators of exceptions where $v_t'$ in T 270 does not adhere to a rule for $v_t$. The layout logic 700 may then relate $v_t'$ to $v_t$ by applying a property. For example, the nodes may be related using the property: 'subclass_of' and/or another relationship. This relationship may be generalized to connect T 270 and S 230. Additionally, the relationship generation may be repeated for nodes v' within T. The layout logic 700 may then replace S 230 as the core layout with the connected T 270 and S 230 layout to accommodate the on-boarded northbound or southbound service.

Additionally or alternatively, an input to the layout logic 700 may specify an instance T 270 of the core layout S 230, where T 270 captures a specific configuration of a subset of S. For example, the input may be supplied from a user interface, such as a wizard application like the service catalog, that facilitates navigation from an initial subset of vertices v in S 230 and queries the user about which vertices include and how to configure the vertices and edges in the selected subset. The subset of S 230 that is presented to the user may depend on the initial location of the vertex in S 230 and the rules to the attached vertex and the edges.

Once the input indicates the inclusion of a node v from S, the layout logic 700 may create a vertex v' in T 270 that inherits attributes, properties, and rules associated v in S 230. In some cases, the layout logic 700 may attach instance specific properties to selected vertices and edges.

As discussed above, T 270 may include elements, such as attributes, properties, and vertices and edges, not in S 230 or may omit elements present in S 230. The layout logic 700 may check that vertices adhere to inherited rules. The layout logic 700 may also generate indicators of exceptions where vertices in T 270 do not adhere to one or more rules form S 230.

Additionally or alternatively, a template may be used to identify a subset of S 230 that forms T.

Northbound services may be treated as fulfilled where one or more vertices in the core layout representing the northbound service are connected, via other vertices or edges, to one or more vertices representing southbound services.

Additionally or alternatively, the layout logic 700 may update the extended layout E 250. For example, an operation may include the layout logic 700 deleting or adjusting a vertex or an edge in G 240. For example, a vertex v in E 250 may be transformed to vertex w through property adjustments. In the case of instance Y 280 that overlaps with extension G 240, the layout logic 700 may record a corresponding transformation of w to w" within Y 280. For deletions or adjustments to edges within E, the corresponding edges in the Y 280 may be updated.

Additionally or alternatively, the layout logic 700 may add vertexes in E 250. In some implementations, the addition of a vertex in E 250 may be handled similarly to the addition of an edge that is considered linked through E with a relationship. For example, such an addition may include a vertex x that is either a source that connects to E or a destination that is connected to a source vertex in E.

In some implementations, a list L of one or more instances may be maintained by the layout logic 700. Upon detection that such a change impacts a list of instances L, the layout logic 700 main send a trigger to the instances to initiate regeneration of deployment artifacts. In other words, the layout logic 700 may determine if the changes alter interactions between northbound and southbound services. To avoid improperly linked services and/or out of date deployments, the instances are regenerated to such that the instances are in compliance with the adjusted, added, or deleted elements in the instance.

In various implementations, a fulfilled northbound service may be stored as a template. In some cases, the template may include a text representation of the resources and services on which the northbound service depends. For example, the text representation may include a YAML ain't markup language (YAML) file, a JavaScript object notation (JSON) file, and/or an extensible markup language (XML) file. The template may include indications of resources and/or dependencies for creating, maintaining, deleting, and/or performing other lifecycle operations on the northbound service stack. In some cases, the template may instantiate the resources and dependencies by assigning stored property values.

In an example scenario, a core layout may be used to by the configuration logic 300 to map multiple enterprise systems. In the example scenario, a core layout is generated by the logic 300. The core layout may be mapped to a first enterprise model and a second enterprise model. The core layout may then provide a basis for comparison between the first and second enterprise models because it supplies a common mapping. Additional enterprise models may be onboarded by the logic 300 through relation to the core layout. Similarly, these additional models may be related, by the logic 300, to the first two through the core layout basis.

In some cases, the enterprise models may include physical models with specific indicators of physical storage locations. The physical location indicators may also be compared by the logic 300 using the core layout as a common basis.

In the case of physical models, the core layout provides the linking between the physical location model and an application making use of the resource. However, the application works starting with the data available in the core layout. The core layout provides the application with an abstraction layer, e.g., a virtualization layer, between the application and the particular physical or enterprise model. Thus, once given access to the core layout, the application need not necessarily know the specifics of the enterprise model. However, the relationships among different enterprise models may be discerned as discussed about using comparisons with the core layout as a common reference.

When a change occurs in an enterprise model, the logic 300 may reference the core layout to determine how to propagate the change. The core layout provides the linking to applications that may need adjustment in reference to the change. However, since the core layout provides an abstraction layer, in some cases, the change to the core layout instance may enforce the change without necessarily making changes to application parameters. For example, if the in the enterprise mode change is with the content, the system may re-examine the SQL queries at the abstraction layer. Additionally or alternatively, if the change is with an authentication function then the implementation of one update solves all the enterprise model access issues across multiple applications using the abstraction layer. For other applications that do not use features of the core layout that connect to the changed components of the enterprise model, no change occurs.

The core layout may also be used by the logic 300 to identify applications that use features similar to the changed portions of the enterprise model. Thus, the applications may be able to adjust operation to take advantage of added capabilities or altered capabilities. For example, the change to the enterprise model may offer access to new datastores including images. Some applications already using image datastores may be notified despite the fact that the current operation of the application would not necessarily be affected by the change to the enterprise model.

Harmonization among multiple enterprise models may be implemented through the core layout. Applications may send queries that may be disambiguated for objects/resources in the core layout namespace. Harmonization, as applied by e.g., the logic 300, may translate the queries into a common semantic space. For example, Metanautix queries from the applications may be translated into the core layout namespace. Then a data virtualization product (e.g., Metanautix) may be setup to access the datastore specific interface through the core layout.

Figure 32:
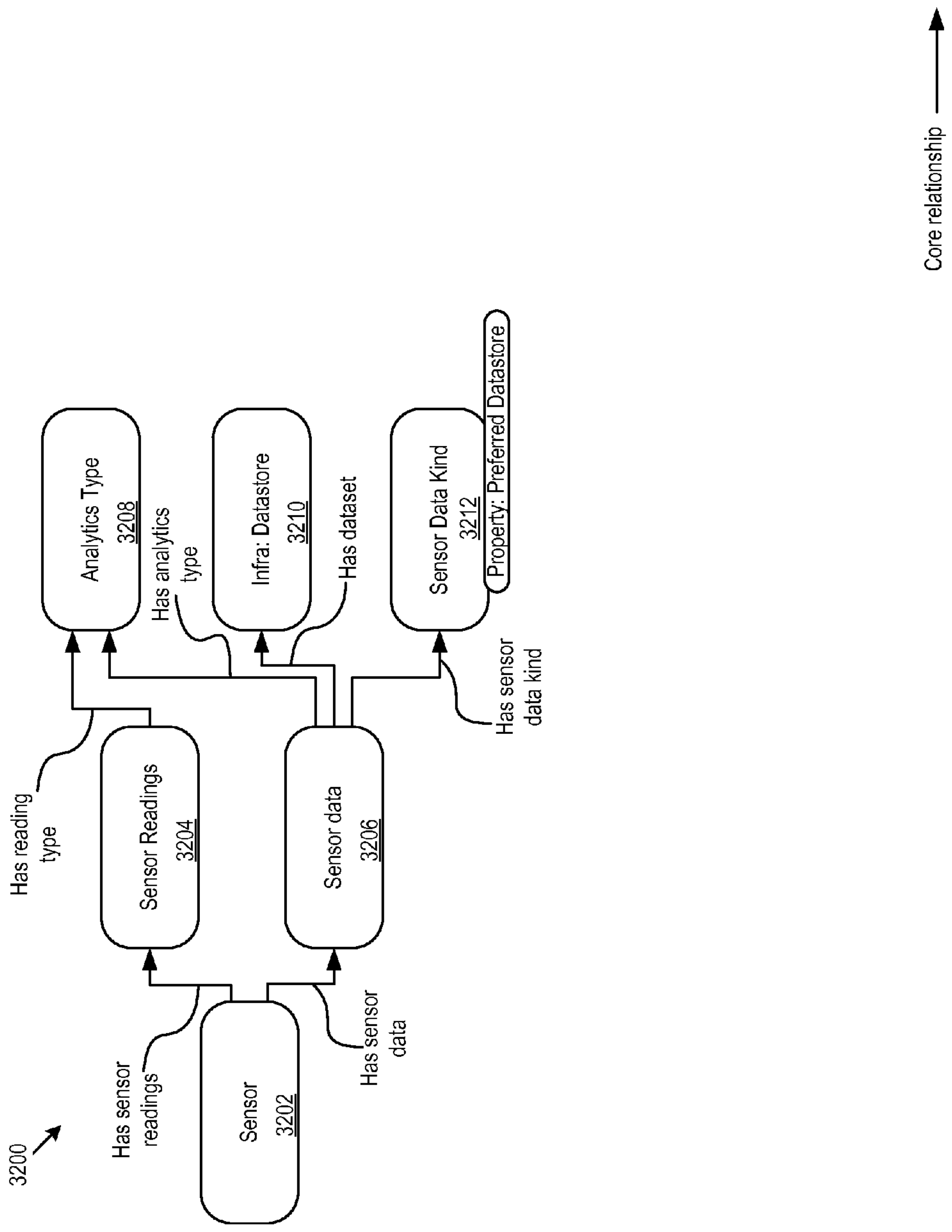
FIG. 32 shows an example core layout.

Moving now to FIG. 32, an example core layout 3200 is shown. The example core layout 3200 may be used for onboarding and management of sensor and collected sensor data for a control system. For example, the core layout 3200 may be used as a logical infrastructure for sensor management it an actuator control system, such as a district metered area used by a water utility company.

The sensor 3202 may have sensor readings 3204 and sensor data 3206. The sensor readings 3204 may define the nature of sensor data 3206 collected from the sensor 3202 and may influence how the sensor data 3206 is analyzed. In some implementations, sensor readings 3204 may include the quantity measured by the sensor and sensor data 3206 may include information collected from the sensor. For example, sensor readings 3204 may be instantiated as a parameter such as pressure. Sensor data 3206 may be instantiated as a collected times series of recorded pressure readings.

The sensor data 3206 may have a sensor data kind 3212 and a datastore 3210 where the sensor data 3206 is sent for storage. In the example core layout, the datastore 3210 may be determined via inference based on other inputs. For example, the datastore may be selected based in part on the sensor data kind 3212. In the example, the sensor data kind 3212 may have an associated property. The associated property may include a preferred datastore for the sensor data kind 3212. In some cases, the preferred datastore property may be determined based operator input.

In other cases, parameters such as data purpose, frequency of data collections, data volume, bandwidth consideration, frequency of access or other data parameter may be used to determine constraints on datastore performance and capabilities. In some implementations, an algorithm, such as an optimization algorithm, may be used to select a preferred datastore. As discussed above, the preferred datastore property may be used to infer the datastore 3120 fulfillment selection. Over time, sensors can generate vast quantities of data. Layout databases may accommodate such data. However, in some cases, layout operations may be faster when smaller amounts of data are stored within the layout. The majority of the sensor data may not necessarily be in active use by the layout system. Therefore, in some cases, portions of the sensor data may be passed to datastores, e.g., object storage, cloud storage, data lakes, for storage outside the layout. References for retrieval of the data from the datastore may be held within the layout in place of the bulk data.

The core layout may define an analytics type 3208 that may be used to process the sensor data 3206 and sensor readings 3204. The core relationship between the analytics type 3208 and the sensor data 3206/sensor readings 3204 is a “has analytics type” relationship.

Figure 33:
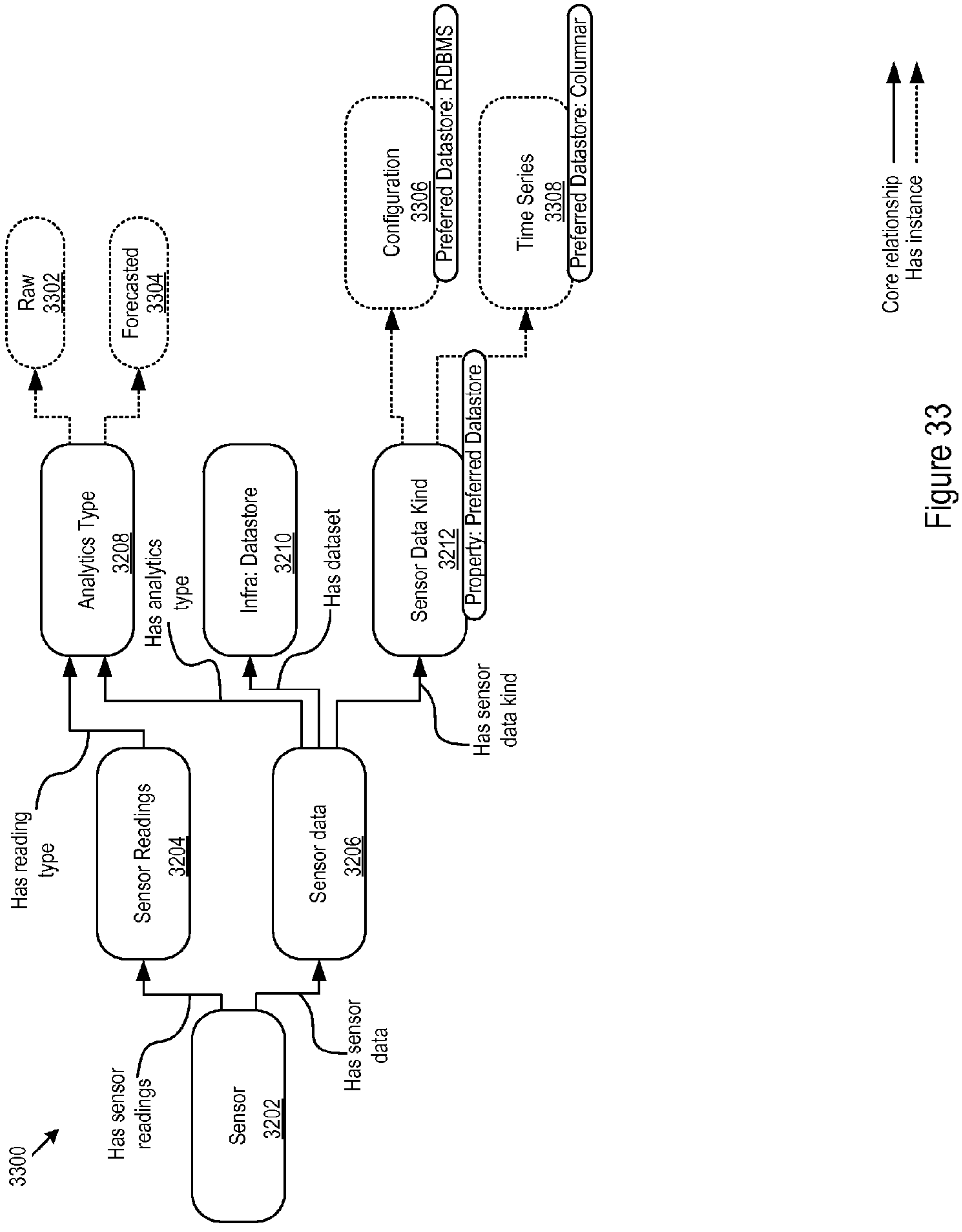
FIG. 33 shows an example instantiated version of the core layout of FIG. 32.

Instances of the analytics type 3208 and sensor data kind 3212 may be defined by the core layout 3200. FIG. 33 shows an example instantiated version 3300 of the core layout 3200. In the example, the analytics type 3208 may be implemented to produce raw 3302 status-type outputs showing the current state of the data or system. Additionally or alternatively, analytics type 3208 may be selected to produce forecasted 3304 states based on the current data.

In the example instantiated version 3300, the sensor data kind may be configuration 3306 data or time series 3308 data. The preferred datastore for configuration 3306 data may be RDBMS, and for time series 3308 data, the preferred datastore may be columnar type storage.

Figure 34:
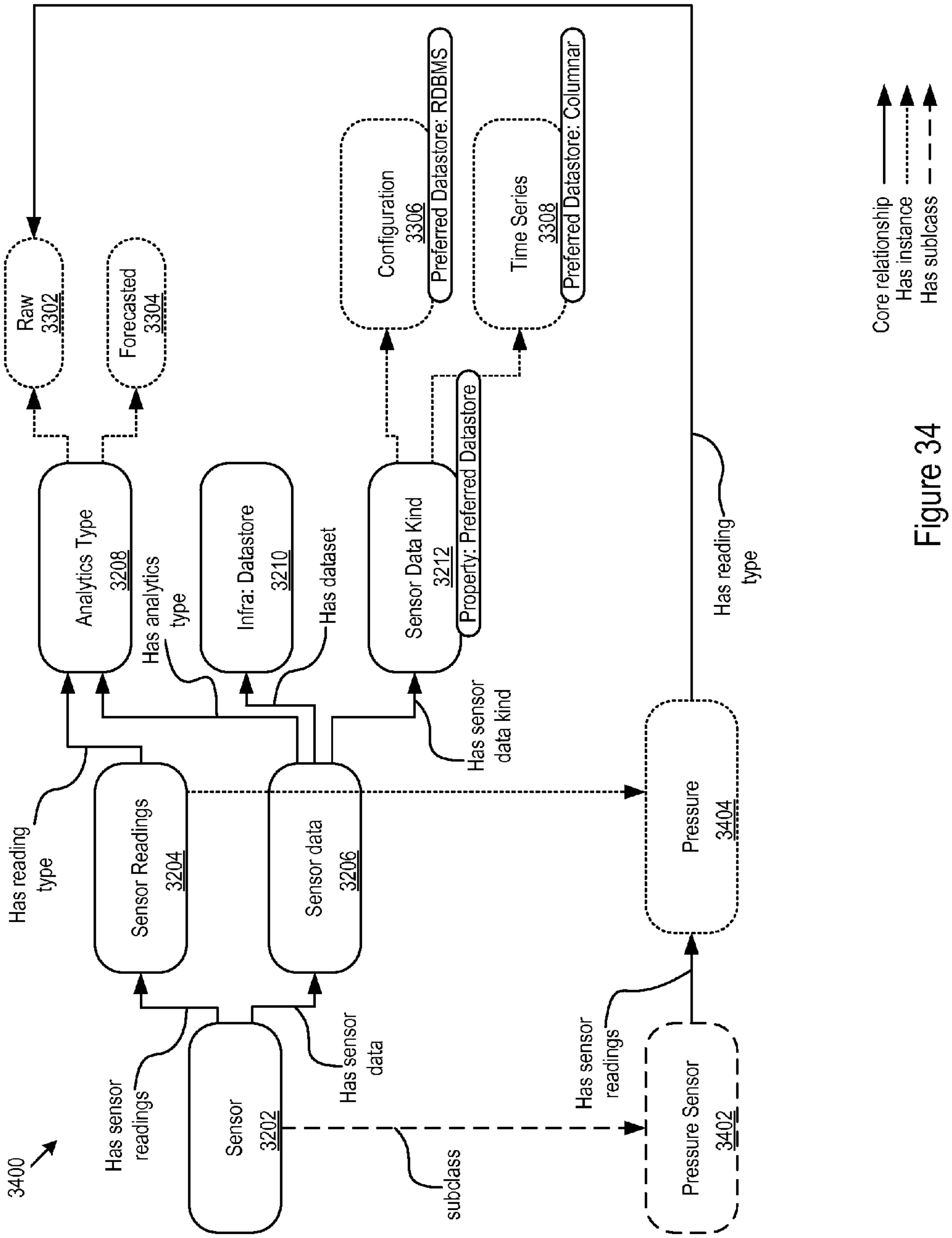
FIG. 34 shows an example extended core layout.

Moving to FIG. 34, an example extended core layout 3400 is shown. In the extended core layout 3400, the core layout 3200 is extended to include a subclass of sensors which are pressure sensors 3402. The pressure sensor 3402 subclass inherits relationships of the parent class. For the subclass, the sensor readings 3204 may be instantiated as pressure 3404 and the analytics type for the sensor readings may be raw 3302 in this example. Thus, a subclass may inherit properties of a parent and overwrite general properties with specifics in certain cases.

Figure 35:
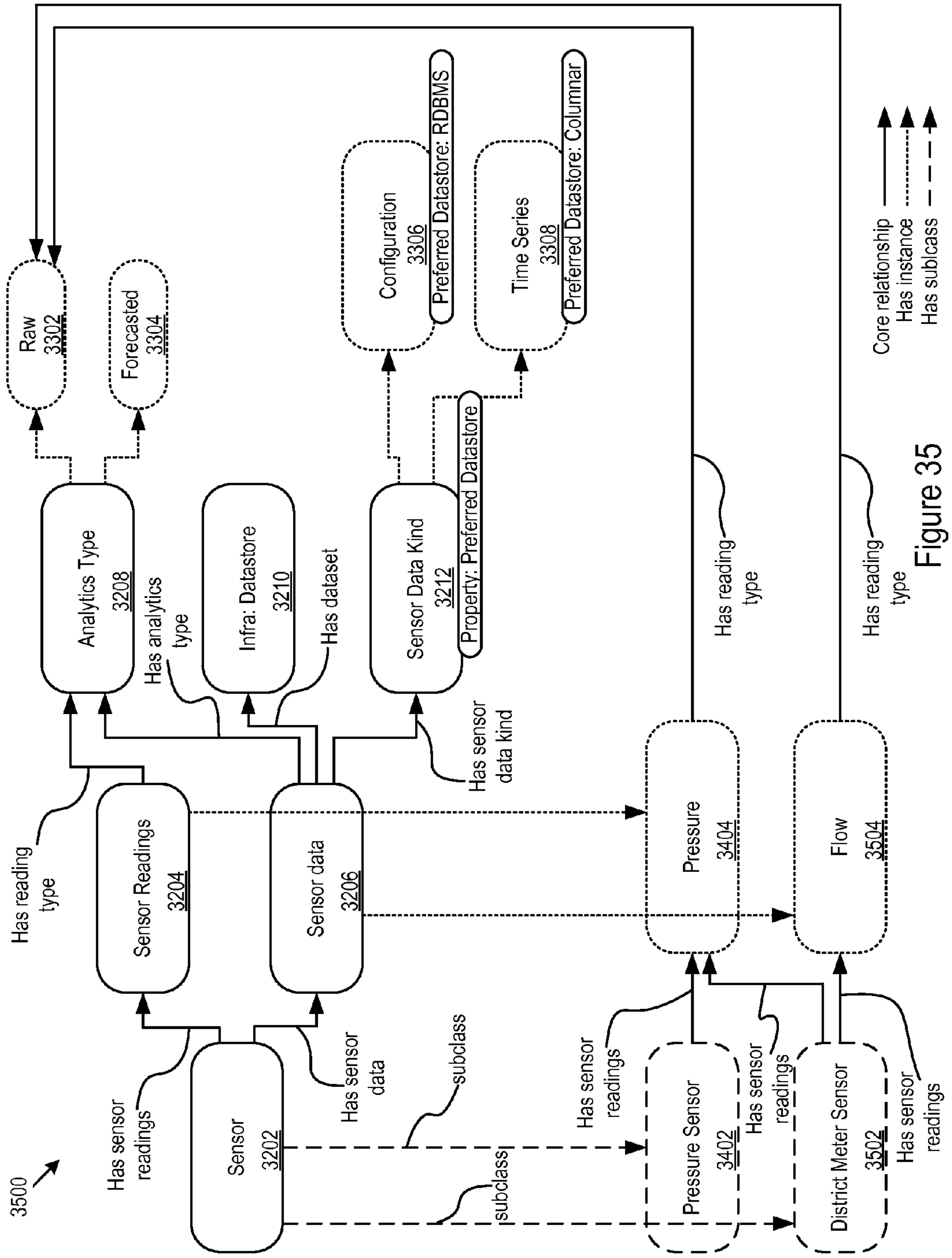
FIG. 35 shows another example extended core layout.

FIG. 35 shows another example extended core layout 3500. In this example, another subclass of sensor is added.

The district meter sensor 3502 subclass include two sensor readings types, pressure 3404 and flow 3504, which have raw analytics types.

Figure 36:
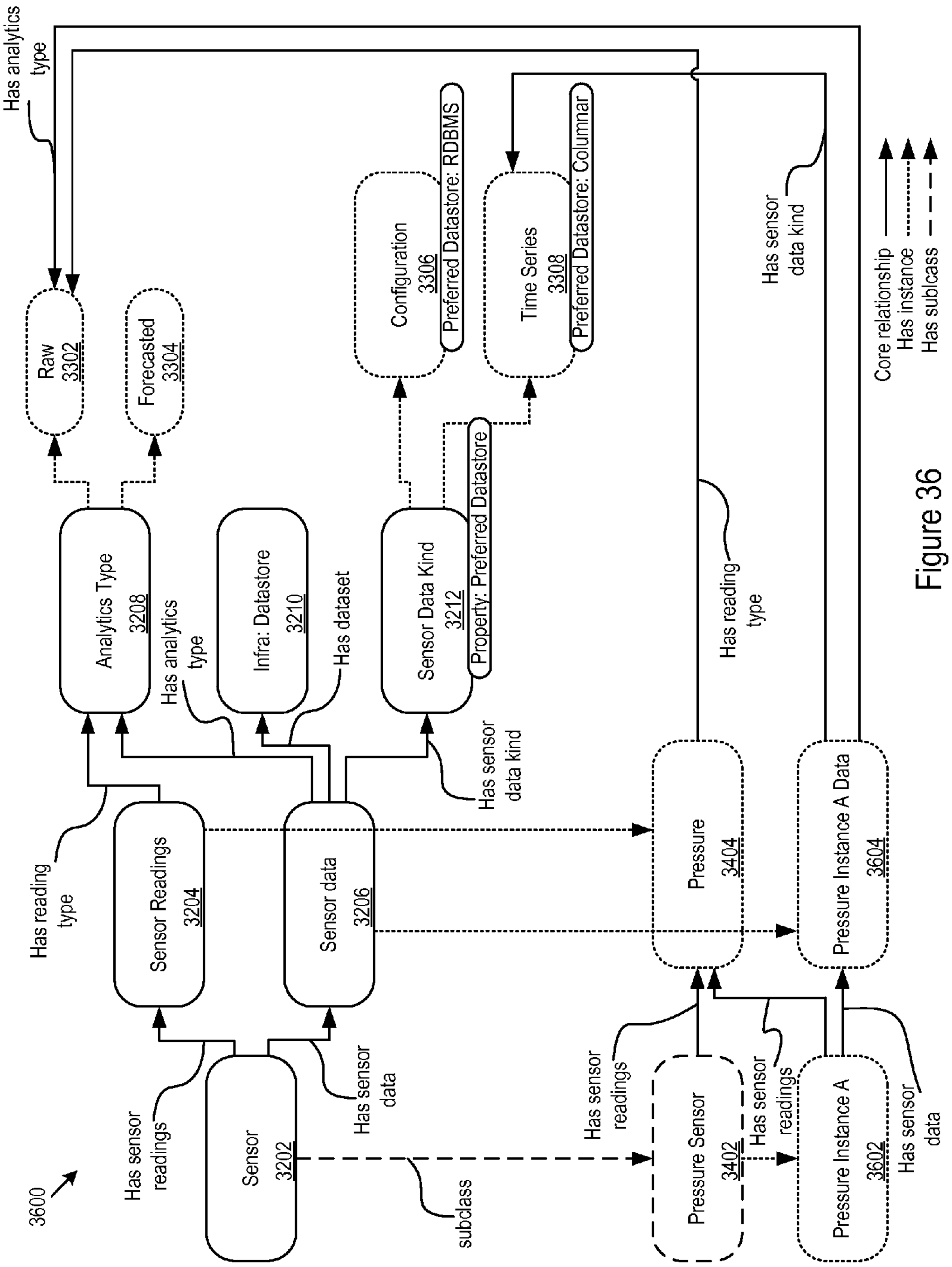
FIG. 36 shows an example instantiation of the example extended core layout of FIG. 34.

Moving now to FIG. 36, an example instantiation 3600 of the example extended core layout 3400 is shown. Pressure instance A 3602 has the properties of the pressure sensor subclass which may be inherited from the general sensor 3202 core layout node. The specific sensor readings may be specifics overwritten for the pressure sensor 3402 subclass. Pressure instance A may generate pressure instance A data 3604, which may be an instance of the sensor data 3206. The pressure instance A data 3604 may have time series 3308 for sensor data kind 3212. Further raw 3302 analytics type may be used with the pressure instance A data 3604.

Figure 37:
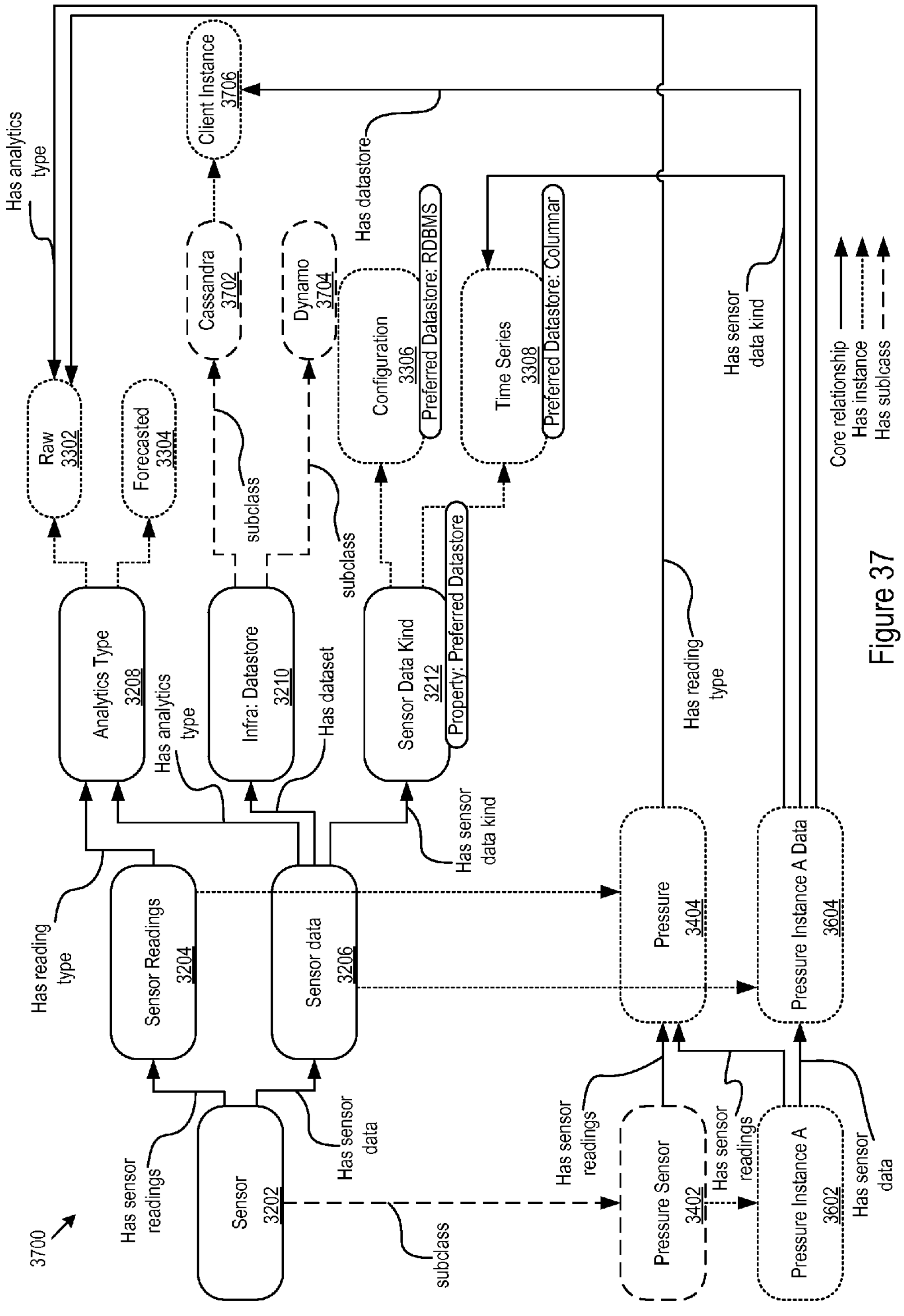
FIG. 37 shows another example instantiation of another extended core layout.

FIG. 37 shows another example instantiation 3700 of another extended core layout. In the example, the extended core layout 3400 has been further extended with two subclasses 3702, 3704 for the datastore class 3210. The Cassandra 3702 subclass may implement a Cassandra datastore. Similarly, the Dynamo 3704 may use a Dynamo datastore. An example client instance 3706 may is shown under the Cassandra 3702 subclass. The client instance 3706 may store the time series data collected from pressure instance A 3602.

Figure 38:
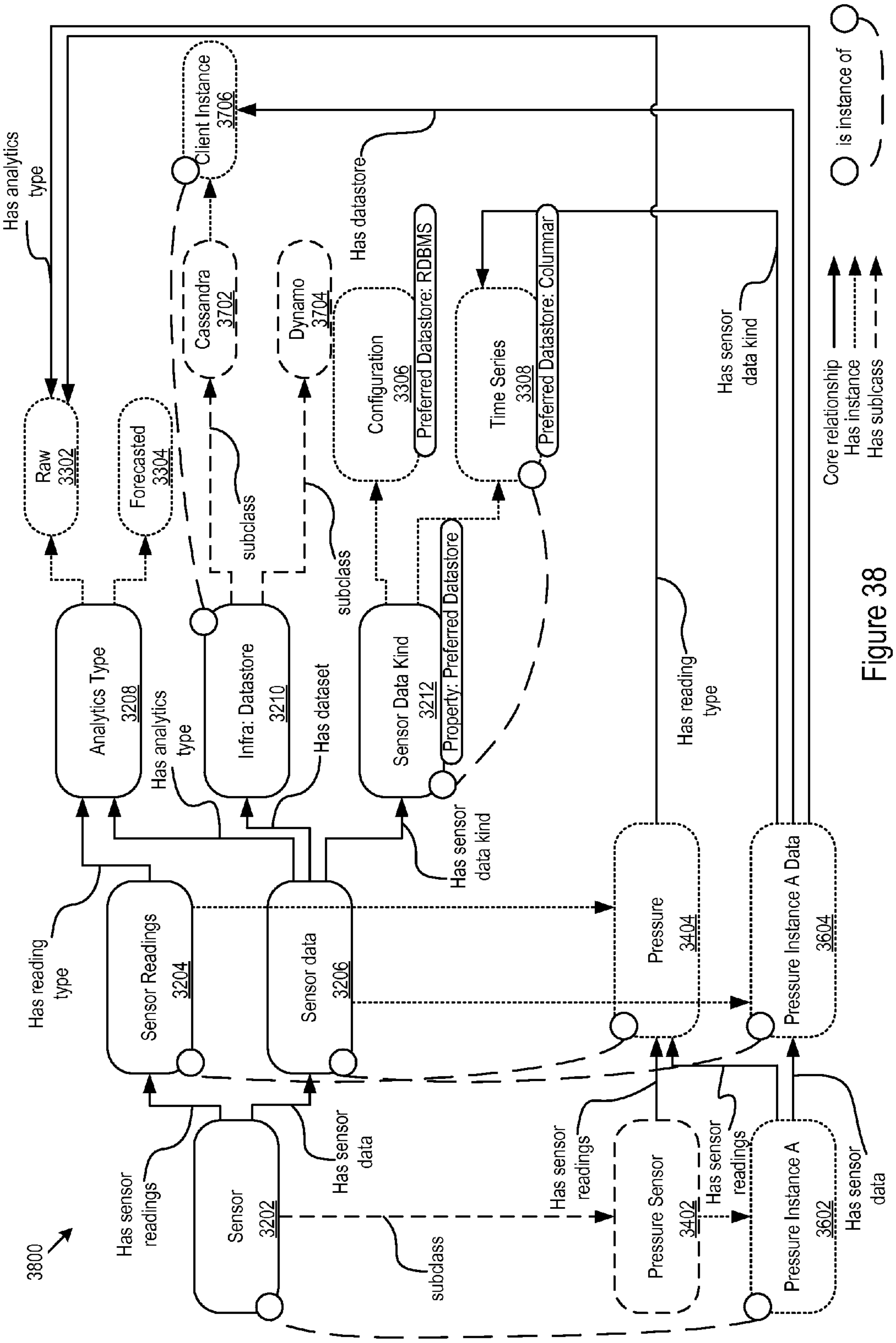
FIG. 38 shows the example instantiation of FIG. 37 with links between specific instances and core layout classes.

FIG. 38 shows the example instantiation 3700 with links 3802 between specific instances and core layout classes. In the example, the sensor 3202 class is instantiated as pressure instance A 3602; the sensor data 3206 class is instantiated as pressure instance data A 3604; the sensor readings 3204 are instantiated as pressure readings 3404; the sensor data kind 3212 is instantiated as time series 3308; and the datastore 3210 is instantiated as client instance 3706 under the Cassandra subclass 3702.

Workflow Generation

In some cases, cloud providers may have individualized application management systems. Therefore, the actions used to configure, generate and execute a workflow including application infrastructure lifecycle events, such as, installations, application configurations, starts, stops, deletions or other application infrastructure lifecycle events, may differ from provider to provider. For example, when deploying a MySQL database service, one may first create a virtual machine, configure the Operating System, install and configure the MySQL server, populate the database, and then grant the selected permissions to selected users. However, this process and its particulars may vary for other database services or vary across providers. When switching between the individualized application management systems, processes generated for a first system may not necessarily be immediately portable to a second system. For example, AWS OpsWorks uses actions definitions that are specific to the AWS cloud.

Some cloud automation tools, such as, RightScale, vFabric Application Director have been developed to reduce the friction when migrating applications from one cloud to another. However, these automation tools may rely on proprietary models. Some standardized cloud models have been proposed to model the lifecycle of the cloud applications, such as topology and orchestration specification for cloud applications (TOSCA). However, these tools may not necessarily provide a systematic way to extend this standardized model to apply global optimization policies or hierarchical based policies during workflow generation or to verify the cloud service along its lifecycle.

In various implementations, the deployment and/or management of cloud services requires orchestration of lifecycle events/operations of multiple components. Because the events/operations of different components can be generated and/or executed in varied orders, unanticipated interactions among the components may occur. In some cases, these unanticipated interactions may lead to failures. The large number of interactions likely to occur coupled with the wide variety of cloud capabilities presents challenges in generating feasible workflows that execute as expected.

The space of possible interactions in a given information technology (IT) infrastructure domain may be large. For example, there are many options for provisioning a DBMS server and populating a database on the server. A first implementation may provision a SQLServer database server on Windows Operating System using an AWS elastic compute cloud (EC2) instance. Additionally or alternatively, an implementation may use a MySQL database server on the Ubuntu Operating System using the Google Compute Engine (GCE). Individual components for these examples may create a large number of dependencies. Further, the components may also have different requirements; preferences; and policies for different users, organizations and/or environments. Exhaustively enumerating the workflows that satisfy these may be a challenge.

Executing individual events in a workflow may result in differing states depending on the event. In some cases, tests may be performed on the individual possible states when changes are made. However, because of the large number of execution order permutations, performing these tests may consume significant resources.

Test oracles are mechanisms that determine whether a workflow has been executed correctly. In some cases, test oracles may interleave their verifications with event/operations because an incorrect state may prevent further execution of the process. For example, an event in a process may not be allowed if an incorrect state results at the time of execution for the event. Thus, execution of the workflow may be terminated as soon as an error is detected to preserve resources. Additionally or alternatively, interleaved verification may be used to facilitate error identification. For example, interleaved verification may allow a system to determine a faulty event based on the detection of an erroneous state following the execution of the event.

Figure 8:
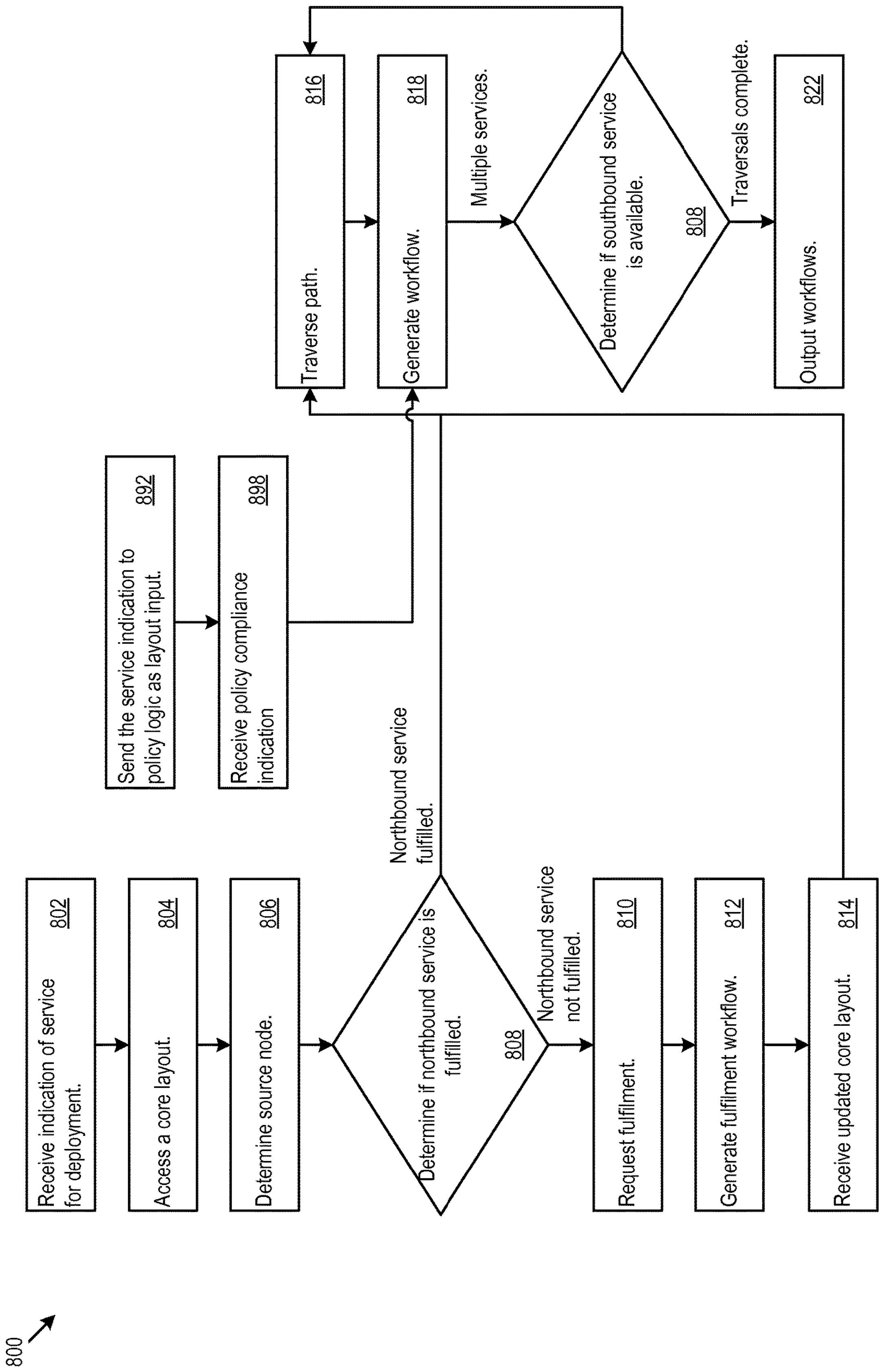
FIG. 8 shows example flow generation logic.

FIG. 8 shows example flow generation logic 800. The flow generation logic 800 may receive an indication of a service for deployment (802). For example, an operator or external application may determine to deploy a northbound service. Additionally or alternatively, the operator or external application may be collecting deployment workflows for future deployment and/or evaluation of competing deployment workflow comparisons. The flow generation logic may access a core layout (804). Based on the northbound service, the flow generation logic may determine a source node (806). The flow generation logic may determine whether the source node, representing the northbound service, is fulfilled by one or more southbound services (808). If the northbound service is not fulfilled, e.g. no paths connecting to southbound services in the core layout, the flow generation logic 800 may send a request to the layout logic 700 to alter the core layout to fulfill the northbound service (810). For example, the flow generation logic 800 may request that the layout logic 700 apply one more extensions to the core layout to support the service. In some cases, the extensions may themselves be available as northbound services, and the flow generation logic 800 may generate a workflow to support implementation of the extensions (812). Once the adjustment to the core layout is made, the flow generation logic 800 may receive the updated core layout with the fulfilled northbound service from the layout logic 700 (814).

When the northbound service is fulfilled, the flow generation logic 800 may traverse the path from the source node to a destination node representing a fulfilling southbound service (816). The flow generation logic may generate a workflow based on the components, dependencies, and/or relationships traced along the traversed path (818). The flow generation logic 800 may determine whether multiple southbound services provide fulfillment for the selected source node (820). For example, a northbound service may depend on multiple southbound services and/or redundantly fulfilled by multiple southbound services. When multiple southbound services provide fulfillment, the flow generation logic may repeat the traversal for the remaining southbound services and corresponding destination nodes (816). Once the flow generation logic 800 has completed tracing the paths to the destination nodes, the flow generation logic may output the workflows (822). For example, the workflows may by ordered scripts to support deployment of the northbound service.

In various implementations, workflow generation based on the context-aware infrastructure layout architecture may facilitate predictable execution of the workflows across different cloud environments. The core layout may provide a hierarchical graph-based model of a service provision system. In some cases flow generation logic may traverse the core layout and enumerate paths that satisfy various service components, such as northbound or southbound services. In an example implementation, an RDF representation may be used to represent the TOSCA model. The combination may facilitate modelling of IT infrastructure components, deployment artifacts and lifecycle scripts, and the relationships among the components, artifacts, and scripts. In some implementations, roles may be supported. The roles may be used to model different users, organizations and environments. The roles may be used to create a query library that containing queries to enforce dependencies, preferences, and policies. A query may receive an input and return results that comply with a policy that query is enforcing. For example, to enforce allowable actions based on roles and the objects impacted leverages RDF's inheritance properties to apply to a broad class. In another example, to enforce a cost minimization policy, an operator may select a query that corresponds to a cost minimization policy from the query library and then may supply the minimum CPU/Disk/RAM value as an input to the selected query. The query may return a result that satisfies the policy.

A TOSCA RDF graph model may contain different types of nodes and relationships. We can identify one or more specific nodes or relationships that satisfy certain preferences by writing queries, for example, SPARQL queries. For example, to implement a policy asserts a preference for the cheapest virtual machine (VM) instances from available cloud providers, the pseudocode below may be used, the result will be the provider's name, e.g., AWS EC2, GCE; the instance type, e.g., m3.medium, f1-micro; and the price:

```
SELECT ?provider ?instanceType ?price
WHERE {
  ?instanceType provider:instancePrice ?price .
  ?provider provider:instanceType ?instanceType .
}
ORDER BY ASC (?price)
LIMIT 1
```

To refine the example query to enforce particular preferences, e.g., minimum RAM, or other preferences, the pseudocode shown below may be used. The input to the code may be the MINIMUM_RAM field, and output will be the same as that of the previous pseudocode. In some cases, the pseudocode above may produce that same output as the pseudocode below with the MINIMUM_RAM input set to 0:

```
SELECT ?provider ?instanceType ?price
WHERE {
  ?instanceType provider:instancePrice ?price .
  ?provider provider:instanceType ?instanceType .
  ?instanceType provider:ramCapacity ?cap .
  FILTER (?cap >= MINIMUM_RAM)
}
ORDER BY ASC (?price)
LIMIT 1
```

A query library may include a bundle of queries, with individual names, inputs and outputs. Users may select queries from the library based on names or other references to enforce particular policies. Some operators may edit and/or extend the library with refined and/or new queries based on users' requests.

In various implementations, the input to the flow generation logic is the core layout and a source node for a path. The output of the flow generation logic may include workflows that include ordered scripts, such as scripts that will be run on a provisioned virtual machine.

In an example implementation, a TOSCA meta-model may be used for structuring and managing IT services. In the example implementation, a deployed service is an instance of a service template, which is derived by instantiating the topology template and orchestrated via a specified plan. The topology template may be used to define the structure of a service. For example the core layout discussed above may be used as a topology template. The node and relationship types in a layout may define the properties associated with that type and lifecycle operations (via interfaces) available for invocation when a service template is instantiated. For example, a MySQL node type may represent a MySQL database management system (DBMS)), which has properties, such as, root_password, dbms_port; and life cycle operations such as install, configure, start, stop. These properties and life cycle operations may map to actual implementation artifacts, such as, scripts, Chef recipes, and/or other configuration definition elements. Chef is a configuration management tool available from Opscode, and may provide a fundamental configuration element that defines what may be needed to configure part of a system, e.g., install a MySQL server. Additionally or alternatively, deployment artifacts for a node type, such as MySQL RPM bundle for installation, may be present. In particular, a node type may be annotated with requirements and capabilities, such that a relationship can be built between a node using a specific capability and another node providing the specific capability. In some cases, an analysis of the capabilities used by a node and the capabilities offered by other node may identify opportunities for substitution.

Figure 10:
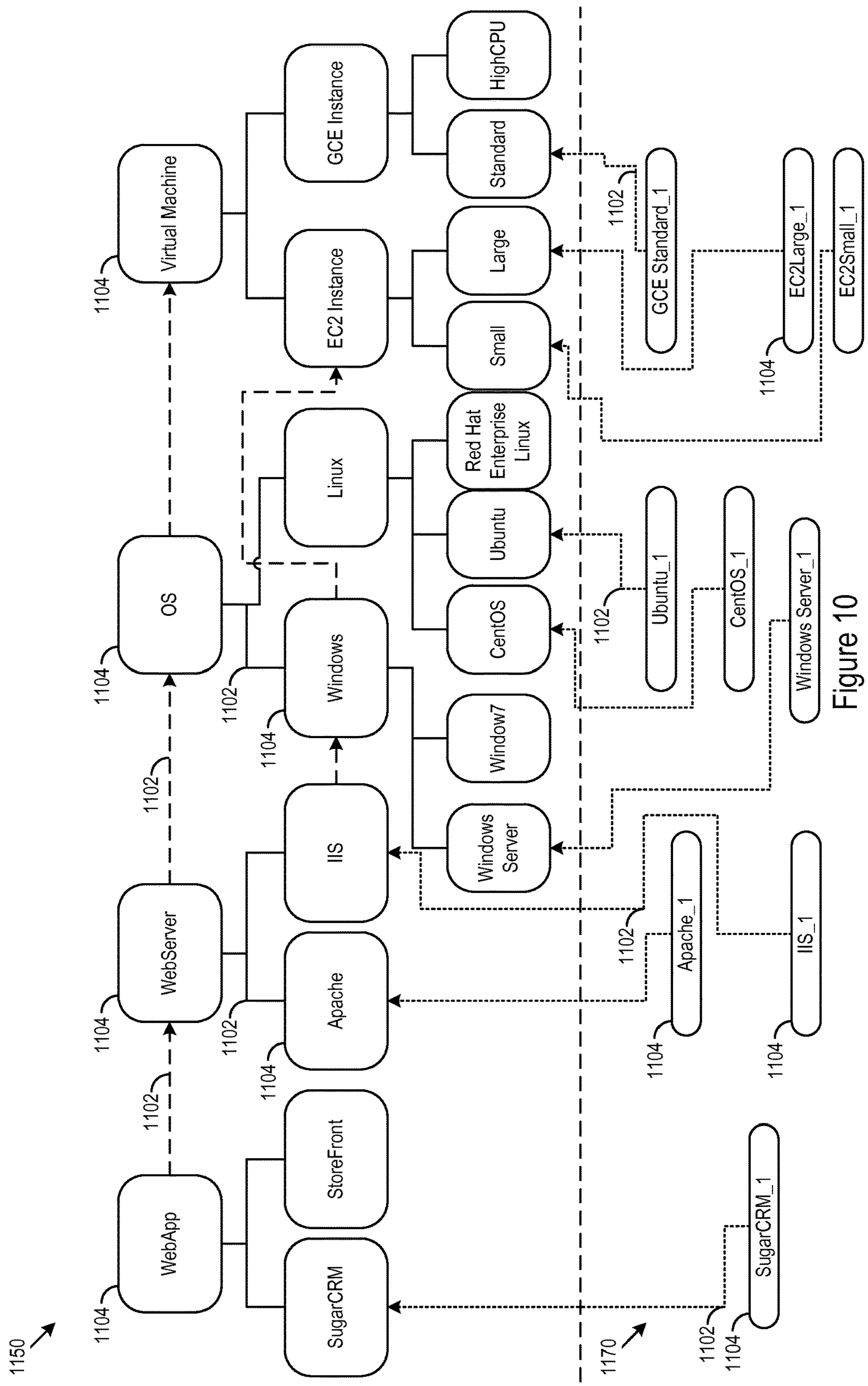
FIG. 10 shows an example resource description framework graphical implementation of a topology and orchestration specification for cloud application model.

In the TOSCA-based example implementation, the resources are components, e.g., Operating System, Virtual Machine, and/or other components, in the infrastructure domain; properties of the components, e.g., IP address, port number, and/or other properties; and artifacts, e.g., deployment scripts, configuration files, archived installables, and/or other artifacts. Using the RDF systems a statements about resources may be made by the layout logic 700 as triples:

<Subject> <Predicate> <Object>. The layout logic 700 may group the statements into graphs. FIG. 10 shows an example RDF graphical implementation of a TOSCA model.

In the TOSCA-based example implementation, nodes represent resources (subjects and objects), and the edges 1102 between nodes 1104 represent relationships (predicates). The upper half of the graph 1150 defines the infrastructure at the "type" level. In other words, the upper half of the graph shows what types of components are present the relationships the components have. The bottom half 1170 in the graph defines the actual instances of particular types within the infrastructure. For example, the green line in the graph represents <is hosted on> type of relationship; the pink line represents <is an instance of> type of relationship; and the navy line represents <is a subclass of> type of relationship. For example triples using the format may include: <SugarCRM_1> <is an instance of> <SugarCRM>, <SugarCRM> <is a subclass of> <WebApp>, <WebApp> <is hosted on> <WebServer>.

The system may define, for example, the following types of relationship in the graph:

<has property>—modifies a component that has a property. For this type, the object may be satisfied by a property node. For example, <virtual machine> <has property> <ip address>, <software> <has property> <version>, <EC2 Instance> <has property> <access id>.

<has artifact>—modifies a component that has a property. For this type, the object may be satisfied by an artifact node. The artifact may be in the form of a script, a configuration file, archived installables, or other artifact. Additionally or alternatively, different scripts may serve different purposes, e.g., various lifecycle events such as install, delete, start, stop, configure may have different purposes.

<is subclass of>—modifies a node is a subclass of another node.

<is instance of>—modifies a node, e.g., a node in the bottom half of the graph, that is an instance of another node, e.g., a node in the upper half.

<depends on>—modifies a component depends on another component. For example, <Tomcat> <depends on> <Java>.

<connects to>—modifies a component that to connects or otherwise couples to another component. For example, <WebApp> <connects to> <Database>.

<is hosted on>—modifies a component may be hosted on another component. For example, <application> <is hosted on> <operating system>, <database> <is hosted on> <database management system>.

<is instance of> and <is subclass of> relationship types may be used to build hierarchies for reusability and maintenance. Properties defined at the higher level may be inherited by the lower level. A descendent node may have a <is a subclass of> relationship to its ancestor node.

<depends on>, <connects to> and <is hosted on> relationship types define the topology of the component during deployment. The object of the relationship may be deployed before the source of the relationship to ensure proper operation. The <is hosted on> relationship may imply a bonding between the source node and the target node. For example, the value of a property in the source node may be the same as that in the target node. The <connects to> relationship type may imply that the source node and the target node can run parallel when the nodes share another type of relationship, such as <depends on> or <is hosted on>.

Instance nodes may define dependent properties values and artifacts information to support proper operation. The flow generation logic may leverage the relationships captured in the layouts to automatically generate deployment workflows, such as a sequence of deployment scripts, that take into consideration of the requirements, dependencies, and policies used to support the deployment. The flow generation logic may accept a portion of the core layout and a one or more target nodes for deployment as inputs. The flow generation logic may produce one or more deployment workflows to implement the target nodes as an output.

In various implementations, the example pseudocode below may be used to implement a portion of flow generation logic on corresponding circuitry to support execution.

```
GenerateDeploymentWorkflow(Node n, RDF-Graph G <V,E>)
Input: Node n, RDF-Graph G <V, E>
Output: paths - a list of stacks of deployment scripts
Description: we use this function to generate a list of ordered
deployment scripts
{
  if (n is an instance node) {
    if (all n's required properties values have been set) {
      Node s = Get Node s s.t. <n, s> belongs to E and <n,
s>.label is <has artifact>; // get n's scripts
      Node x = Get Node y s.t. <s, x> belongs to E and <s,
x>.label is <is instance of>; // get s's type
      Node p = Get Node p s.t <n, p> belongs to E and <n,
p>.label is <is instance of>; // get n's type
      if (Edge <y, z> = FindDependsOn(x, G) and <y, z> is
not null) { //get the OS node z that the script depends on
        Find if there is a conflict between p and z;
// see FindConflict(p, z)
      }
      if (there is no conflict) {
        push y into stack path;
        Edge e = FindHostendOn(p, G);
        if (e does not exist) { // there is no more
<is hosted on> relationship, i.e., the path exploration has been
exhausted
          add stack path into list paths;
        } else {
          Node m = e.target; // m is the target
node of edge e
          forall (Node b s.t. b <is an instance of>
m or m's decendents) {
            GenerateDeploymentWorkflow (b, G);
          }
          pop y from stack path;
        }
      }
    } else {
      return error with the missing properties;
    }
  } else {
    forall (Node a s.t. a <is an instance of> n or n's
descendents) {
      GenerateDeploymentWorkflow(a, G);
    }
  }
}
FindHostedOn(Node n, RDF-Graph G <V, E>)
Input: Non-instance node n, RDF-Graph G <V, E>
Output: Edge e
Description: we use this function to find where the <is hosted on>
relationship is defined in the schema graph
{
  if (<n, m> belongs to E and <n, m>.label is <is hosted on>) {
    return <n, m>;
  } else if (<n, m>.label is <is subclass of>) {
    return FindHostedOn(m, G);
  }
  return null;
}
FindDependsOn(Node n, RDF-Graph G <V, E>)
Input: Non-instance node n, RDF-Graph G <V, E>
Output: Edge e
Description: we use this function to find where the <depends on>
relationship is defined in the schema graph
{
```

-continued

```
    if (<n, m> belongs to E and <n, m>.label is <depends on>) {
        return <n, m>;
    } else if (<n, m>.label is <is subclass of>) {
        return FindDependsOn(m, G);
    }
    return null;
}
FindConnectsTo(Node n, RDF-Graph G <V, E>)
Input: Non-instance node n, RDF-Graph G <V, E>
Output: Edge e
Description: we use this function to find where the <connects to>
relationship is defined in the schema graph
{
    if (<n, m> belongs to E and <n, m>.label is <connects to>) {
        return <n, m>;
    } else if (<n, m>.label is <is subclass of>) {
        return FindConnectsTo(m, G);
    }
    return null;
}
FindConflict(Node n, Node z, RDF-Graph G <V, E>)
Input: Non-instance node n, Node z, RDF-Graph G <V, E>
Output: true/false
Description: we use this function to determine whether node n can
be
connected by a chain of <is hosted on> relationship
{
    if (n is descendant of z) {
        return false;
    }
    else if (Edge <x, y> = FindHostedOn(n, G) and <x, y> is not
null) {
        return FindConflict (y, z, G)
    }
    return true;
}
```

Figure 25:
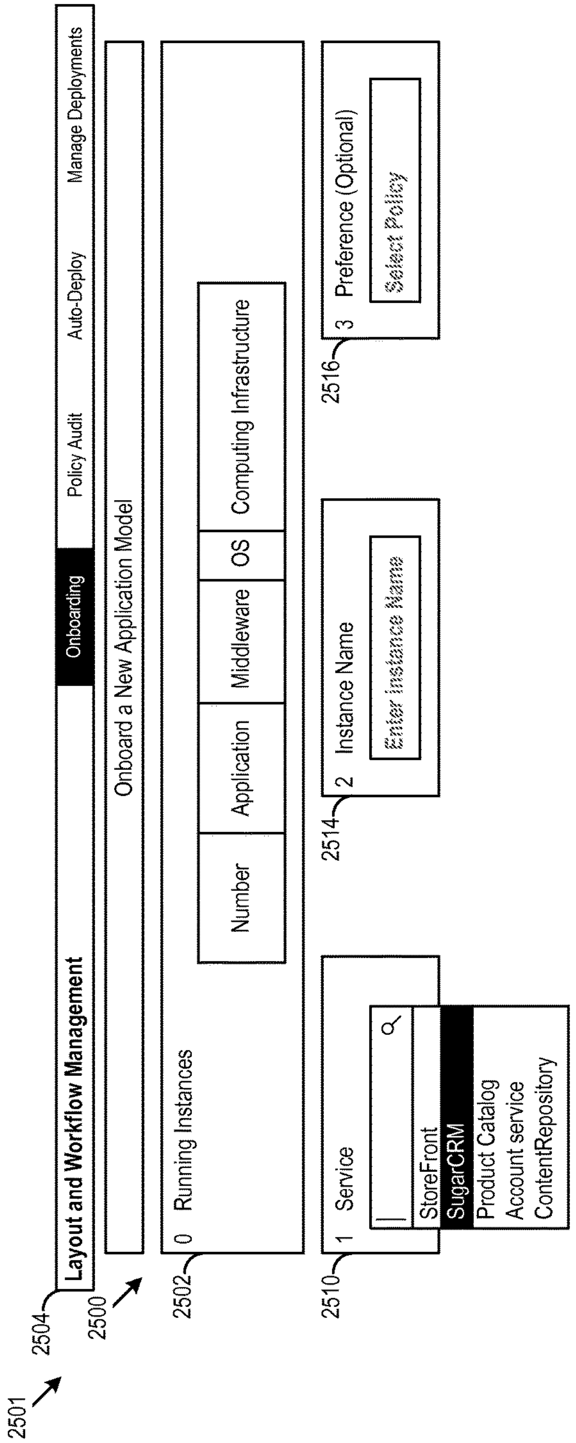
FIG. 25 shows a first example frontend of an example user interface for onboarding application models.

Referring back to FIG. 1, the configuration logic 300 may be used to support the backend processes of a user interface for onboarding new application models. Turning now to FIG. 25, a first frontend 2500 of a user interface 2501 for onboarding application models is shown. The user interface may display information on currently running instances in the running instances display 2502. Various services may be shown in the running instances display to provide the user with an overview of current system condition. The reference service catalog, discussed above with respect to FIG. 1, which may be used to determine the core layout, may define the service selections available to the user. The user interface 2501 may include a first input 2510 for selection of a service.

In the example user interface 2501, the first input 2510 is implemented as a combined drop-down menu and search bar. However, other input types, such as command lines, search bars, drop-down menus, button selectors, voice recognition, or other interface inputs, may be used to implement the first input 2510. The available service options may be defined by the services available in the service catalog. The user interface 2501 may further include inputs 2514, 2516, which may include selections dependent on the first input or independent of the first input.

In the example user interface 2501, appearance, available options, or other parameters for the inputs may be changed, e.g., by the configuration logic 300, as selections are made at the first input 2510. The changes may be defined, in part, by relationships and vertices in the core model layout. However, through service catalog selections or other onboarding processes the core model layout may be customized or otherwise altered. The user interface 2501 may further include a navigation bar 2504 for selection management functions including workflow development.

In the example user interface 2501, five options for services at the first input are shown. In the example, the services are related to platforms for managing content, logistics, client relationship data, and other data. The service options include StoreFront, SugarCRM, ProductCatalog, AccountService, and ContentRepository.

Figure 26:
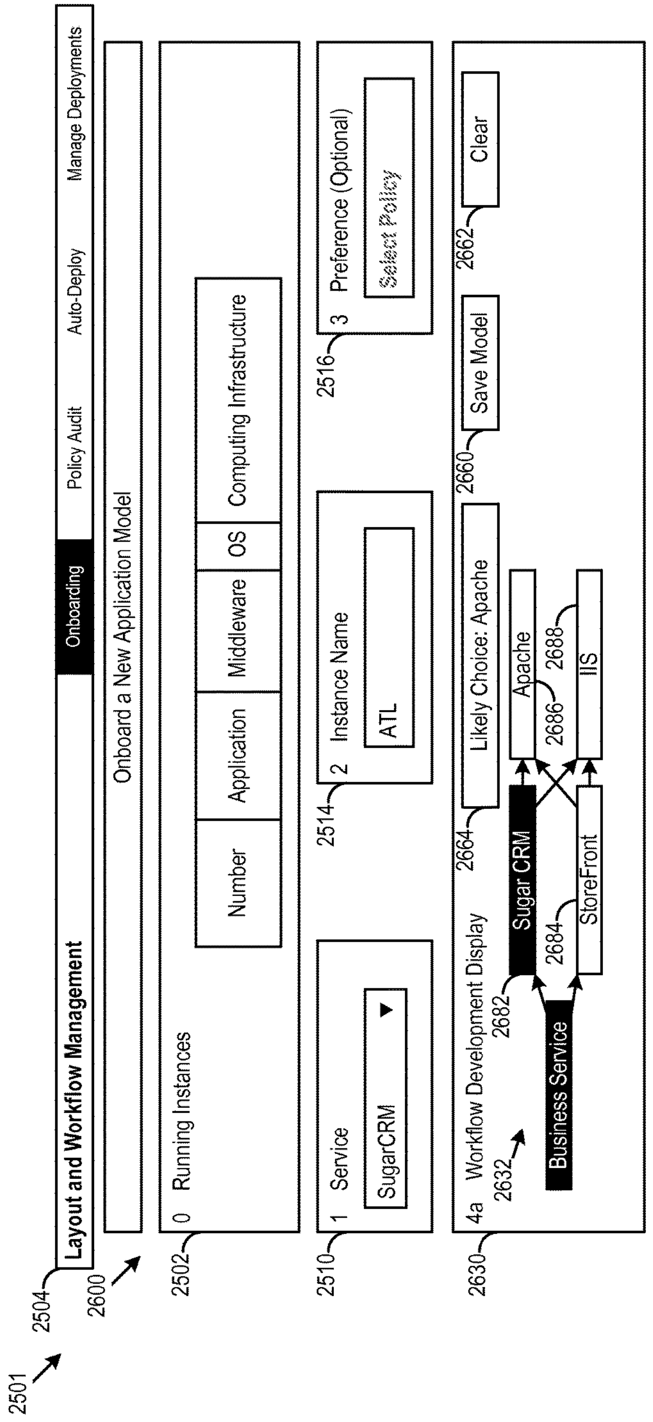
FIG. 26 shows a second example frontend of the example user interface.

FIG. 26 shows a second example frontend 2600 of the example user interface 2501. In the second frontend, an operator made a selection at the first input 2510. The operator also made a selection at a second input 2514. The selection at the first input 2510 was the SugarCRM service. The selection at the second input allows the operator to select a name for a particular instance. In the example, scenario the name "ATL" was selected for the instance. In some cases, default naming conventions may be used to auto-populate, auto-select, or otherwise auto-generate a suggested name for an instance. The operator may be given opportunity, e.g., immediately or at a later time, to alter the selection or otherwise change an auto-generated instance name.

The definitions of the northbound and southbound services for the core layout may be the source for the initial structure and relationship information for the workflow layout. Referring again to FIG. 1, the configuration logic 300 may add extensions to the initial structure (e.g., using logic portion 303) during the onboarding process (e.g., workflow development). The extensions may be used to added components more specific to the particular workflow being onboarded, while the core components (e.g., components accessed using logic portion 304) may be used to provide relationships and definitions common to multiple current and potential workflows.

The initial structure and extensions may be shown in the workflow deployment display (WDD) 2630. The WDD 2630 may show a layout 2632 applicable to the workflow being developed in the user interface 2501. In the WDD 2630, the links between nodes may be seen. In some cases, relationships may be displayed. However, in the example WDD 2630 the relationships are not currently displayed. Some information may be omitted from the WDD 2630 to facilitate operator comprehension of the WDD 2630. The operator may access such information be interacting with the WDD (e.g., via human interface device (HID) selection actions, such as, clicking, touching, voice commands, gestures, or other HID selections actions). The WDD 2630 may be used for making selections for the workflow deployment within a layout view.

In the example structure shown in the WDD, SugarCRM 2682 is the current selection for the extension to the core model. StoreFront 2684 previously onboarded. Between SugarCRM 2682 and Apache 2686 and between SugarCRM 2682 and IIS 2688 is a "hosted on" relationship. Although not currently shown, this relationship may be viewed on the WDD 2630 via HID selection interaction with the links show between SugarCRM 2682 and Apache 2686 and between SugarCRM 2682 and IIS 2688. Apache 2686 and IIS 2688 are both available for selection.

In the example second frontend 2600, the operator has not yet provided selections for the "preference" input 2516. In the example user interface 2501, the "preference" input 2516 is marked "optional". The "optional" marking may indicate to an operator that a workflow may be deployed without necessarily providing selection to that particular input. In some cases, "optional" markings may be added or removed response to selections made at previous inputs, e.g., the first input 2510 of the selections made in the WDD 2630 in this example scenario.

The current model may be saved using save input 2660. The selections may be cleared using clear input 2662. In some cases, the configuration logic 300 may access records, such as resource availability, operator history for the particular operator or other operators, cost (e.g., cloud services, software licensing, or other costs), regulations, security, service level agreements (SLAs), cloud provider agreements, facility location preferences, benchmark performance (e.g., latency, throughput, or other performance factors for middleware, firmware, software, or hardware), enterprise preferences, or other factors to determine likely workflow deployment selections. For example, likely choices may be determined by applying a default weighted policy enforcement scheme that incorporates operator selection history. The operator may interact with the "likely choice" input 2664 to select components and services based on these likely selections. Provision of such likely choice options may allow the operator to develop a workflow while providing an avenue to make viable selections, avoid duplication of previous work, or otherwise increase selection efficiency.

Figure 27:
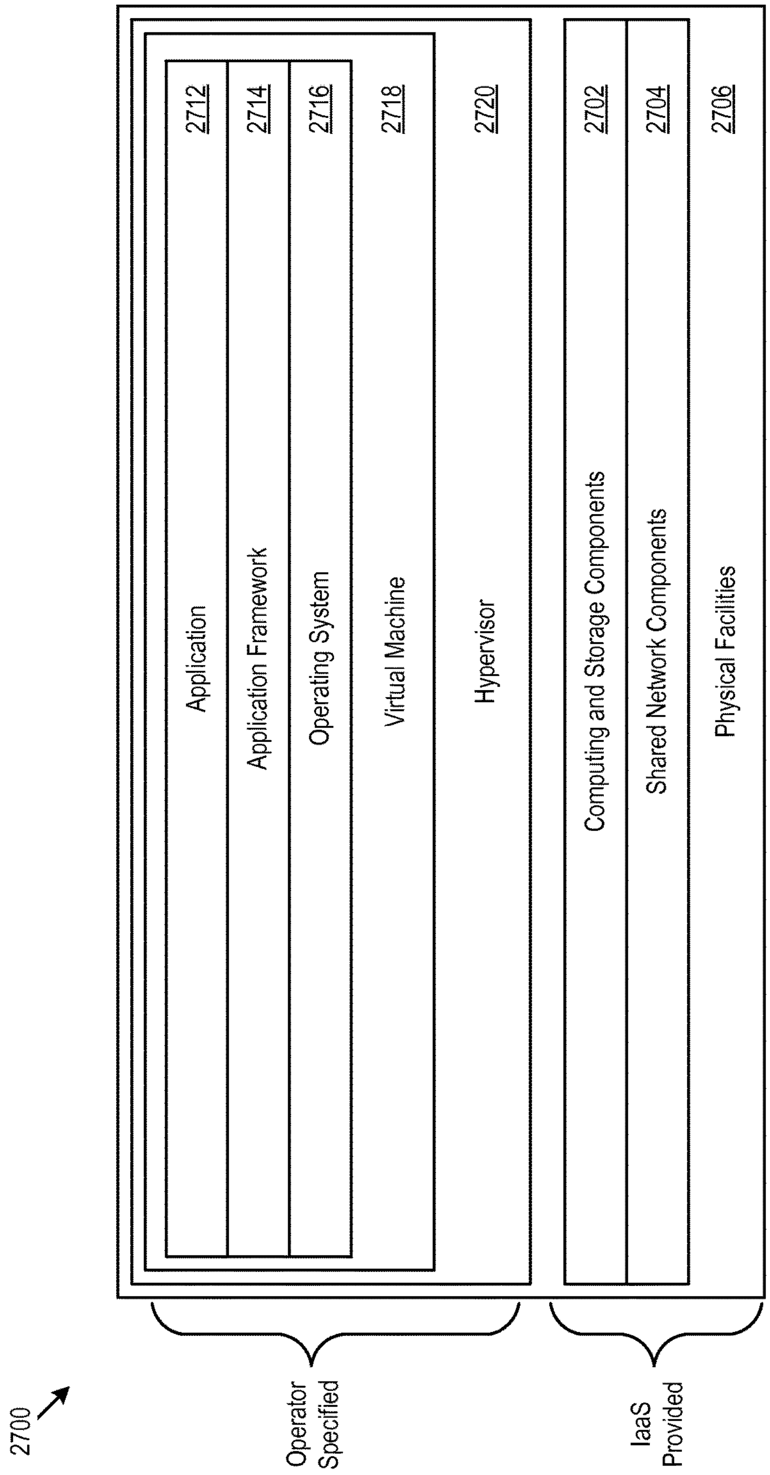
FIG. 27 shows an example infrastructure configuration.

Certain portions of the core layout may be less likely to change than other portions. For example, base resource types for a given workflow deployment (e.g., resources specified by an IaaS provider) may be more stable than operator-specified resources, such as, application frameworks (e.g., middleware, language framework, or other frameworks), applications, and operating systems. FIG. 27 shows an example infrastructure configuration 2700. In the example infrastructure configuration computing and storage components 2702, shared network components 2704, and physical facilities 2706, or other components may be provided by an IaaS provider. The operator may specify other components, such as, the application 2712, the application framework 2714, the operating system 2716, virtual machine configurations 2718, hypervisor configurations 2720, or other components. However, in other cases, the operator specified components and the IaaS provider components may include different combinations of components.

Figure 28:
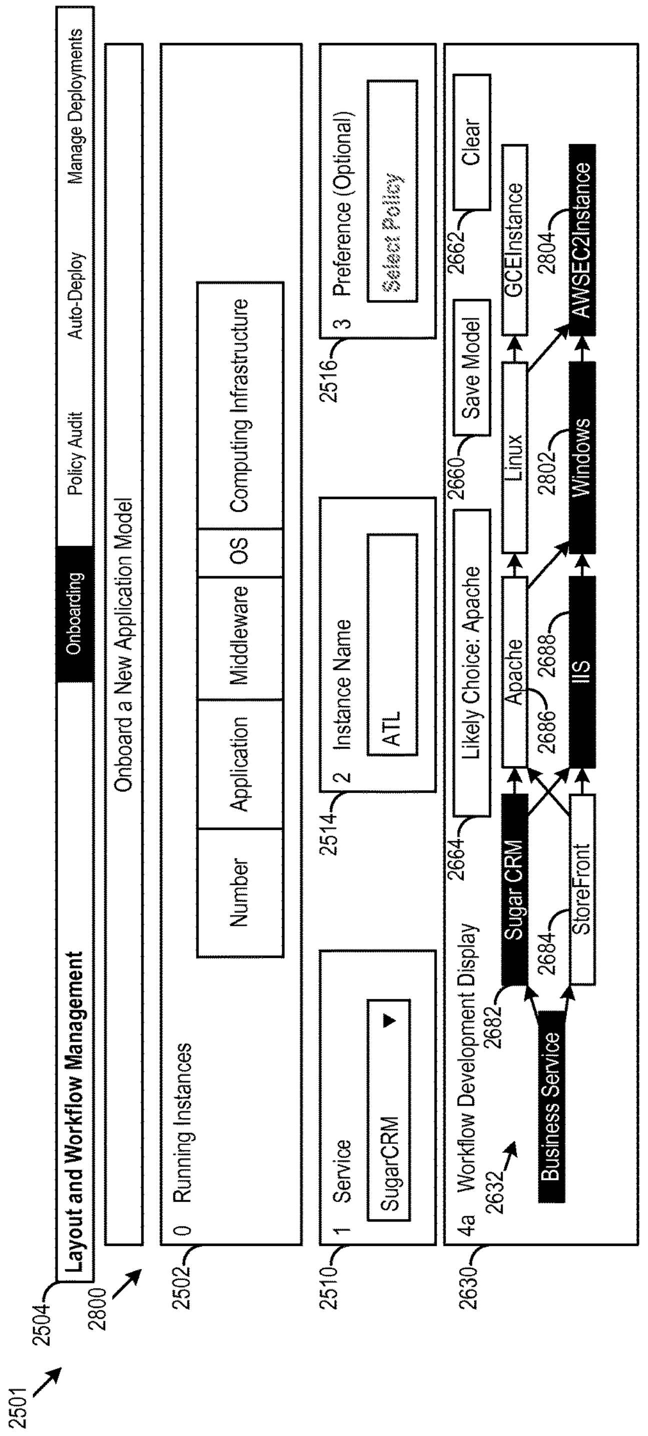
FIG. 28 shows a third example frontend of the example user interface.

Moving to FIG. 28, a third example frontend 2800 of the user interface 2501 is shown. Additional selections for the workflow deployment may be made via the WDD 2630. In this case selections of IIS results in further selections of Windows 2802 for OS and AWSEC2 2804.

Figure 29:
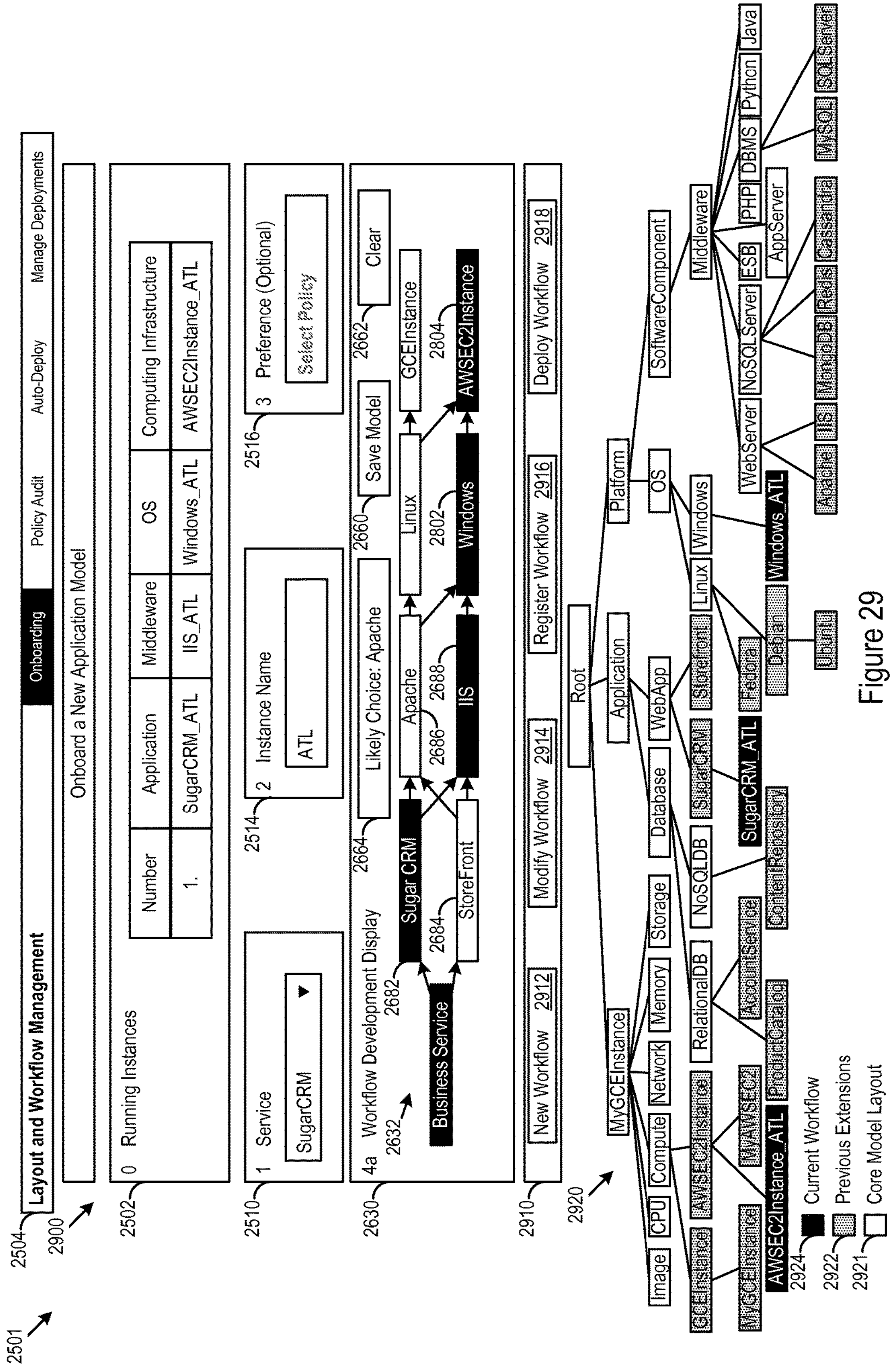
FIG. 29 shows a fourth example frontend of the example user interface.

In FIG. 29, a fourth example frontend 2900 of the example user interface 2501 is shown. Once, the operator saves the workflow or otherwise indicates that the selections are complete, the operator may be presented with deployment inputs 2910. The deployment inputs may offer options such as developing 2912 a new workflow, modifying 2914 the current workflow, registering 2916 the workflow with infrastructure components for later deployment, deploying 2918 the workflow to that execution platform (e.g. cloud platform), or other actions.

The fourth example frontend 2900 may further include a layout model view 2920 that may show the core model layout 2921 and previous extensions 2922 with extensions for the currently developed workflow 2924. The fourth example frontend may also allow HID interaction with the running instances display 2502. The running instances display 2502 may be manipulated to show details on the currently developed workflow.

Figure 30:
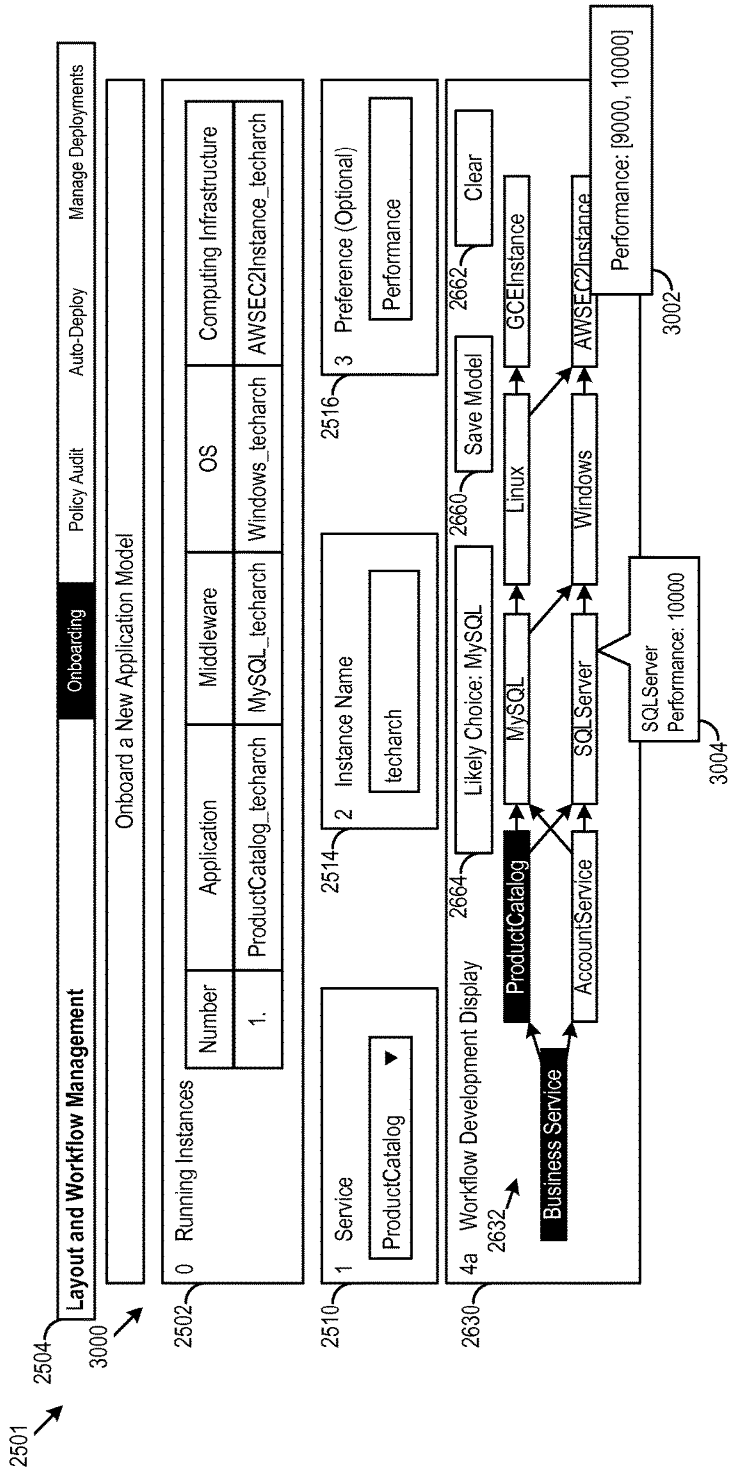
FIG. 30 shows a fifth example frontend for policy selection.

The user interface 2501 may also be used to select policies, e.g., applying cost constraints or optimizations, enforcing region preferences, applying performance metrics or optimizations, applying availability constraints or other policies, through the preferences input 2516. FIG. 30 shows a fifth example frontend 3000 of the example user interface 2501 for policy selection. Policies may be selected by the operator at the preferences tab. In the WDD 2630, the selected preferences may be shown in the preferences display 3002. In some cases, popups, tooltips, dialogue boxes, or other system messages 3004 may be displayed on the fifth example frontend. The system messages may be used by the operator to determine which of the available options meet the preferences for the system. Further, once the options are narrowed to the options that meet the state preferences, the operator may review the available selections for a narrowed set of options. In some cases, a narrowed set of selections may allow the operator to more quickly select deployment workflow options for the system.

In an example scenario a performance preference may be implemented. In the example scenario, an SQLServer hosted on Windows, which is hosted on AWSEC2, is selected. The SQLServer was selected over a competing MYSQL deployment because, in this case, the SQLServer deployment has better throughput. In the example scenario, the available options for the SQLServer deployment allow for a throughput of 10000 records/s, and the available options for MYSQL deployment allow for a throughput of 9000 records/s. Thus, in this case the SQLServer deployment was selected for the performance advantage. However, in other deployment scenarios different throughputs may be achievable with different platforms. For example, MYSQL may be selected over SQLServer for performance in other scenarios.

Policies may be given weights such that when there is a conflict between two policies the policy with higher weight may be given priority over the policy given less weight. For example if cost is given a higher weight than a concurrently enforce performance preference, the lowest cost resources may be selected. However, if two resources have the same cost, the higher performance resource may be selected. In some cases, weights may also be used to scale the relative gains from different policies-based selections. In an example scenario, a cost increase of 10% may be overridden by a performance increase of 5%. However, in the same example scenario, a cost increase of 20% is not necessarily overridden by a performance increase of 5%. Thus, different weights may be placed on different relative gains without necessarily causing selection in accord with one policy over another regardless of the size of their relative gains. The following pseudocode, which may be implemented as e.g., a SPARQL code, may be used to implement a middleware throughput policy:

```
Performance Optimization
SELECT ?middleware ?throughput
WHERE {
  ?middleware infra:has_throughput ?throughput .
}
ORDER BY
DESC (?throughput)
LIMIT 1
```

Figure 31:
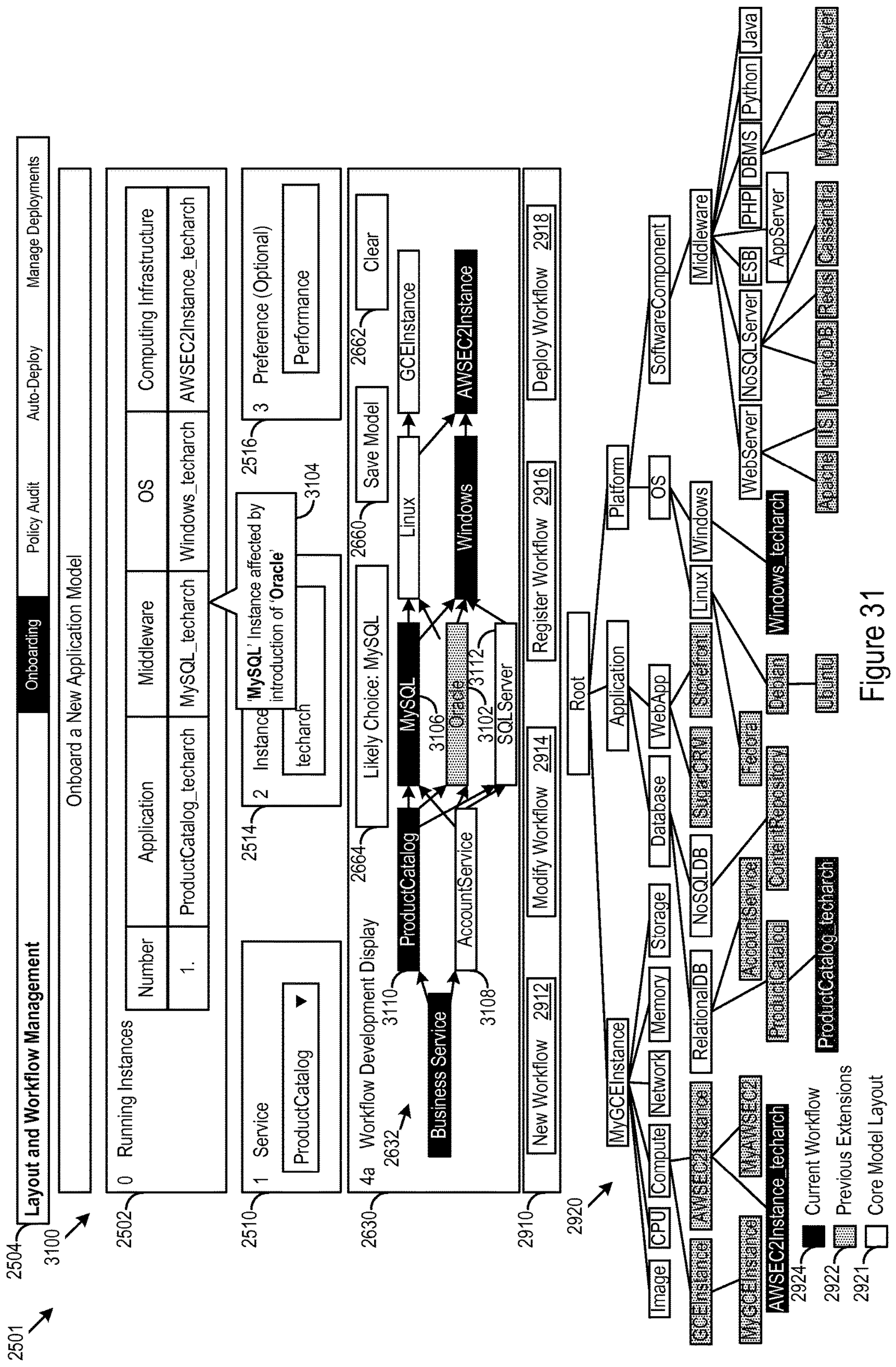
FIG. 31 shows a sixth example frontend of the user interface.

Referring again to FIG. 1, the configuration logic 300 may implement discovery effects introduced by the changes to the core layout through the extensions for the developed workflow. For example, if the user interface 2501 is used to add a new component, e.g., Oracle, to the model under DBMS. The configuration logic 300 may traverse the model (e.g., automatically or upon operator request) to find instances that have been deployed under other components that share the same parent (e.g., DBMS). The configuration logic 300 notifies the user of the change. Turning now to FIG. 31, a sixth example frontend 3100 of the user interface 2501 is shown. A previously deployed ProductCatalog_techarch instance is affected the introduction of the Oracle component 3102. The sixth example frontend 3100 shows a system message 3104 notify the operator. Further, the WDD 2630 shows links that may be drawn from the addition of the Oracle component 3102.

In the example shown in FIG. 31, AccountService 3108 and ProductCatalog 3110 are database application subclasses. The database application is hosted on DBMS, and MySQL 3106 and SQLServer 3112 are the subclasses of DBMS. Therefore, AccountService 3108 and ProductCatalog 3110 may be automatically inferred to be hosted on MySQL 3106 and SQLServer 3112. Once Oracle is added as a subclass of DBMS, the hosted on inference for Oracle may also be captured. When a new component is added into the model, it may inherit the properties and relationships from its parent.

When the model is saved, a manifest representing the model may be generated. The manifest may be created in one of multiple different formats, such as scripting languages, markup languages, or other formats. For example, a manifest may be in generated in JSON, YAML, or other formats. In various implementations, the system may format the manifest according to platform constraints. Thus, when a model is reused the system may not necessarily generate a manifest in the same format as when the model was previously used. Thus, the system may select components of the layout to be included in the manifest and generate the manifest based on the characteristics of the layout. Hence, some systems generate the manifest from the layout and need not necessarily depend on translation of the manifest. However, some systems may translate a manifest from format to format.

In the manifest, the properties, deployment artifacts, interfaces, and implementation artifacts for the components of the layout (e.g., core layout and extensions, applicable deployment components, or other set of components) may be captured in the manifest. For example, properties may include minimum RAM (e.g., minRAM) for virtual machines, server root passwords for MYSQL. The relationships for the links between components may also be captured in the manifest, so that deployment may be orchestrated when the manifest is passed to the deployment engine.

The deployment engine may accept a manifest as in input. The deployment engine may setup a connection with the platform provider. The manifest may be implemented in parallel or sequentially with other manifests. However, where dependencies a present, dependent manifests may be implemented in sequence with the manifests on which they depend. In an example case, the deployment engine may be implemented via an AWS SDK and CloudFormation service. The deployment engine using the AWS SDK may accept JSON format manifests. The following pseudocode may be used to create AWS stack with CloudFormation JSON manifest.

```
try {
  // Create a stack
  CreateStackRequest createRequest = new
CreateStackRequest( );
  createRequest.setStackName(stackName);
//createRequest.setTemplateBody(convertStreamToString(inp
utstream));
  createRequest.setTemplateBody(json);
  String temp = createRequest.getTemplateBody( );
  System.out.println(temp);
  System.out.println("Creating a stack called " +
createRequest.getStackName( ) + ".");
  stackbuilder.createStack(createRequest);
  // Wait for stack to be created
  // Note that you could use SNS notifications on the
CreateStack call to track the progress of the stack
creation
  System.out.println("Stack creation completed, the
stack " + stackName + " completed with " +
waitForCompletion(stackbuilder, stackName));
} catch (AmazonServiceException ase) {
  System.out.println("Caught an AmazonServiceException,
which means your request made it "
    + "to AWS CloudFormation, but was rejected
with an error response for some reason.");
  System.out.println("Error Message:          " +
ase.getMessage( ));
  System.out.println("HTTP Status Code:    " +
ase.getStatusCode( ));
  System.out.println("AWS Error Code:       " +
ase.getErrorCode( ));
  System.out.println("Error Type:              " +
ase.getErrorType( ));
  System.out.println("Request ID:              " +
ase.getRequestId( ));
} catch (AmazonClientException ace) {
  System.out.println("Caught an AmazonClientException,
which means the client encountered "
    + "a serious internal problem while trying to
communicate with AWS CloudFormation, "
    + "such as not being able to access the
network.");
  System.out.println("Error Message: " +
ace.getMessage( ));
}
```

In another example case, the deployment engine may be implemented using the Apache jClouds library. The jClouds library may be used with multiple cloud providers. The following pseudocode may be used by the Apache jClouds based deployment engine:

```
//Set up the bootstrap steps for the host/VM
    //First install the git to fetch the cookbooks
    ImmutableList.Builder<Statement> bootstrapBuilder =
ImmutableList.budder( );
    bootstrapBuilder.add(new InstallGit( ));
    //Second install Chef Solo
    bootstrapBuilder.add(new InstallChefUsingOmnibus( ));
    List<InterfaceArtifact> tasks = print.getTasks(workflow_name);
    for (InterfaceArtifact task : tasks) {
      if (task.getArtifactType( ) == Constants.SCRIPT.CHEF) {
        String recipes = task.getRecipes( );
        if ( recipes != null) {
          //Third, find from the blueprint what cookbooks need to be
downloaded
          Iterable<String> recipeList = Splitter.on(',').split(recipes);
          // Clone community cookbooks into the node
```

-continued

```
                for (String recipe : recipeList)
                {
                   //Sometimes recipe is given specifically rather than a
cookbook name, but as cookbook:: recipe
                   if (recipe.contains("::")) {
                      String cookbook[ ] = recipe.split("::");
                      recipe = cookbook[0];
                   }
                   bootstrapBuilder.add(CloneGitRepo.builder( )
                         .repository("git://github.com/opscode-cookbooks/" +
recipe + ".git")
                         .directory("/var/chef/cookbooks/" + recipe) //
                         .build( ));
                }
                // Configure Chef Solo to bootstrap the selected recipes
                bootstrapBuilder.add(ChefSolo.builder( ) //
                   .cookbookPath("/var/chef/cookbooks") //
                   jsonAttributes(task.getAttributes( ))
                   .runlist(RunList.budder( ).recipes(recipeList).build( )) //
                   .build( ));
             }
          } else if (task.getArtifactType( ) == Constants.SCRIPT.SH) {
             List<String> lines = Files.readLines(new
File(ClassLoader.getSystemResource(task.getArtifactPath( )).getPath( )), UTF_8);
             for (String line : lines) {
                bootstrapBuilder.add(Statements.exec(line));
             }
          }
       }
       //Build the statement that will perform all the operations above
       StatementList bootstrap = new StatementList(bootstrapBuilder.build( ));
       //Run the script on a specific node
       runScriptOnNode(compute, login, node.getId( ), bootstrap);
```

After the deployment engine deploys the instance of the layout in the manifest, the instance's properties may be written back into the layout. For example, virtual machine IP addresses may not necessarily be known prior to deployment. In some cases, e.g., AWS, data such a vpc-id and subnet-id may not necessarily be known a priori. The deployment engine may fetch such properties and update the layout. The following pseudocode, e.g., SPARQL code, may be used to write a fetched value IP address value (e.g., 10.1.1.5 in this example) back to the layout:

```
DELETE
{
    ?s ?p ?o
}
INSERT
{
    infra:AWSEC2Instance_ATL infra:has_ip_address
"10.1.1.5";
}
WHERE
{
  ?s ?p ?o .
    FILTER (?s = infra:AWSEC2Instance_ATL)
    FILTER (?p = infra:has_ip_address)
}
```

Some platform providers may use configuration management database (CMDB) to capture instance information. Hence, the system may fetch information using the existing CMDB functions. The fetched information may be then written back to the layout as described above.

Policy Enforcement

In various implementations infrastructure layout architecture may be used to enforce policy compliance on a core layout and/or instances. For example, a given component of a northbound service may be fulfilled by a number of different southbound services. However, a policy may bar certain non-compliant southbound services from being used to fulfill the component. In an example scenario, for a connected car type northbound service, a messaging service may be a component. However, a policy, for example, may require that automotive connectivity services be secured. Therefore, to comply with the policy, the system may fulfill the messaging service using a messaging service that provides security, such as encryption.

Figure 4:
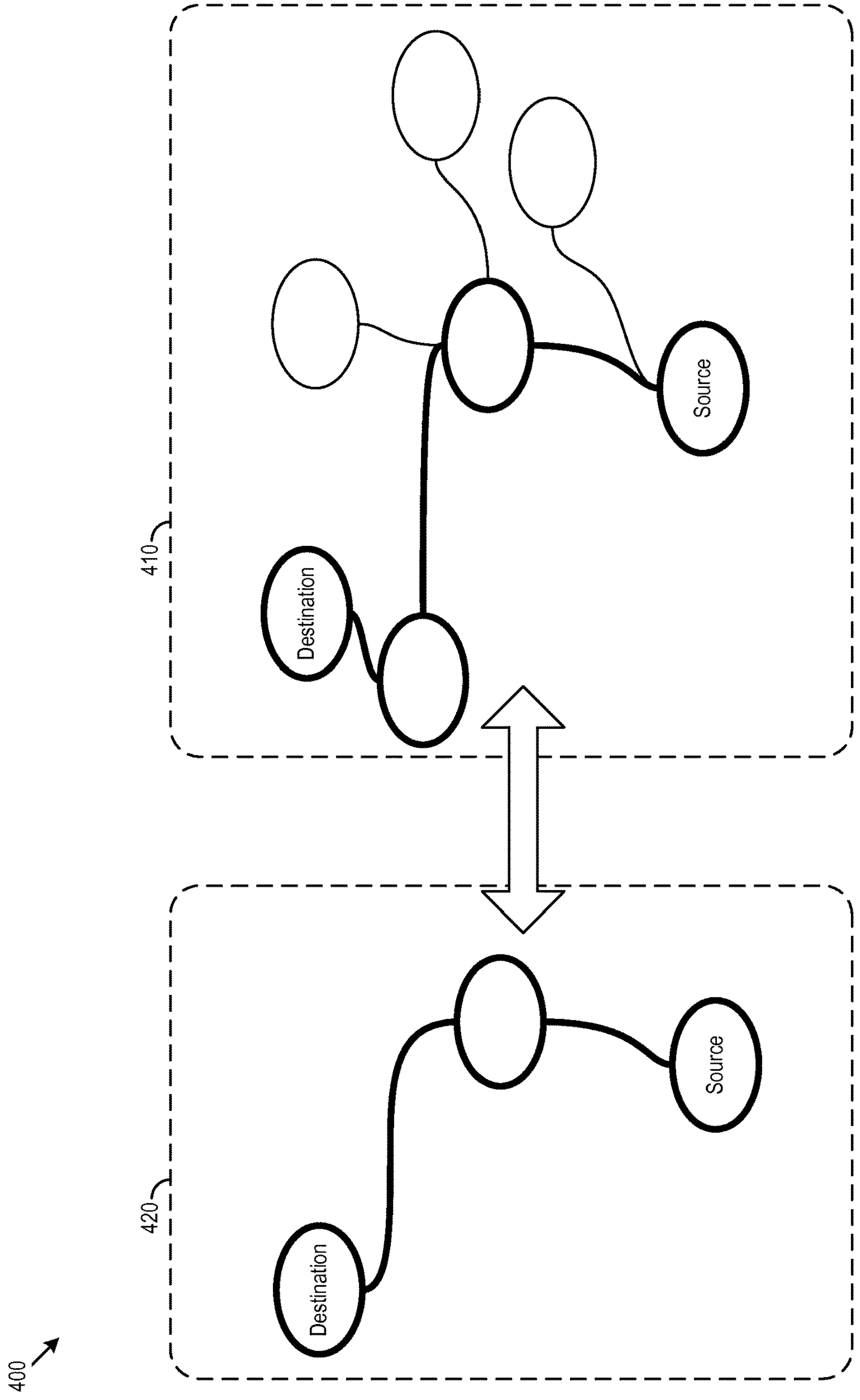
FIG. 4 shows an example policy enforcement scenario.

FIG. 4 shows an example policy enforcement scenario 400. A core layout 410 includes mappings of northbound service components to fulfillment southbound services. The core layout may be referenced, e.g. by policy logic 500, against one or more policy models 420. The mappings within the policy model 420 detail component and relationships used to obtain compliance with the policy model. For example, policy models 420 may detail security components, performance targets, resource consumption targets, service level agreements, locations preferences, statutory regulations, relationships, and/or other compulsory layout components for compliance. The policy models may be structured using a hierarchy used in the core layout. Once the core layout is referenced against the policy model, the system may determine if the core layout is in compliance.

Figure 5:
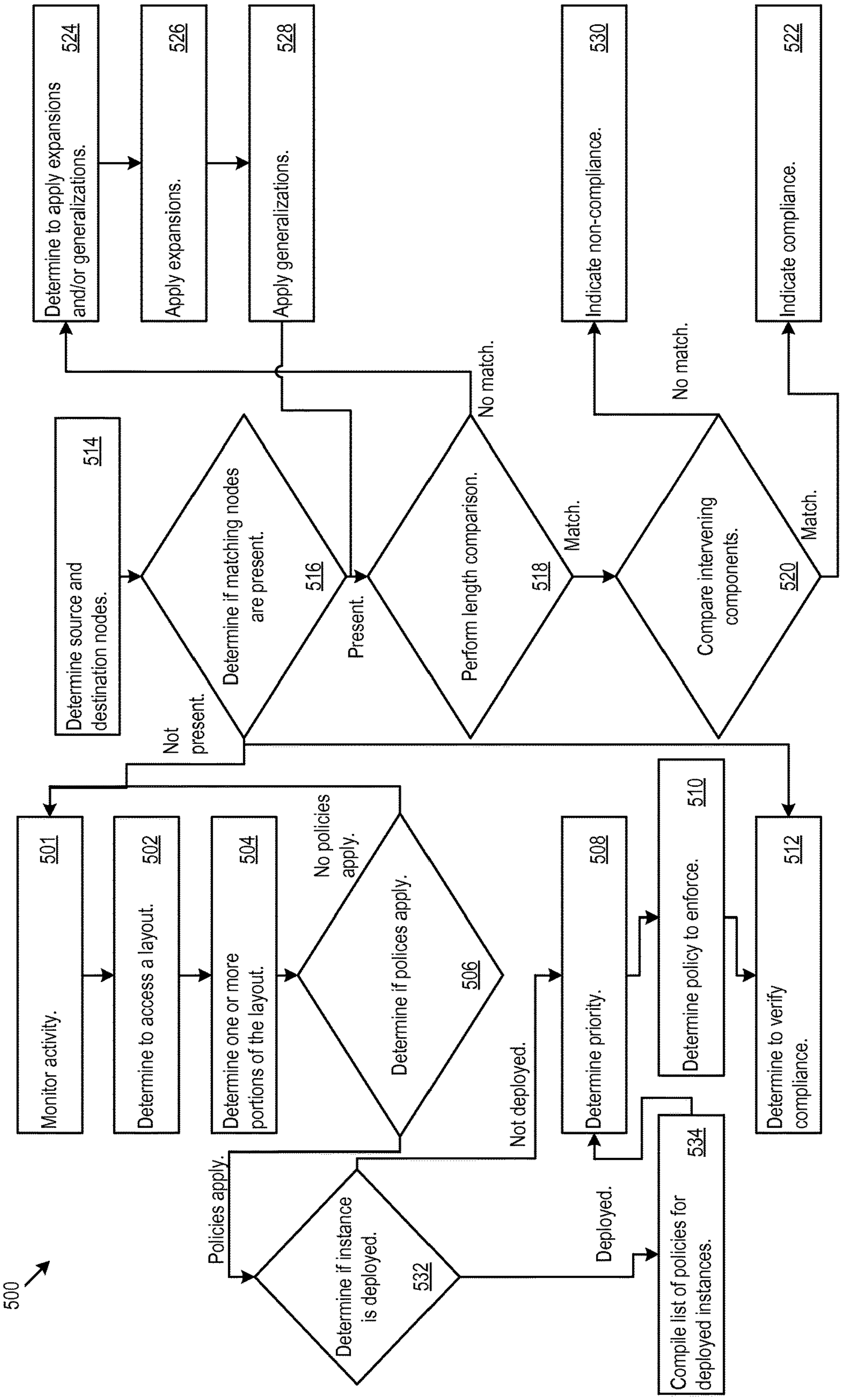
FIG. 5 shows example policy logic for policy enforcement.

FIG. 5 shows example policy logic 500 for policy enforcement. The policy logic may monitor activity related one or more layouts (501). The policy logic may determine to access a layout (502). For example, the policy logic may verify compliance at various intervals, such as periodically, aperiodically, following an event, and/or at other intervals. Additionally or alternatively, a layout may be access responsive to a trigger. For example, a layout may be accessed when an instance is deployed or when an extension is applied to a core layout. The policy logic may determine one or more portions of the layout to reference against policy models (504). For example, based on the determination to verify the layout, the policy logic may determine a portion of interest of the layout related to the reason for determining to verify the layout. For example, if the policy logic determines to verify a layout based on the implementation of an extension, the policy logic may reference the portions of the layout affected by the extension.

The policy logic may determine if one or more policy models apply to the portion the layout (506). If no policies apply, the policy logic may return to activity monitoring (501). If one or more policies apply, the policy logic may determine a priority for the policies (508). If conflicting policies exist, the policy logic 500 may determine which policy to enforce (510). For example, business rules may be applied. In an example scenario, a newer policy may be applied over an older policy. Additionally or alternatively, security policies may be applied over performance policies or vice versa.

The policy logic 500 may determine to verify compliance with a selected policy (512). The policy logic may determine a source node and destination node for the selected policy (514). The policy logic may determine if matching nodes are present in the portion of the layout (516). If nodes matching the determine source and destination nodes are not present, the policy logic 500 may generalize definitions of nodes in the layout and preform the matching again. For example, a determined source node in a policy may specify a "vehicle", but the vehicle type node found in the portion of the layout may specify a "boat". The policy logic 500 may generalize the node in the layout to its type "vehicle" to match the node to that source node in the policy. In no nodes are found that can be generalized in the manner, the policy logic may return to monitoring (501) or determine another policy to verify (512) if multiple applicable policies were found. Once the source and destination nodes are matched, the policy logic may perform a source-to-destination length comparison (518). For example, the policy logic may determine if the same number of component and relationship "hops" are present between the source and destination nodes in the policy model and layout.

If the source-to-destination lengths match in the policy model and the layout from matched source node to matched destination node, the policy logic 500 may compare the intervening components and relationships in the policy model and the layout (520). If the components and relationships are the same, the policy logic 500 may indicate compliance with the policy model (522). For example, the policy logic 500 may take no further action in response to compliance. Additionally or alternatively, the policy logic 500 may send an indication of compliance to allow another action to go forward. For example, the policy logic 500 may send an indication of compliance the flow generation logic 800 to allow the deployment of an instance to go forward. In another example, the policy logic 500 may send an indication to the layout logic 700 to indicate that a given extension of a core layout may be implemented.

If the source source-to-destination lengths do not match in the policy model and the layout from matched source node to matched destination node, the policy logic may determine if expansions and/or generalizations may be applied to the intervening components in the layout (524). In some cases, a layout may supply a simple service and fulfillment path. For example, a messaging service may be fulfilled by a wireless carrier generating one hop in the layout. However, the one hop in the layout may imply one or more, lower hierarchy relationships and components. For example, the messaging service provided by the wireless carrier may imply many "hosted on" and/or security components. The policy logic 500 may expand these implied relationships and components (526) and determine a new length between the source and destination nodes (528). Additionally or alternatively, multiple hops may be generalized or simplified to one hop, where the multiple hops are implied. The policy logic 500 may generalize the expanded relationships and components (530) and determine a new length between the source and destination nodes (528). Once the source-to-destination lengths match (518), the policy logic may provide to component and relationship comparison (520). Additionally or alternatively, the policy logic 500 may apply expansions and generalizations to the policy model depending on the implementation. In various implementations, generalizations and/or expansions may be applied when the resultant components and relationships generate a matching pair between the layout and policy model. When a match is not created, the expansion and/or generalization need not necessarily be applied. If the lengths cannot be matched after available expansions and generalizations have been applied, the policy logic 500 may indicate non-compliance with the policy model (530).

In some cases, the policy logic 500 may monitor instances that are currently deployed and/or actively running. The policy logic 500 may determine if an instance is deployed and/or running (532). The policy logic 500 may compile a list of policies associated with the deployed and/or running instances (534). In some cases, a change in the core layout may occur while an instance is deployed. The policy logic 500, may evaluate policies on the compiled list for continued compliance (508-530).

If, after the comparison (520), the components and/or relationships do not match, the policy logic 500 may indicate non-compliance with the policy model (530). For example, a non-compliance alert may be generated. The policy logic 500 may halt the layout logic 700 when applying an extension to prevent the non-compliance. Alternatively, the policy logic may cause the layout logic 700 to apply an extension to fix the non-compliance. The policy logic 500 may send an indication that a possible adjustment to a layout may lead to non-compliance with one or more policies. In another example, the policy logic 500 may prevent deployment of an instance by the flow generation logic 800.

Figure 11:
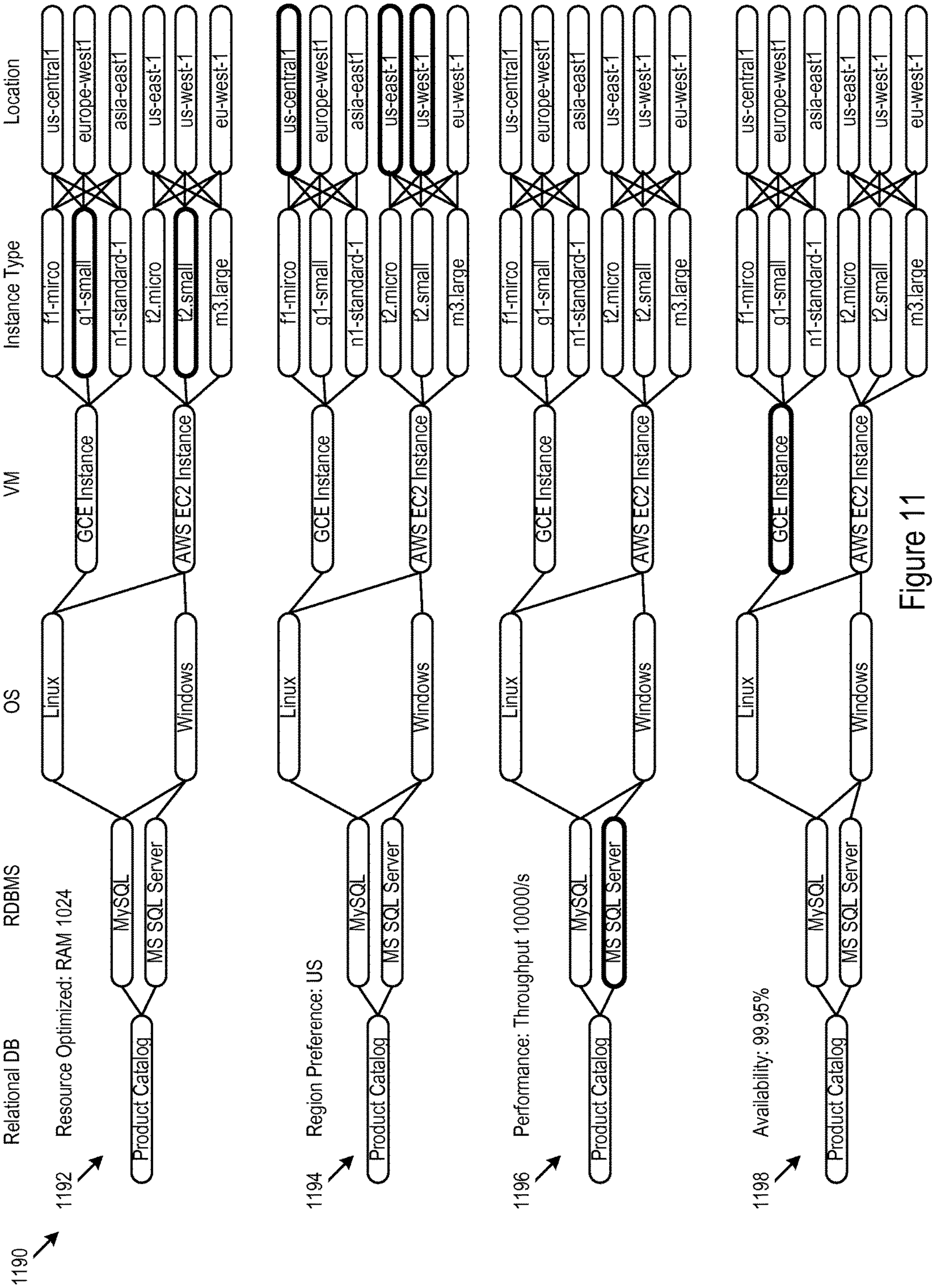
FIG. 11 shows an example scenario in which multiple deployments are presented for policy compliance comparison.

The flow generation logic 800 and the policy logic 500 may cooperate to determine compliance on one or more possible deployments with one or more policies. For example, the flow generation logic may determine one or more possible workflows for deployment and the policy logic may indicate policy compliance and/or non-compliance for the workflows. Thus, the user may select among deployments based on widest compliance and/or highest priority compliance. FIG. 11 shows an example scenario 1190 in which multiple deployments 1192, 1194, 1196, 1198 are presented for policy compliance comparison. In the example scenario, policy compliance for resource optimization 1192, regional preferences 1194, performance 1196, and availability 1198 are compared.

Referring again to FIG. 8, in various implementations, the flow generation logic 800 may receive the policy compliance indications from the policy logic 500 (898). Based on the policy compliance indications, the flow generation logic 800 may generate a workflow (822).

In some implementations, the flow generation logic may receive an indication of a service for deployment (802). For example, the flow generation logic may receive a user selection or other compulsory service selection. The flow generation logic 800 may send the service indication to the policy logic 500 as a layout input (892). Responsive the layout inputs, the flow generation logic 800 may receive the policy compliance indications from the policy logic 500 (898). Based on the policy compliance indications, the flow generation logic 800 may generate a workflow (822), incorporating policy compliance and the external selection.

Figure 12:
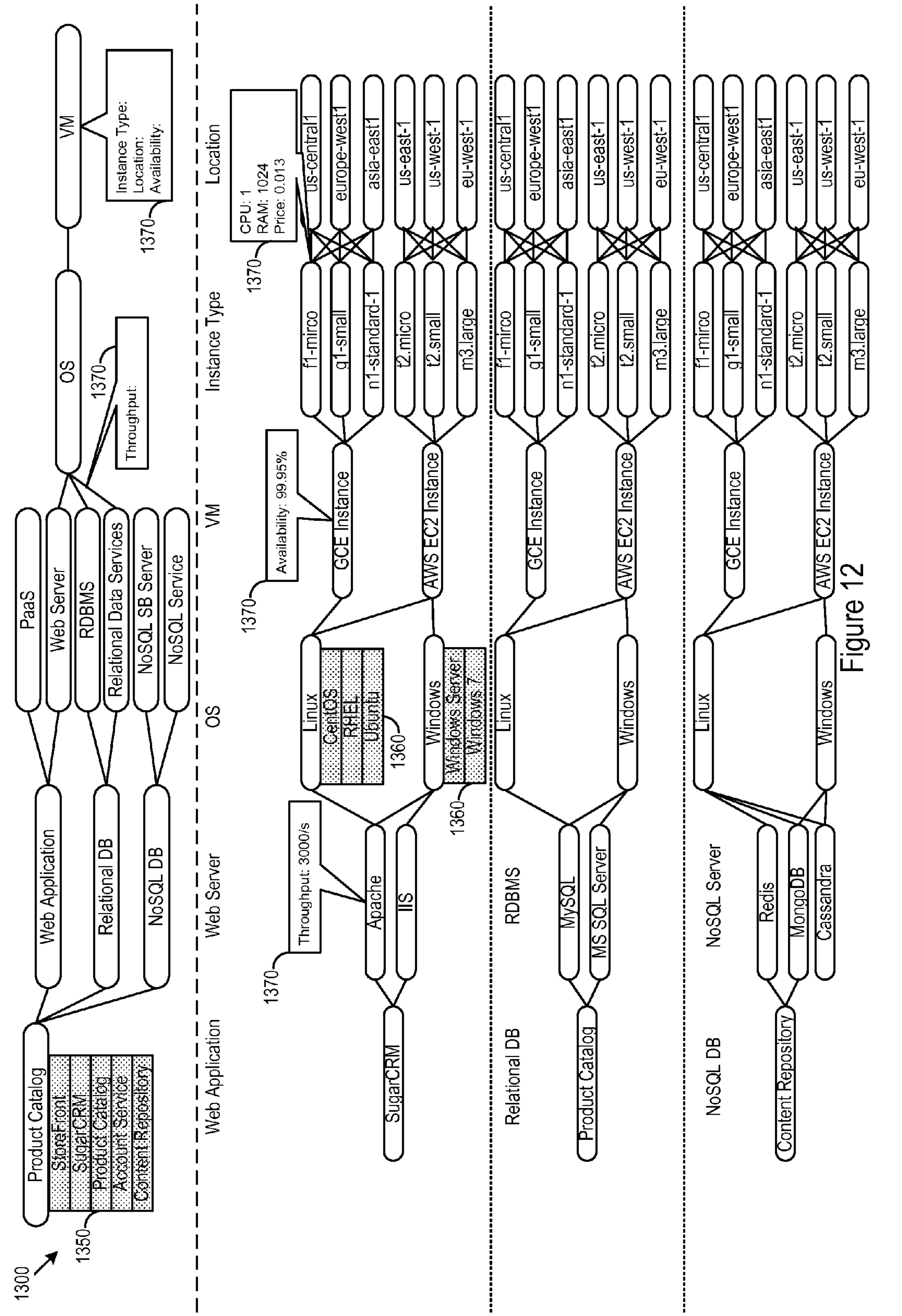
FIG. 12 shows an example interface in which an operator may select among different options.
Figure 13:
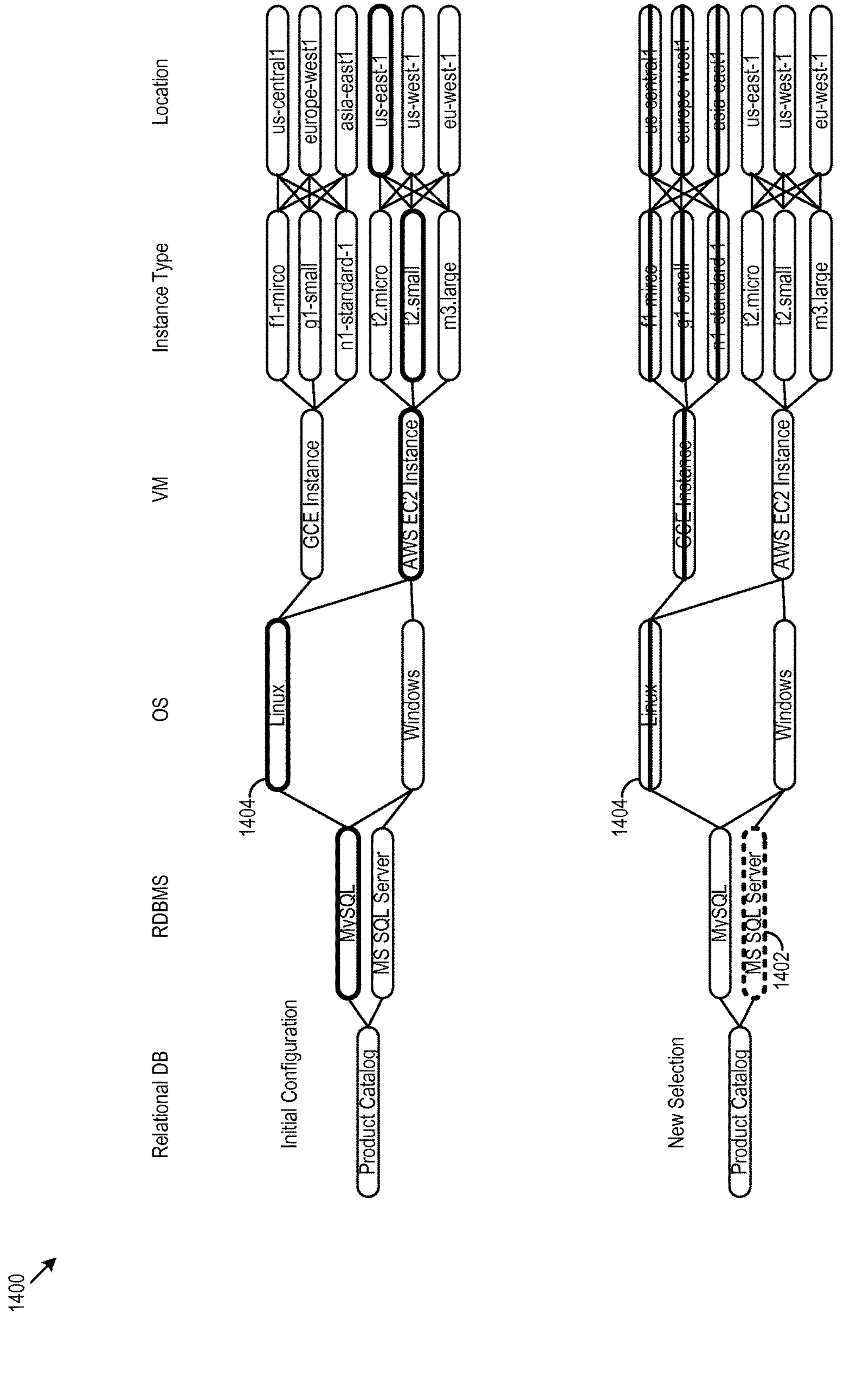
FIG. 13 shows an example scenario where a selected option causes non-compliance for other possible selections.

FIG. 12 shows an example interface 1300 in which an operator may select among different options 1350 for northbound services and options 1360 fulfillment by southbound services from a core model layout. In various implementations, the policy logic 500 may generate indications 1370 of possible policy compliance issues to assist in guiding the operator selections. In some cases, the selection may cause non-compliance among certain instances. FIG. 13 shows an example scenario 1400 where a selected option causes non-compliance for other possible selections. A user selection 1402 of MySQL server causes a Linux-based instance option 1404 to be non-compliant with one or more policies. Thus, a Windows based instance 1406 may be selected for compliance with the one or more policies.

Figure 14:
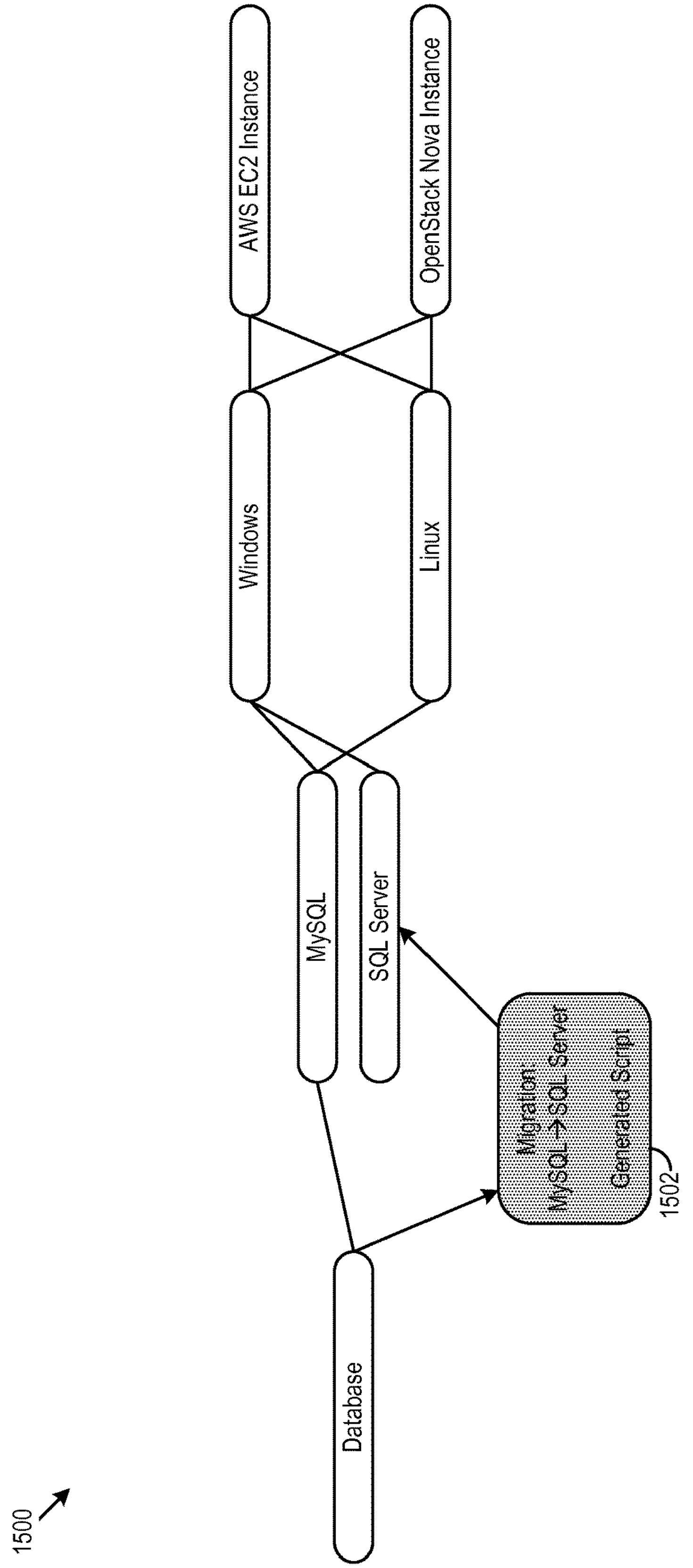
FIG. 14 shows an example interface where an operator is presented with an option to extend the core layout.

In some cases, an option to extend the core layout may be presented to the operator. FIG. 14 shows an example interface 1500 where an operator is presented with an option 1502 to extend the core layout by migrating functionality from MySQL to SQLServer via a script. In various implementations, the flow generation logic 800 may generate such scripts to provide additional options for northbound service fulfillment to the operator.

Figure 17:
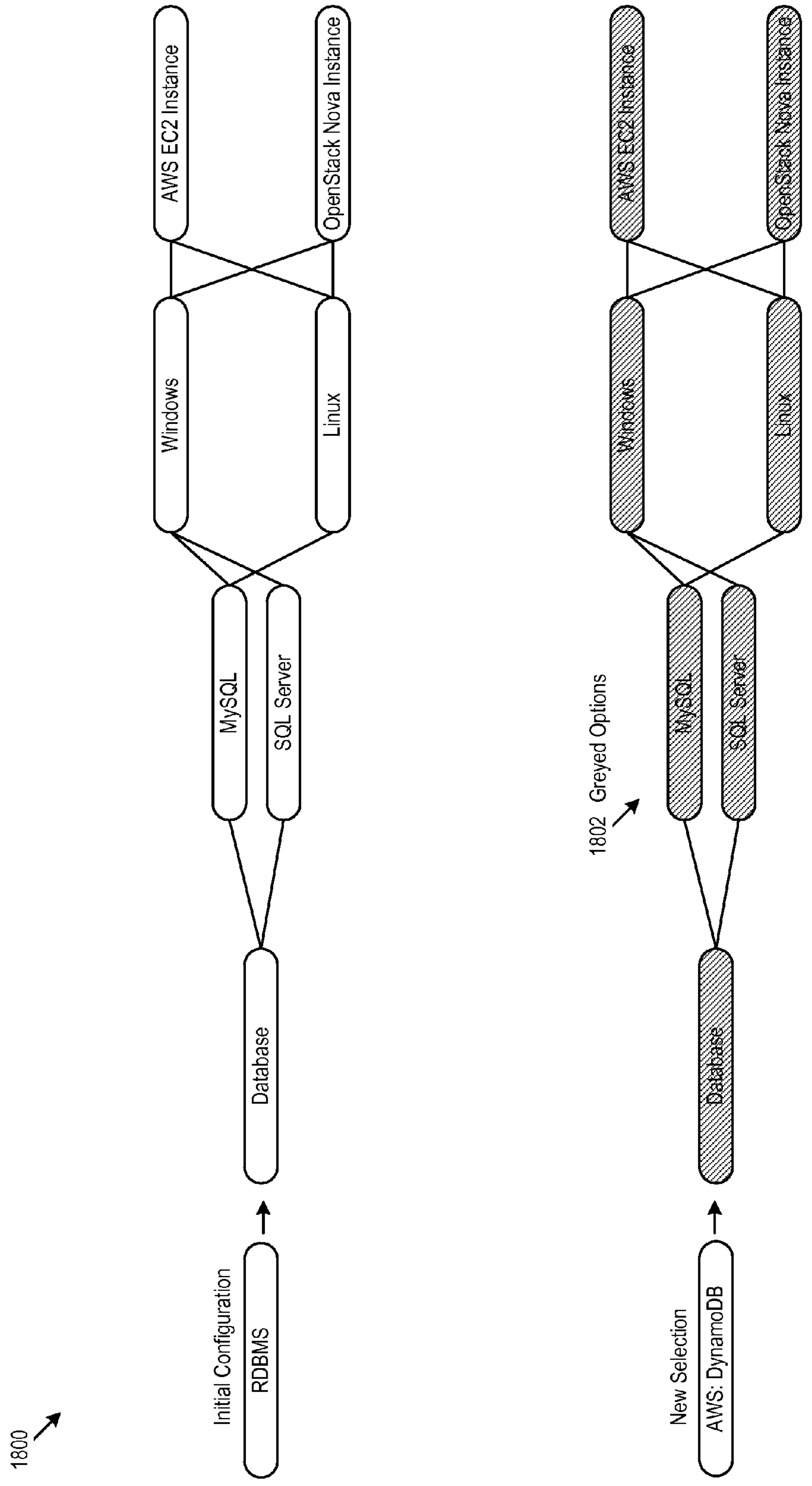
FIG. 17 shows an example scenario for option changes.

In various implementations, a selected option or newly applied extension may change the options available to the operator. FIG. 17 shows an example scenario 1800 for option changes. When AWS DynamoDB is selected over a relational database management system (RDBMS), the layout logic 700 may remove options that are handled internally by AWS. In various implementations, options that have been removed may be omitted in management interfaces by the layout logic 700, greyed 1802, and/or otherwise indicated as unavailable.

Execution Infrastructure

Figure 6:
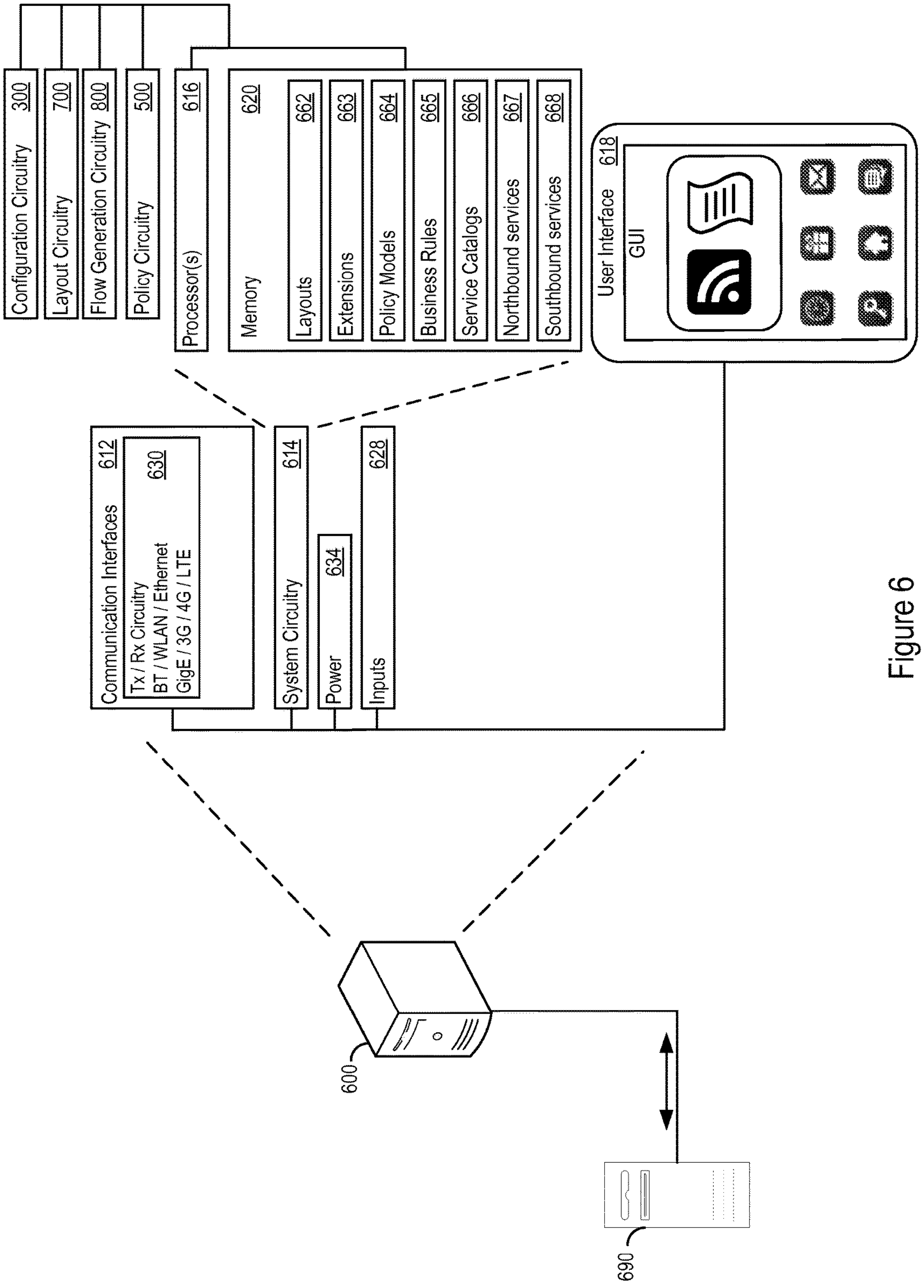
FIG. 6 shows an example specific execution environment.

FIG. 6 shows an example specific execution environment 600 for the logic described above. The execution environment 600 may include system circuitry 614 to support execution and presentation of the visualizations described above. The system circuitry may include processors 616, memory 620, and/or other circuitry. In various implementations, the configuration logic 300, layout logic 700, flow generation circuitry 800, and/or policy circuitry 500 may be implemented on the processors 616 and/or the memory 620.

The memory 620, may be used to store the data and/or media for available layouts 662; extensions 663; policy models 664; business rules 665, service catalogs 666, northbound service definitions 667, and/or southbound service definitions 668 to support the configuration logic 300, layout logic 700, flow generation logic 800, and/or policy logic 500 described above.

In various implementations, the example execution environment 600 may connect to one or more service catalog databases 690 for access service catalogs for definitions and/or configuration details of various northbound and southbound services.

The execution environment 600 may also include commutation interfaces 612, which may support wireless, e.g. Bluetooth, Wi-Fi, WLAN, cellular (4G, LTE/A), and/or wired, ethernet, Gigabit ethernet, optical networking protocols. The communication interface may support communication with external or third-party servers and/or service catalog databases 690. The execution environment 600 may include power functions 634 and various input interfaces 628. The execution environment may also include a user interface 618 that may include human interface devices and/or graphical user interfaces (GUI). The GUI may be used to present a management dashboard, actionable insights and/or other information to the user. In various implementations, the GUI may support portable access, such as, via a web-based GUI. In various implementations, the system circuitry 614 may be distributed over multiple physical servers and/or be implemented as one or more virtual machines.

Figure 9:
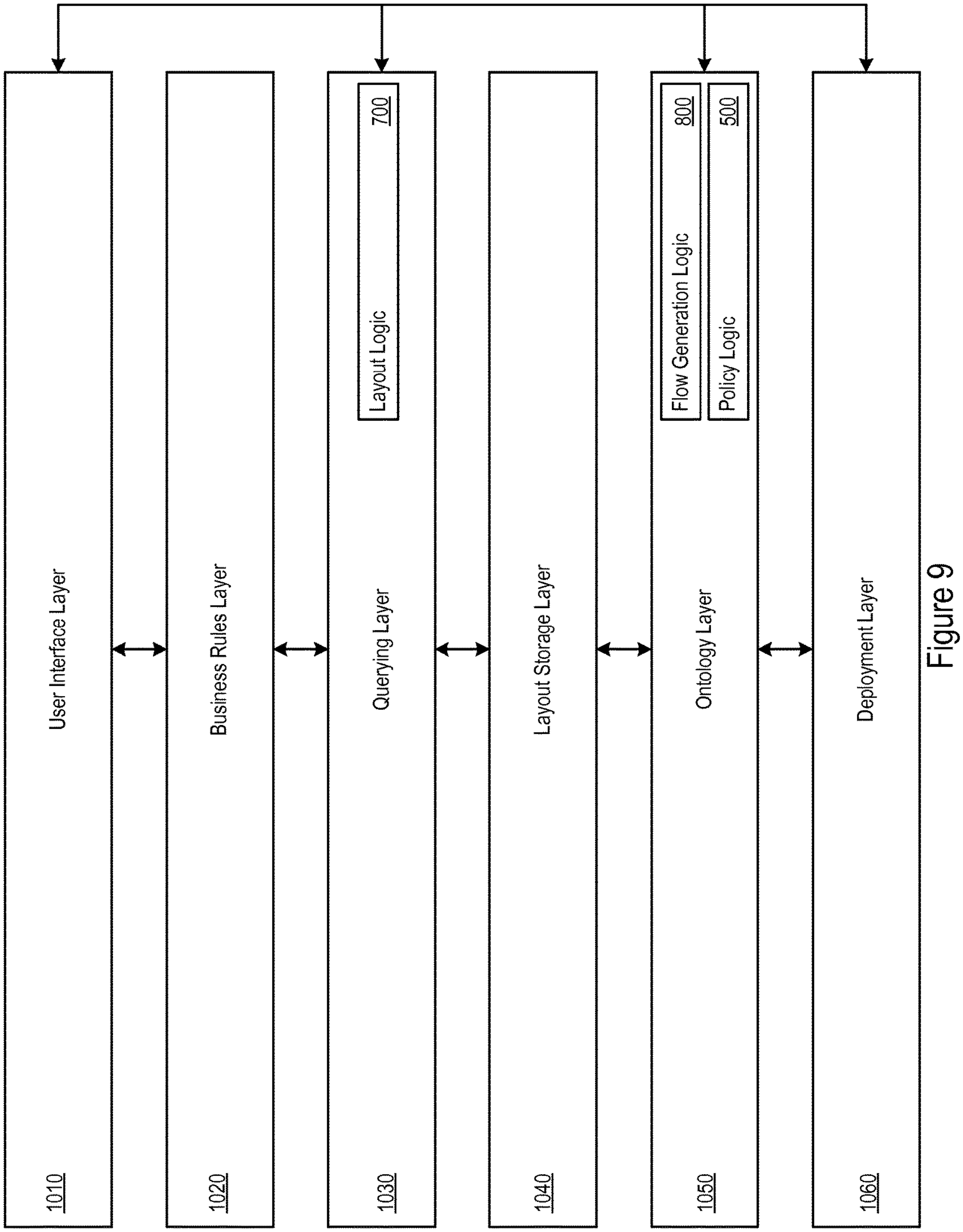
FIG. 9 shows an example infrastructure layout architecture.

FIG. 9 shows an example infrastructure layout architecture 1000. The example architecture may include a user interface layer 1010 for interaction with operators of the architecture. The user interface layer may be supported by a business rules layer 1020. The business rules layer may support presentation of deployment and configuration options the operator in a simplified form. For example, the operator may be provided with options among possible workflows generated by the flow generation logic 800 and/or layout manipulation options provided by the layout logic 700. The options related to dependencies or other variables handled automatically by the flow generation logic 800 and/or layout logic 700 may be masked to allow for simplified option presentation to the operator. In various implementations, the operator may be presented with options to view and/or manipulate masked variables if a more complex detailed interface is requested by the operator.

The layout logic 700 may be fully or partially contained in the querying layer 1030 below the business rules layer 1020. The querying layer 1030 may handle access, traversal and manipulation of various layouts, such as core layouts and extensions. In an example implementation, access, traversal and manipulation of the layout may be performed with layouts in a hierarchical graphical format, such as RDF.

The layout storage layer 1040 may handle storage of the layouts. The layout may be stored in the same format as that used for access, traversal and manipulation. However, other formats may be used for storage. For example, data may be stored in a non-graphical tabular triplet format and then transformed to a hierarchical and/or graphical format for access, traversal and manipulation.

The flow generation logic 800 and/or policy logic 500 may be fully or partially contained in the ontology layer 1050. The ontology 1050 layer may support application of policies and determination of deployment strategies. These operations may be performed in a manner opaque to the operator and the operator may be presented with options simplified through rules at the business rules layer 1020. In various implementations the operator may access detail at the ontology layer through options to assert or de-assert various business rules at the business rules layer 1020. Thus, the operator may view transparent operation of the ontology layer.

The deployment layer 1060 interfaces with the ontology, querying, and user interface layer to execute operations and/or workflows selected by the operator at the user interface layer 1010 and/or automatically selected by the upper layers 1030, 1050. The deployment layer 1060, may translate operations from upper layers 1010, 1030, 1050 into machine language instructions for execution.

Figure 18:
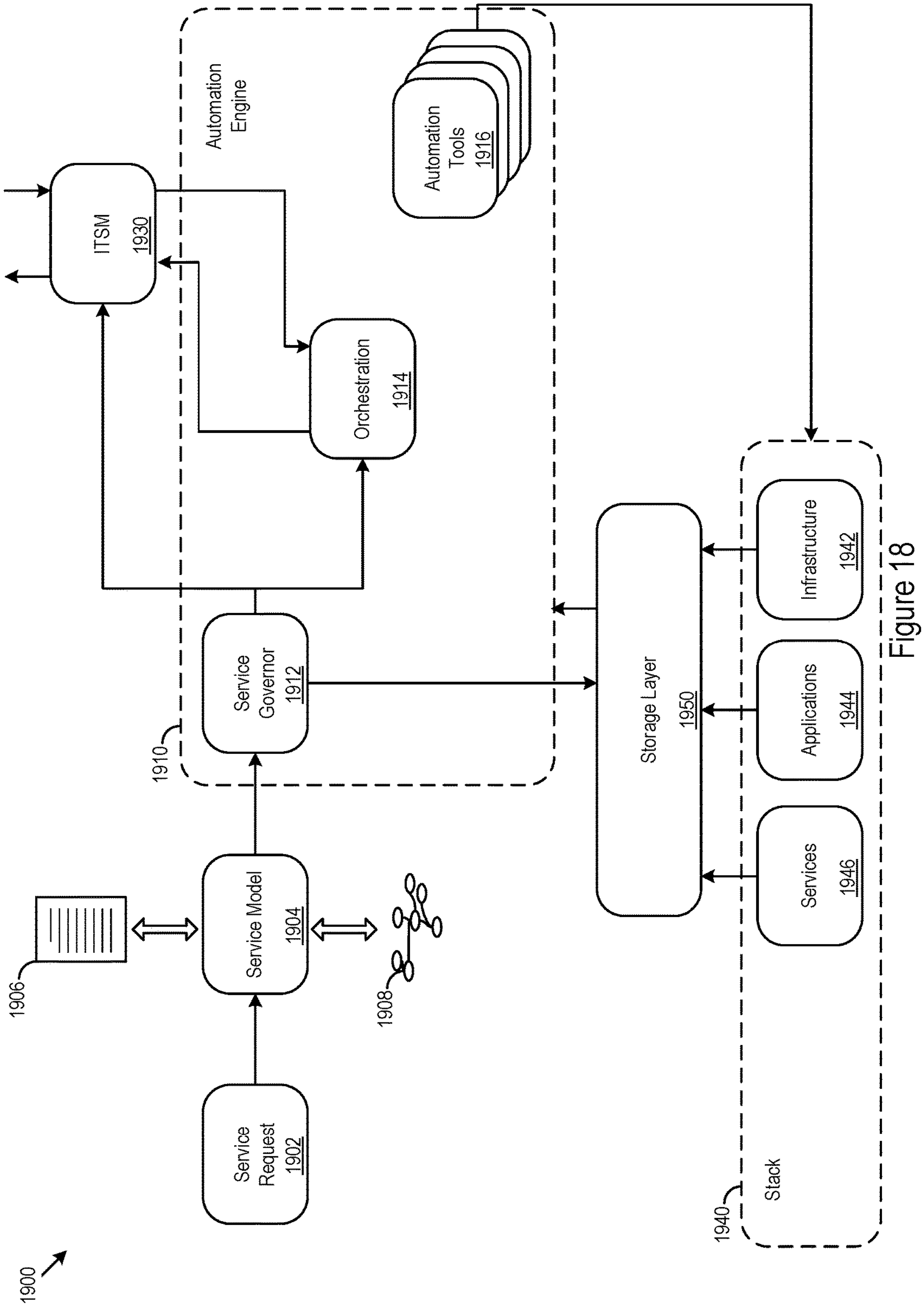
FIG. 18 shows example logic for service onboarding.

FIG. 18 shows example logic 1900 for service onboarding. The logic may reference an incoming service request 1902 for a new service against a service model 1904. In some cases, the service model may be a template 1906 or a path within a core layout 1908. The service governor 1912, within the automation engine 1910, may update policies and the service model to incorporate the newly requested service. A template 1906 may be created in cases where the logic 1900 referenced a path within the core layout rather than a stored template. The service governor 1912 may push the new service, for example in the form of a service template, to the information technology service management (ITSM) system 1930, service orchestration 1914, and the automation tools 1916 for implementation. The underlying execution stack 1940, may include infrastructure 1942, applications 1944, and services 1946, and may provide the blueprint for forming the initial core layout. Layouts, service models, and polices may be stored in a storage layer 1950 that is accessible by the service governor 1912 and execution stack 1940.

Figure 19:
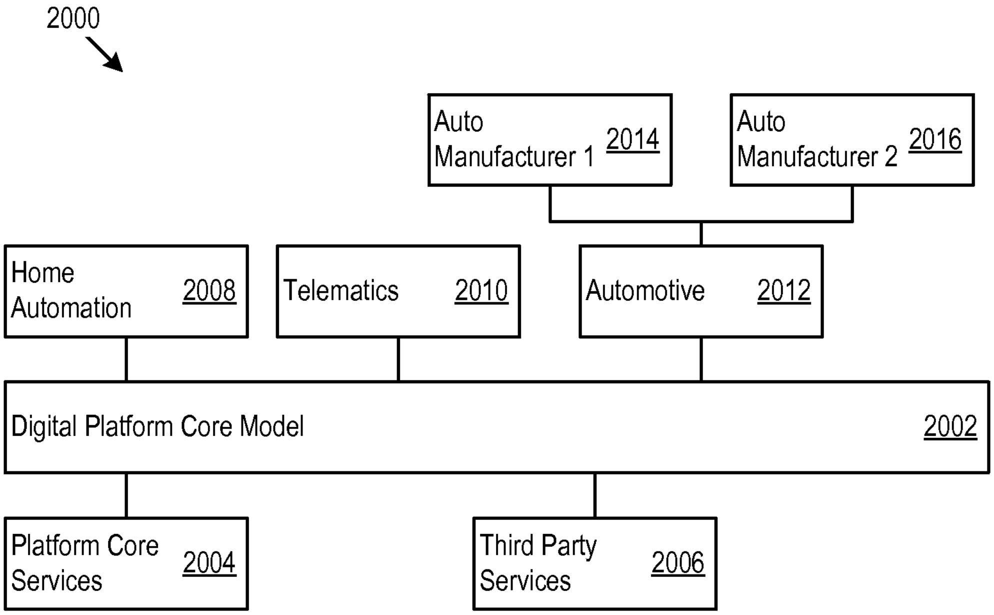
FIG. 19 shows an example of mapping new context to a core model to help reuse existing integrations.

FIG. 19 shows an example 2000 of how mapping new context to a core model 2002 to help reuse existing integrations. In the example 2000, services are available as, e.g., platform core services 2004 third party services 2006. The core model 2002 flexibly maps the services to contexts such as home automation 2008, telematics 2010, and automotive 2012. The mapping may extend to additional customizations, as shown by the specific contexts for auto manufacturer 1 2014 and the auto manufacturer 2 2016. Stated another way, the model driven approach for the digital platform maps new context to the core model 2002. This facilitates reuse of existing integrations for on-boarding and helps limit the propagation of updates when changes occur. Each new use case may be mapped with available underlying services to the core model 2002 to extend capability from components already mapped.

Figure 20:
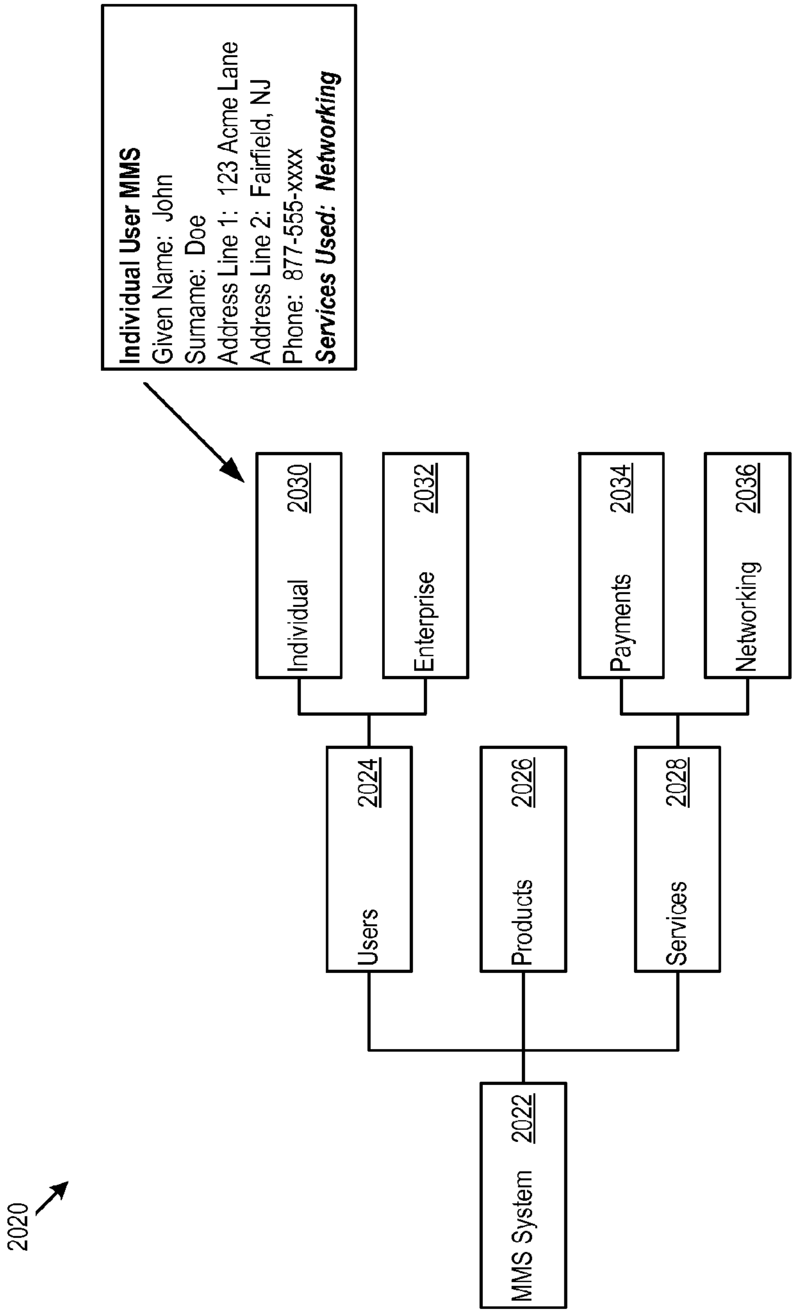
FIG. 20 shows an example of a core data model.

FIG. 20 shows an example of a core data model 2020. The data model 2020 may be represented as a graph-based RDF (resource description framework) model that captures the subject, predicate (relationship), and object. The system may query the model to discover relationships of interest. The graph-based model thereby differs from relational databases tables that are pre-defined at design time and fixed. The data model 2020 defines an MMS System 2022, including users 2024, products 2026, and services 2028. The core data model 2020 further develops the users 2024 as different types: individuals 2030 and enterprise 2032. Similarly, the core data model 2020 further develops the services 2028 as two types: payments 2034 and networking 2036.

The system may traverse the core data model 2020 to discover relationships. For instance, the individual user 2030 of the MMS System 2022 may inherit from users 2024 the concept of "Services Used." The system may also traverse the model to obtain the Products 2026 that a user subscribes to and then the Services 2028 associated with that particular product. Note that the core data model 2020 contains available configuration options and their relationships. For instances, the core data model 2020 may define mandatory and optional Services 2028 associated with a Product 2026, or that a Product 2026 must include at least one Service 2028.

Figure 21:
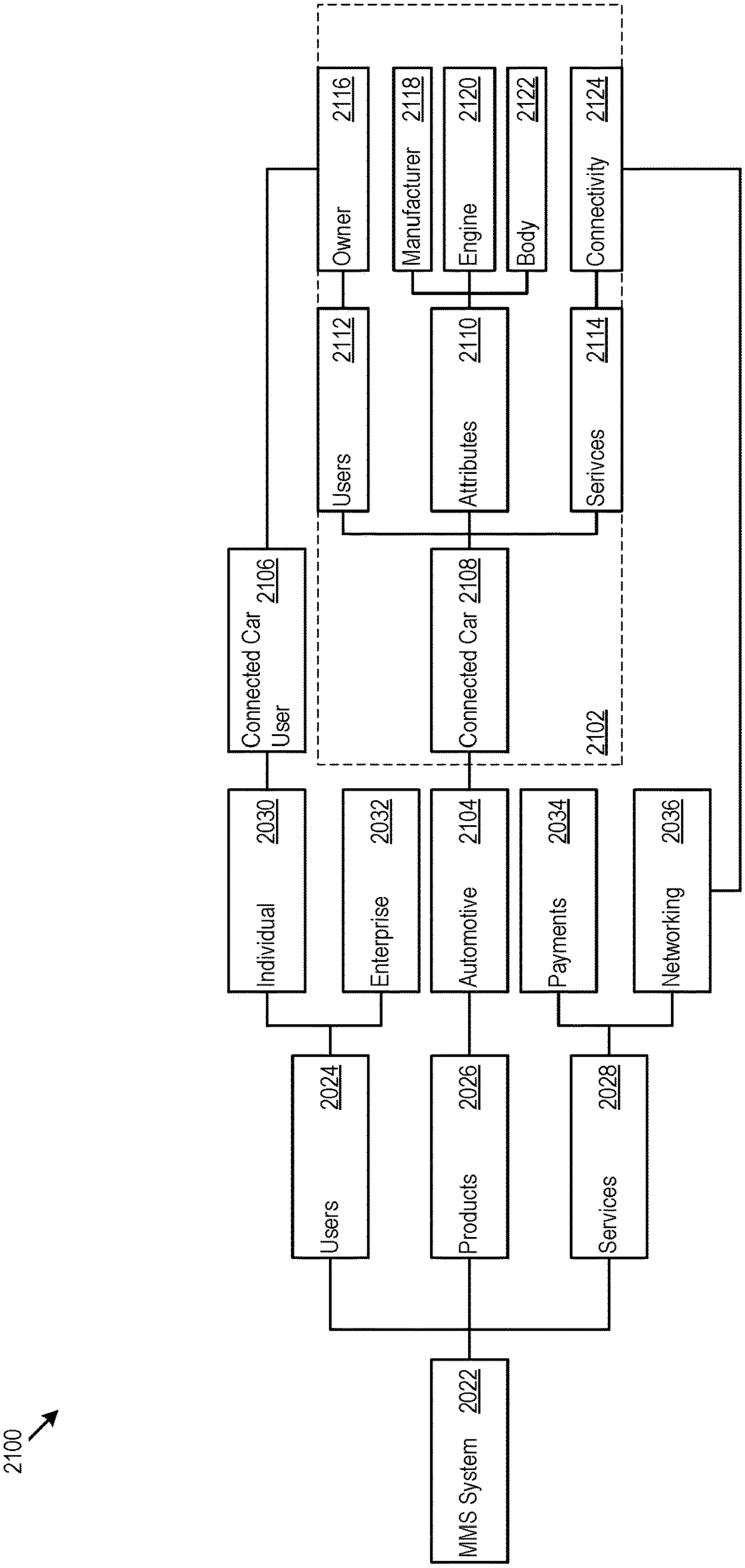
FIG. 21 shows how new digital products are created by mapping existing core services to models in other domains.

FIG. 21 shows how new digital products are created by mapping existing core services to models in other domains. In the example in FIG. 21, the MMS System model is extended with a connected car product domain model 2102. The connect car model 2102, in this example, defines entities such as the connected car 2108, users 2112, attributes 2110, and services 2114 for the connected car 2108. An Owner 2116 entity is defined upon Users 2112, and Manufacturer 2118, Engine 2120, and Body 2122 are just three examples of types of Attributes 2110. The model also defines Connectivity 2124 on Services 2114.

The composite model 2100 maps data and services across the MMS System 2020 model and the connected car model 2102. In the regard, the composite model also creates new entities, e.g., Automotive 2104 and Connect Car User 2106 to help connect data and services across models and, e.g., resolve mismatch in data and services between the models.

Figure 22:
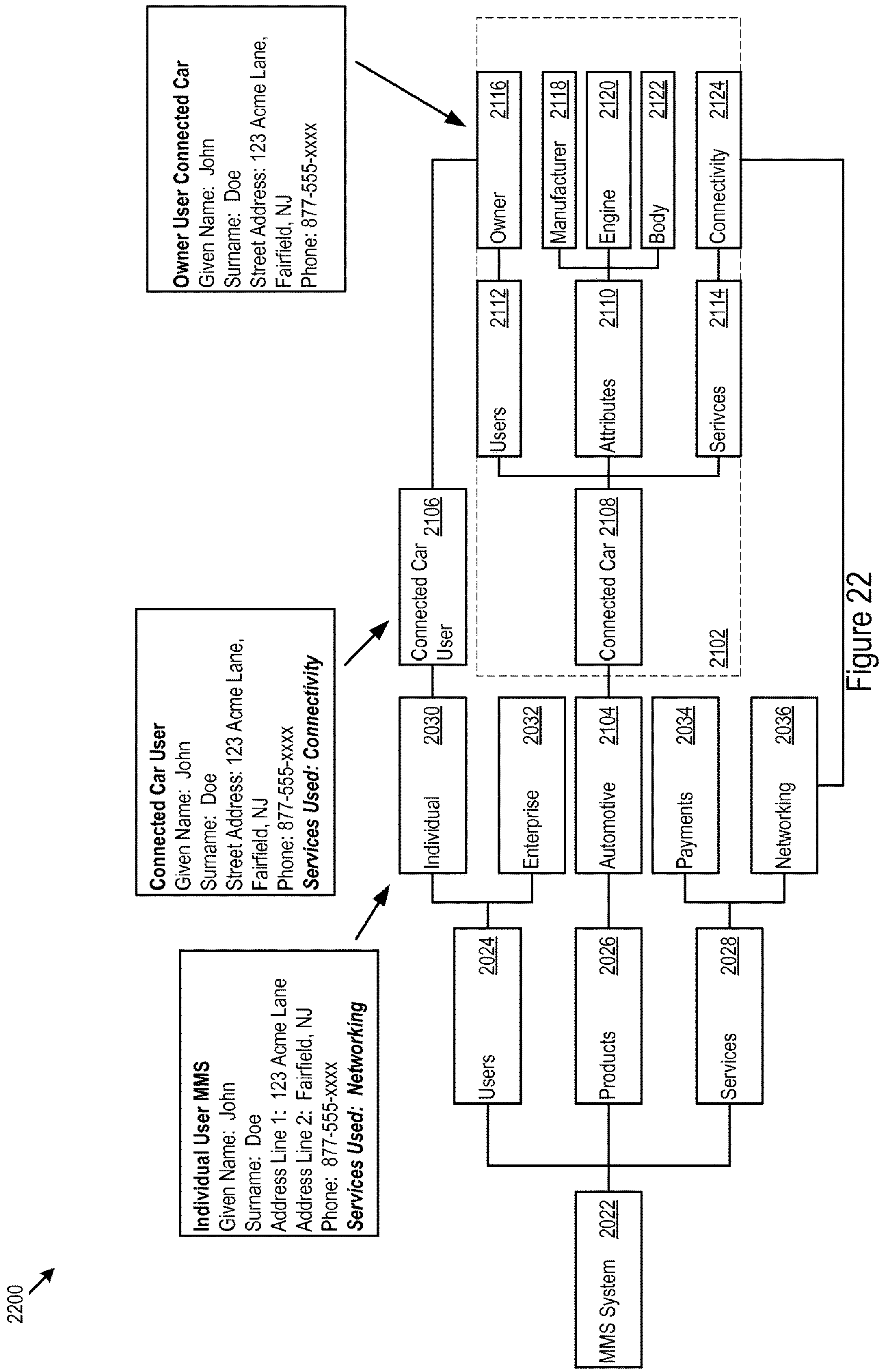
FIG. 22 shows how an extended model captures details for data mediation.

FIG. 22 shows how an extended model 2200 captures details for data mediation. In this example, the connected car user extension bridges the differences in data representation across the MMS and Connected Car Models. Note the distinction between the individual MMS users 2030, connected car user 2106 and the owner user of a connected car 212. The extended model also captures a mapping that may be used to create and maintain transform (e.g., XSLT) files and rules.

Figure 23:
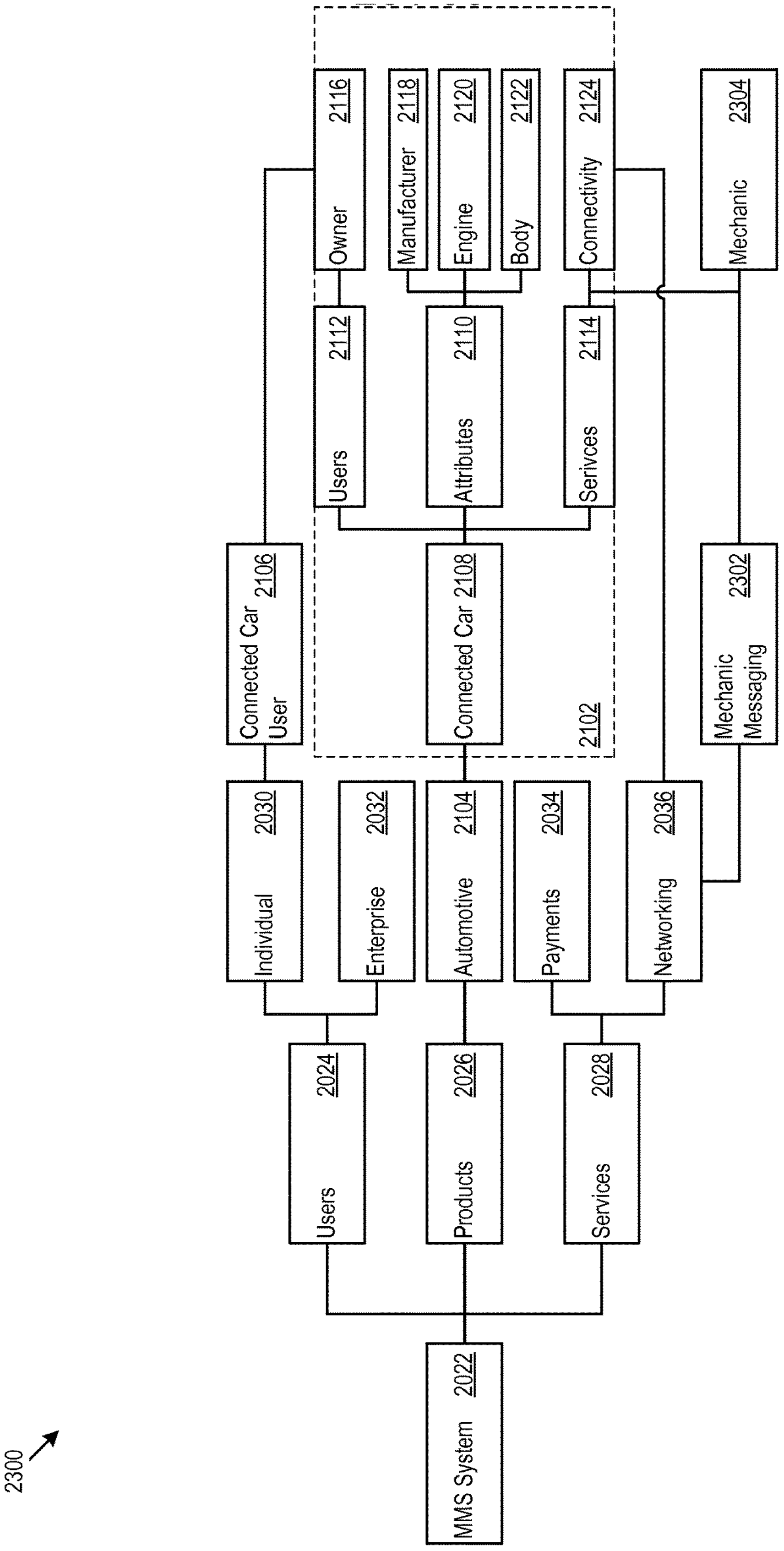
FIG. 23 shows how the model accommodates customizations.

FIG. 23 shows a customized model 2300 that illustrates customization. In particular, a mechanic messaging entity 2302 is defined on networking 2036 and related to the Mechanic entity 2304. That is, the composite model 2100 factors in a new mechanic service, e.g., unique to a particular Manufacturer 2118 by leveraging the existing MMS System 2022 messaging capability. The system may query the composite model 2100/extended model 2300 to determine what may be leveraged and reused and what may be customized as part of the implementation.

Figure 24:
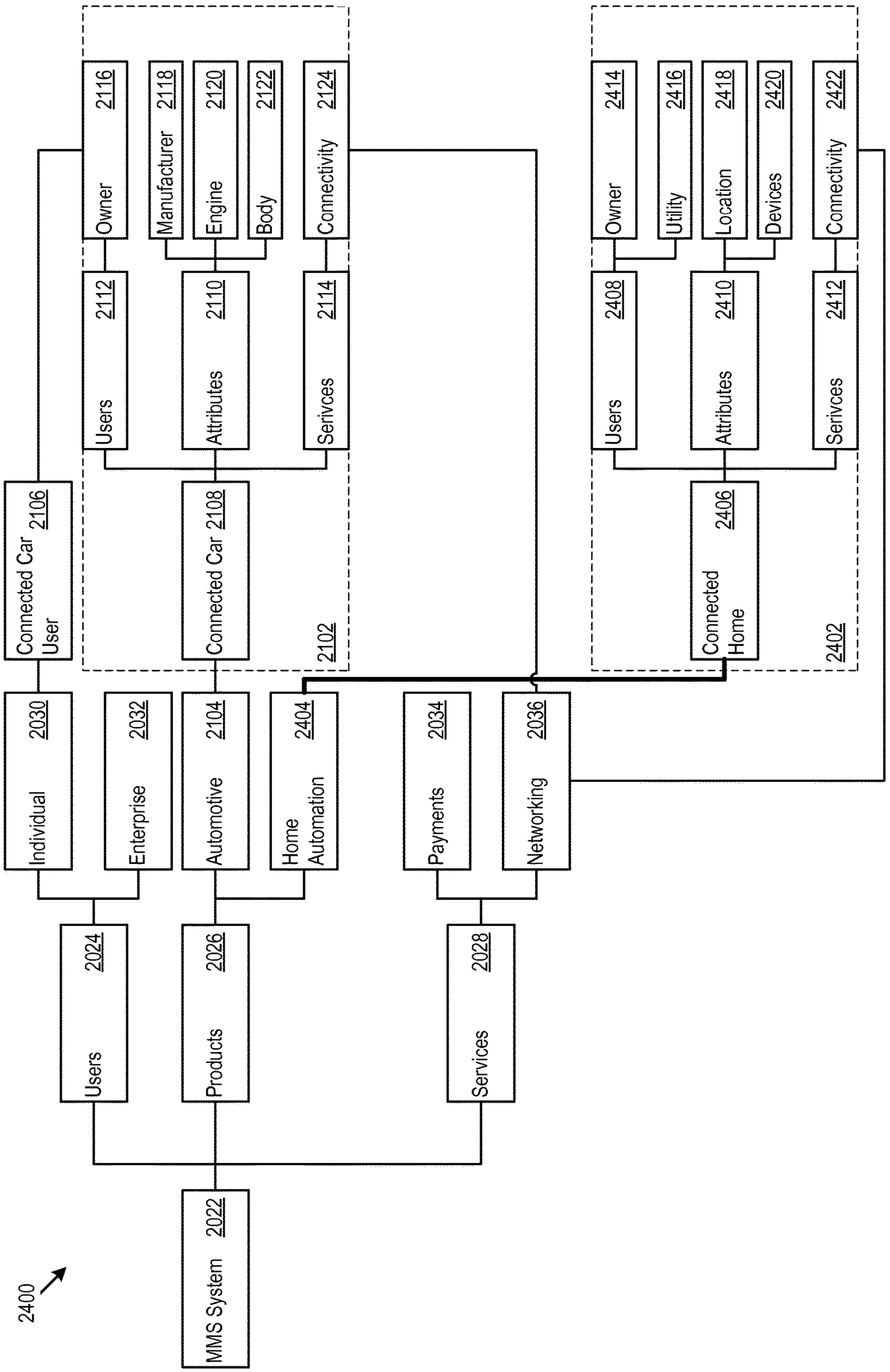
FIG. 24 shows how the model drive approach helps define new products.

FIG. 24 shows a connected home composite model 2400 that illustrates how the model driven approach helps define new products. The composite model 2400 is built on top of the core data model 2020 extended with a home automation model 2402. A Home Automation entity 2404 is defined on top of Products 2026 to extend the core data model 2020.

In this example, the home automation model 2402 includes a Connected Home entity 2406 that is the basis for Users 2408, Attributes 2410, and Services 2412. Users 2408 serves as a basis for the Owner entity 2414 and Utility entity 2416. Attributes 2410 serves as a basis for the Location entity 2418 and the Devices entity 2420, while Services 2412 serves as a basis for Connectivity 2422.

The infrastructure layout architecture may be used to support northbound services, such as, self-care portals, business support systems, application storefronts, payment gateways, application support (e.g. social media applications, catalogs, application mangers), mediation, converge subscription management, access support, transaction monitoring, network gateways, customer relationship management, and/or other northbound services.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A product comprising:

a machine readable medium other than a transitory signal; and instructions stored on the machine readable medium, the instructions configured to, when executed by a processor:

access a catalog listing to determine a northbound technical service;

determine a location of the northbound technical service at a first endpoint on a core layout;

traverse a first path from the first endpoint to a second endpoint to determine a first received technical service to support deployment of the northbound technical service;

traverse a second path from the first endpoint to a first node to determine a dependency for the northbound technical service;

access a manifest, the manifest configured to store a template comprising a path of nodes supporting the dependency;

perform a comparison between the template and the core layout;

responsive to the comparison; determine to apply an extension to the core layout;

traverse a third path from the first node to a third endpoint to determine a second received technical service that fulfills the dependency, the third path traversing the extension to the core layout;

responsive to traversal of the third path, generate a workflow including a deployment script to implement the second received technical service; and execute the deployment script by deploying a web resource to implement the second received technical service to fulfill the northbound technical service within a deployed instance of the core layout.

2. The product of claim 1, where:

the first and second received technical services comprise southbound technical services.

3. The product of claim 2, where:

the northbound technical service comprises wireless connectivity for an automobile.

4. The product of claim 3, where:

the first received technical service comprises a wireless carrier connection; and the second received technical service comprises a wireless security protocol.

5. The product of claim 1, where the instructions are configured to perform the comparison by determining a relationship between the first node and a second node within the extension.

6. The product of claim 5, where the instructions are configured to link the first and second nodes in accord with the relationship.

7. The product of claim 6, where:

the template is configured to store the relationship as a triplet;

the triplet defines the first node as a subject of the triplet;

the triplet defines the second node as an object of the triplet.

8. The product of claim 1, where the extension defines a subclass of the first node.

9. The product of claim 8, where the instructions are configured to pass a relationship of the first node to the subclass.

10. The product of claim 1, where the instructions are further configured to:

receive a first request from an application programming interface (API) for the northbound technical service; and translate the first request into a second request for the first received technical service.

11. The product of claim 10, where the instructions are configured to implement a virtualization layer between the northbound technical service and the first received technical service by translating the first request into the second request.

12. The product of claim 1, where the comparison comprises traversing a fourth path from the northbound technical service to the second technical received service.

13. A method comprising:

accessing a catalog listing to determine a northbound technical service;

determining, within a core layout, a location of the northbound technical service at a first endpoint on the core layout;

traversing a first path from the first endpoint to a second endpoint to determine a first received technical service to support deployment of the northbound technical service;

traversing a second path from the first endpoint to a first node to determine an unfulfilled dependency for the northbound technical service;

accessing a manifest, the manifest configured to store a template comprising a path of nodes supporting the dependency;

performing a comparison between the template and the core layout;

responsive to the comparison; determine to apply an extension to the core layout;

traversing a third path from the first node to a third endpoint to determine a second received technical service that fulfills the dependency, the third path traversing the extension to the core layout; and responsive to traversal of the third path, generating a workflow including a deployment script to implement the second received technical service; and executing the deployment script by deploying a web resource to implement the second received technical service to fulfill the northbound technical service within a deployed instance of the core layout.

14. The method of claim 13, where the extension defines a subclass of the first node.

15. The method of claim 14, further comprising passing a relationship of the first node to the subclass.

16. The method of claim 13, further comprising:

receiving a first request from an application programming interface (API) for the northbound technical service; and translating the first request into a second request for the first received technical service.

17. The method of claim 16, further comprising implementing a virtualization layer between the northbound technical service and the first received technical service by translating the first request into the second request.

18. The method of claim 13, where performing the comparison comprises determining a relationship between the first node and a second node within the extension.

19. A system comprising:

a first interface configured to receive a first request for a first southbound technical service;

a second interface, coupled via a network to the first interface, the second interface configured to receive a second request for a northbound technical service; and send, to the first interface, the first request for the first southbound technical service;

first circuitry coupled to the first interface configured to provide the first southbound technical service, via the first interface responsive to the first request; and second circuitry configured to:

access a manifest, the manifest configured to store a template comprising a path of nodes from the northbound technical service to the first southbound technical service;

perform a comparison between the template and a core layout stored at the first circuitry;

responsive to the comparison; determine to apply an extension to the core layout; and determine a relationship between a first node of the path and second node of the path, the first node of the path comprising a node within the core layout and the second node of the path comprising a node within the extension; and apply the extension by joining the first and second nodes in accord with the relationship; and generate the first request responsive to the second request by traversing the path; and responsive to the first request, generate a workflow including a deployment script to implement the first southbound technical service on the first circuitry; and execute the deployment script by causing the first circuitry to deploy a web resource to implement the first southbound technical service to fulfill the second request for the northbound technical service within a deployed instance of the core layout.

20. The system of claim 19, where the second circuitry is further configured to generate a third request for a second southbound technical service responsive to the second request;

the second southbound technical service is fulfilled by the core layout prior to application of the extension.

* * * * *